United States Patent
Le Roux et al.

(10) Patent No.: US 10,811,000 B2
(45) Date of Patent: Oct. 20, 2020

(54) METHODS AND SYSTEMS FOR RECOGNIZING SIMULTANEOUS SPEECH BY MULTIPLE SPEAKERS

(71) Applicant: Mitsubishi Electric Research Laboratories, Inc., Cambridge, MA (US)

(72) Inventors: Jonathan Le Roux, Arlington, MA (US); Takaaki Hori, Lexington, MA (US); Shane Settle, Moraga, CA (US); Hiroshi Seki, Toyohashi (JP); Shinji Watanabe, Baltimore, MD (US); John Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/952,330

(22) Filed: Apr. 13, 2018

(65) Prior Publication Data

US 2019/0318725 A1  Oct. 17, 2019

(51) Int. Cl.
*G10L 15/00* (2013.01)
*G10L 15/16* (2006.01)
(Continued)

(52) U.S. Cl.
CPC .......... *G10L 15/16* (2013.01); *G10L 15/063* (2013.01); *G10L 15/22* (2013.01); *G10L 17/005* (2013.01)

(58) Field of Classification Search
USPC ................... 704/231–257, 270–275
See application file for complete search history.

(56) References Cited

U.S. PATENT DOCUMENTS

| | | | |
|---|---|---|---|
| 8,175,244 B1 * | 5/2012 | Frankel | G06F 17/289 348/14.08 |
| 9,620,108 B2 | 4/2017 | Sak et al. | |

(Continued)

OTHER PUBLICATIONS

Qian et al. "Single-Channel Multi-talker Speech Recognition with Permutation Invariant Training." arxiv, vol. abs/1707.06527, 2017. (Year: 2017).*

(Continued)

*Primary Examiner* — Jesse S Pullias
(74) *Attorney, Agent, or Firm* — Gennadiy Vinokur; Hironori Tsukamoto; James McAleenan

(57) ABSTRACT

Systems and methods for a speech recognition system for recognizing speech including overlapping speech by multiple speakers. The system including a hardware processor. A computer storage memory to store data along with having computer-executable instructions stored thereon that, when executed by the processor is to implement a stored speech recognition network. An input interface to receive an acoustic signal, the received acoustic signal including a mixture of speech signals by multiple speakers, wherein the multiple speakers include target speakers. An encoder network and a decoder network of the stored speech recognition network are trained to transform the received acoustic signal into a text for each target speaker. Such that the encoder network outputs a set of recognition encodings, and the decoder network uses the set of recognition encodings to output the text for each target speaker. An output interface to transmit the text for each target speaker.

23 Claims, 26 Drawing Sheets

(51) Int. Cl.
  *G10L 15/06* (2013.01)
  *G10L 15/22* (2006.01)
  *G10L 17/00* (2013.01)

(56) References Cited

U.S. PATENT DOCUMENTS

| | | |
|---|---|---|
| 9,799,327 B1 | 10/2017 | Chan et al. |
| 9,818,431 B2* | 11/2017 | Yu .......................... G10L 25/30 |
| 2007/0263823 A1* | 11/2007 | Jalava ...................... H04M 3/56 |
| | | 379/202.01 |
| 2011/0224980 A1* | 9/2011 | Nakadai .................. G10L 15/20 |
| | | 704/233 |
| 2013/0301837 A1* | 11/2013 | Kim ......................... H04N 7/15 |
| | | 381/56 |
| 2015/0269933 A1 | 9/2015 | Yu |
| 2016/0111111 A1* | 4/2016 | Levitt ..................... G10L 21/02 |
| | | 704/231 |
| 2017/0337924 A1* | 11/2017 | Yu ......................... G06K 9/6246 |
| 2019/0080692 A1* | 3/2019 | R ............................. G10L 15/22 |
| 2019/0139563 A1* | 5/2019 | Chen .................. G10L 21/0216 |

OTHER PUBLICATIONS

Gang Ji et al. "Jointly Recognizing Multi Speaker Conversations," Acoustics Speech and Signal Processing, 2010 IEEE International Conference On. IEEE Piscataway, NJ, USA, Mar. 14, 2010 pp. 5110-5113.
Suyoun Kim et al., "Joint CTC Attention Based End to End Speech Recognition using Multi Task Learning." Arxiv.org Cornell University Library, 201 Olin Library, Ithaca, NY 14853. Sep. 22, 2016.

\* cited by examiner

METHODS AND SYSTEMS FOR RECOGNIZING SIMULTANEOUS SPEECH BY MULTIPLE SPEAKERS

FIELD

The present disclosure relates generally to audio signals, and more particularly to speech separation and speech recognition using one or more microphones.

BACKGROUND

Conventional speech recognition systems are plagued by interfering sources such as background noise from the environment and speech sources other than the target source.

For example, in situations where many people are present with several people speaking simultaneously, the speech from different people is intermingled in a single mixture of signal in what is known as the cocktail party effect. Humans are capable of focusing auditory attention on a particular stimulus while filtering out a range of other stimuli. This is exemplified by the way that a partygoer can focus on a single conversation in a noisy room. It is however very difficult for a machine to transcribe speech of one or more target speakers in such a situation.

Accordingly, there is need to improve speech recognition using one or more microphones.

SUMMARY

The present disclosure relates generally to audio signals, and more particularly to speech separation and speech recognition using one or more microphones.

Some embodiments of the present disclosure include a fully end-to-end, jointly trained deep learning system for separation and recognition of overlapping speech signals. The joint training framework synergistically can adapt the separation and recognition to each other. As an additional benefit, among many benefits, is the joint training framework can train on more realistic data that contains only mixed signals and their transcriptions, and thus can be suited to large scale training on existing transcribed data.

Some embodiments of the present disclosure include a fully end-to-end deep learning system for recognition of overlapping speech signals, without explicit separation of the underlying speech signals. Similarly to the above jointly trained deep learning system for separation and recognition, the system without explicit separation has an additional benefit, among many benefits, that it can be trained on more realistic data that contains only mixed signals and their transcriptions, and thus can be suited to large scale training on existing transcribed data.

For example, learned through experimentation are end-to-end automatic speech recognition (ASR) systems used with encoder-decoder recurrent neural networks (RNNs) to directly convert sequences of input speech features to sequences of output labels without any explicit intermediate representation of phonetic/linguistic constructs. Implementing the entire recognition system as a monolithic neural network can remove the dependence on ad-hoc linguistic resources. Also discovered is that the recognition system can greatly improve the ease of discriminative training and integration with other systems. The present disclosure exploits these properties to extend ASR to recognition of multiple overlapping speakers. Recognizing speech amidst a cacophony of multiple speakers is a longstanding challenge, known as the cocktail party problem within the technology space. Solving this cocktail party problem would enable dramatically better technology for real-world human machine interaction (HMI), among other things.

During this experimentation process, learned was that deep clustering can train a powerful deep neural network to project each time-frequency (T-F) unit to a high-dimensional embedding vector. Such that, the embeddings for the T-F unit pairs dominated by the same speaker are close to each other, while those for pairs dominated by different speakers are farther away. The speaker assignment of each T-F unit can thus be inferred from the embeddings by simple clustering algorithms, to produce masks that isolate each single speaker.

Some challenges initially faced in trying to use a speech separation paradigm, were trying to train the speech separation and speech recognition components in isolation, and then later connect them together after training. However, it was later learned, such an approach is not ideal for general real-world signals for the present disclosure. One reason is that the speech separation training paradigm initially used, relies on signal-level ground truth references for the individual sources. Specifically, in natural recordings with reverberant acoustics, such signal-level reference is not available, and the only alternative would be simulation. It is thus difficult to train in isolation a speech separation system for best performance on general real-world signals. On the other hand, data with natural acoustics and transcriptions of the speech are readily available. Because of this, at least one realization of the present disclosure, was the motivation for combining the two systems and jointly training them for recognition, or as an alternative designing a single system that does not perform explicit separation. Now, implementing this realization has resulted in the best practice for recognition of speech by multiple speakers using deep networks. As noted above, has resulted in a fully end-to-end, jointly trained deep learning system for recognition of overlapping speech signals. Wherein, in the joint training framework the separation and recognition can be synergistically adapted to each other, leading to improved performance. Or, in the system without explicit separation, recognition can be optimized directly for recognizing speech from an acoustic signal with multiple overlapping speakers, leading to improved performance.

According to an embodiment of the present disclosure, a speech recognition system for recognizing speech including overlapping speech by multiple speakers. The system includes a hardware processor. A computer storage memory to store data along with having computer-executable instructions stored thereon that, when executed by the hardware processor is to implement a stored speech recognition network. An input interface to receive an acoustic signal, the received acoustic signal including a mixture of speech signals by multiple speakers, wherein the multiple speakers include target speakers. An encoder network and a decoder network of the stored speech recognition network are trained to transform the received acoustic signal into a text for each target speaker. Such that the encoder network outputs a set of recognition encodings, and the decoder network uses the set of recognition encodings to output the text for each target speaker. An output interface to transmit the text for each target speaker.

According to another embodiment of the present disclosure, a speech recognition system for recognizing speech including overlapping speech by multiple speakers. The system includes a hardware processor. A computer storage memory to store data along with having computer-executable instructions stored thereon that, when executed by the processor, is to implement a stored speech recognition network. An input interface to receive an acoustic signal, the received acoustic signal includes a mixture of speech signals by multiple speakers, wherein the multiple speakers include target speakers. An encoder network and a decoder network of the stored speech recognition network are trained to transform the received acoustic signal into a text for each target speaker. Such that the encoder network outputs a set of recognition encodings, and the decoder network uses the set of recognition encodings to output the text for each target speaker. Wherein the encoder network also includes a mixture encoder network, a set of speaker-differentiating encoder networks, and a recognition encoder network. An output interface to transmit the text for each target speaker.

According to another embodiment of the present disclosure, a method using a speech recognition system to recognize separate speaker signals within an audio signal having overlapping speech by multiple speakers. The method including receiving an acoustic signal including a mixture of speech signals by multiple speakers via an input interface, wherein the multiple speakers include target speakers. Inputting the received audio signal using a hardware processor into a pre-trained speech recognition network stored in a computer readable memory. Wherein the pre-trained speech recognition network is configured for transforming the received acoustic signal into a text for each target speaker using an encoder network and a decoder network of the pre-trained speech recognition network by, using the encoder network to output a set of recognition encodings, and the decoder network uses the set of recognition encodings to output the text for each target speaker. Transmitting the text for each target speaker using an output interface.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to speech separation and speech recognition using one or more microphones.

Some embodiments of the present disclosure include a fully end-to-end, jointly trained deep learning system for separation and recognition of overlapping speech signals. The joint training framework synergistically can adapt the separation and recognition to each other. As an additional benefit, among many benefits, is the joint training framework can train on more realistic data that contains only mixed signals and their transcriptions, and thus can be suited to large scale training on existing transcribed data.

Some embodiments of the present disclosure include a fully end-to-end deep learning system for recognition of overlapping speech signals, without explicit separation. Similarly to the above jointly trained deep learning system for separation and recognition, the system without explicit separation has an additional benefit, among many benefits, that it can be trained on more realistic data that contains only mixed signals and their transcriptions, and thus can be suited to large scale training on existing transcribed data.

For example, learned through experimentation are end-to-end automatic speech recognition (ASR) systems used with encoder-decoder recurrent neural networks (RNNs) to directly convert sequences of input speech features to sequences of output labels without any explicit intermediate representation of phonetic/linguistic constructs. Implementing the entire recognition system as a monolithic neural network can remove the dependence on ad-hoc linguistic resources. Also discovered is that the recognition system can greatly improve the ease of discriminative training and integration with other systems. The present disclosure exploits these properties to extend ASR to recognition of multiple overlapping speakers. Recognizing speech amidst a cacophony of multiple speakers is a longstanding challenge, known as the cocktail party problem within the technology space. Solving this cocktail party problem would enable dramatically better technology for real-world human machine interaction (HMI), among other things.

Figure 1A:
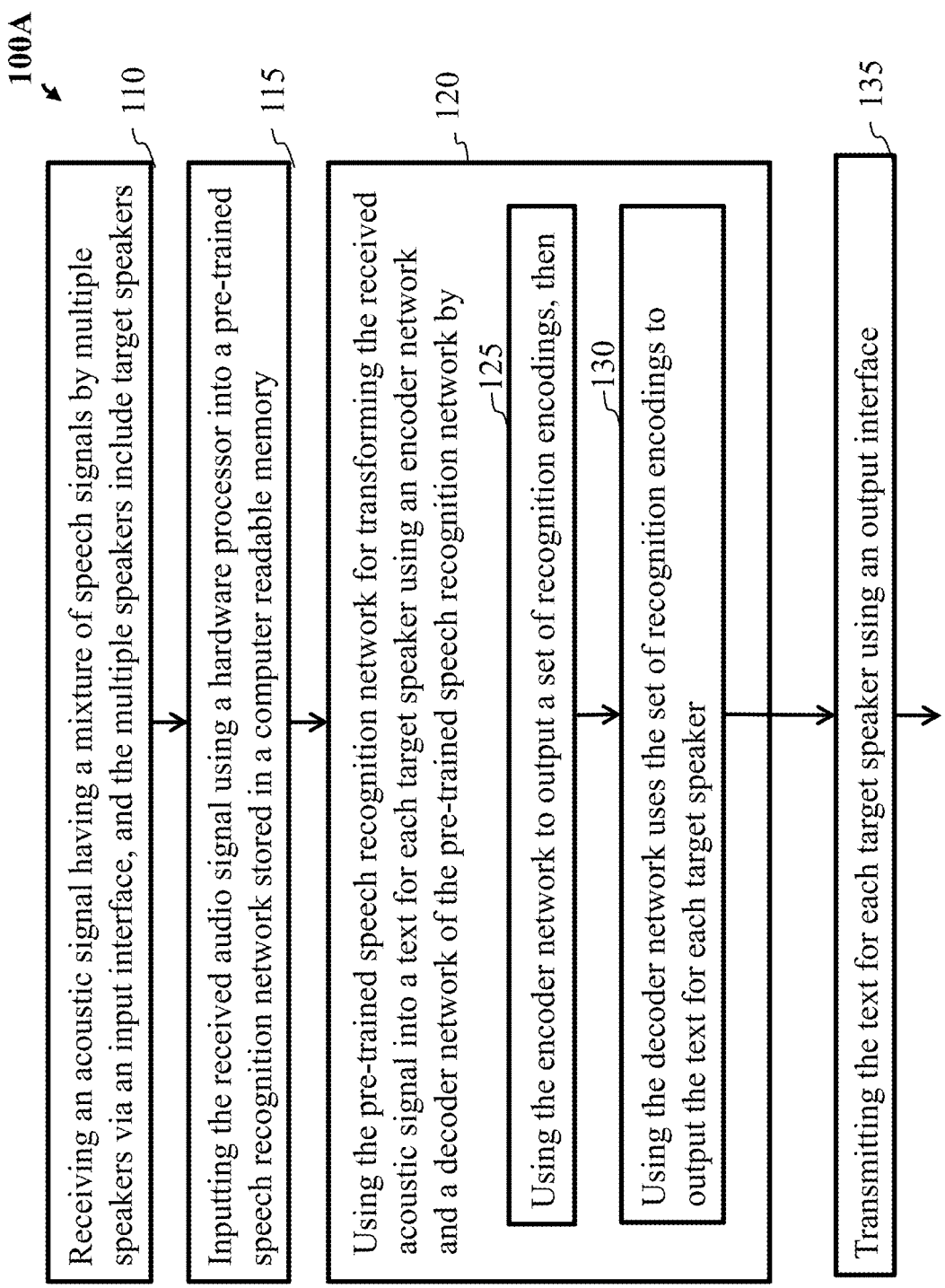
FIG. 1A is a flow diagram illustrating some method steps for implementing a method, according to embodiments of the present disclosure.

FIG. 1A is a flow diagram illustrating some method steps for implementing a method, according to embodiments of the present disclosure. For example, a method 100A of using a speech recognition system to recognize separate speaker signals within an audio signal having overlapping speech by multiple speakers. Method 100A can be performed on a client device or some other device.

Step 110 of method 100A can include receiving an acoustic signal having a mixture of speech signals by multiple speakers. For example, the acoustic signal can include speech from multiple speakers talking simultaneously that can be captured at a single microphone forming the acoustic signal. An aspect of the signal associated with each speaker can, by non-limiting example, be roughly the same volume level, such that the multiple speakers could be speaking in about the same volume at the same distance from the microphone.

Step 115 of FIG. 1A includes Inputting the received audio signal using a hardware processor into a pre-trained speech recognition network stored in a computer readable memory. Wherein the pre-trained speech recognition network is configured for transforming the received acoustic signal into a text for each target speaker using an encoder network and a decoder network of the pre-trained speech recognition network. Contemplated is that multiple hardware processors could be used depending upon the specific application. As noted above, some embodiments can include a fully end-to-end, jointly trained deep learning system for separation and recognition of overlapping speech signals. The joint training framework synergistically can adapt the separation and recognition to each other. As an additional benefit, among many benefits, is the joint training framework can train on more realistic data that contains only mixed signals and their transcriptions, and thus can be suited to large scale training on existing transcribed data.

Step 120 of FIG. 1A includes the hardware processor using the pre-trained speech recognition network for transforming the received acoustic signal into a text for each target speaker using an encoder network and a decoder network of the pre-trained speech recognition network.

Step 125 of FIG. 1A includes using the encoder network to output a set of recognition encodings.

Step 130 of FIG. 1A includes using the decoder network which uses the set of recognition encodings to output the text for each target speaker.

Step 135 of FIG. 1A includes transmitting the text for each target speaker using an output interface.

Figure 1B:
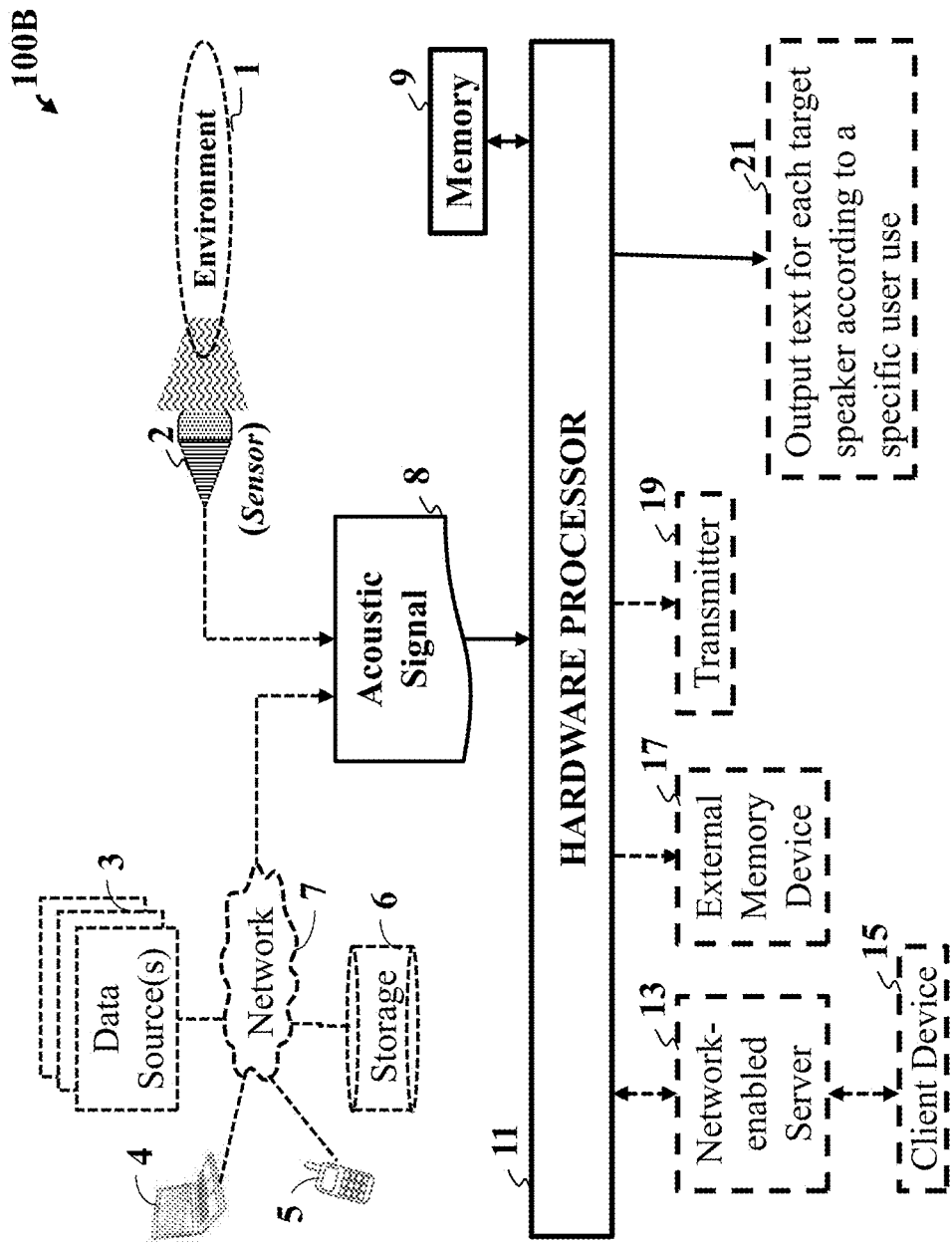
FIG. 1B is a block diagram illustrating some components that can be used for implementing the systems and methods, according to embodiments of the present disclosure.

FIG. 1B is a block diagram illustrating some components that can be used for implementing the systems and methods, according to embodiments of the present disclosure. For example, method 100B can include the hardware processor 11 in communication with a sensor 2 or sensors, such as an acoustic sensor, that collects data including an acoustic signal(s) 8 from an environment 1. The acoustic signal can include multiple speakers with overlapping speech. Further, the sensor 2 can convert an acoustic input into the acoustic signal The hardware processor 11 is in communication with a computer storage memory, i.e. memory 9, such that the memory 9 includes stored data, including algorithms, instructions and other data, that can be implemented by the hardware processor 11.

Optionally, the hardware processor 11 can be connected to a network 7, that is in communication with a data source(s) 3, computer device 4, a mobile phone device 5 and a storage device 6. Also optionally, the hardware processor 11 can be connected to a network-enabled server 13 connected to a client device 15. The hardware processor 11 can optionally be connected to an external memory device 17, a transmitter 19. Further, the text for each target speaker can be outputted according to a specific user intended use 21, for example, some types of user use can include displaying the text on one or more display device, such as a monitor or screen, or inputting the text for each target speaker into a computer related device for further analysis, etc.

It is contemplated the hardware processor 11 can include two or more hardware processors depending upon the requirements of the specific application, wherein the processors can be either internal or external. Certainly, other components may be incorporated with method 100B including output interfaces and transceivers, among other devices.

It is possible the network 7 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the system 100B. Each may comprise a single device or multiple devices cooperating in a distributed environment. Further, system 100B can include one or more data source(s) 3. Data source(s) 3 comprise data resources for training a speech recognition network. The data provided by data source(s) 3 may include labeled and un-labeled data, such as transcribed and un-transcribed data. For example, in an embodiment, the data includes one or more sounds and may also include corresponding transcription information or labels that may be used for initializing a speech recognition network. The training data can include acoustic signals of multiple speakers talking simultaneously. The training data can also include acoustic signals of single speakers talking alone, acoustic signals of single or multiple speakers talking in a noisy environment, and acoustic signals of noisy environments.

Further, un-labeled data in data source(s) 3 can be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or captured images (e.g., depth camera images), tweets, chat or video-call records, or social-networking media. Specific data source(s) 3 used may be determined based on the application including whether the data is a certain class of data (e.g., data only related to specific types of sounds, including machine systems, entertainment systems, for example) or general (non-class-specific) in nature.

System 100B can include third party devices 4, 5, which can comprise of any type of computing device, such that there may be interest to have an automatic speech recognition (ASR) system on the computing device. For example, the third party devices including a computer device 4 such as the type of computing device described in relation to FIG. 18A, or a mobile device 5, such as the type of mobile computing device described in relation to FIG. 18B, herein. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 3.

The ASR model using a speech recognition network can process the inputted data to determine computer-usable information. For example, a query spoken by a user into a microphone while multiple people in the room are talking may be processed to determine the content of the query, for example, if a question is asked. Example third party devices 4, 5 are optionally included in system 100B to illustrate an environment that the deep neural network model may be deployed. Further, some embodiments of the present disclosure may not include third party devices 4, 5. For example, a deep neural network model can be on a server or in a cloud network, system or like arrangement.

Regarding the storage 6, the storage 6 can store information including data, computer instructions (e.g., software program instructions, routines, or services), and/or models used in embodiments of the technology described herein. For example, the storage 6 can store data from one or more data source(s) 3, one or more deep neural network models, information for generating and training deep neural network models, and the computer-usable information outputted by one or more deep neural network models.

Figure 1C:
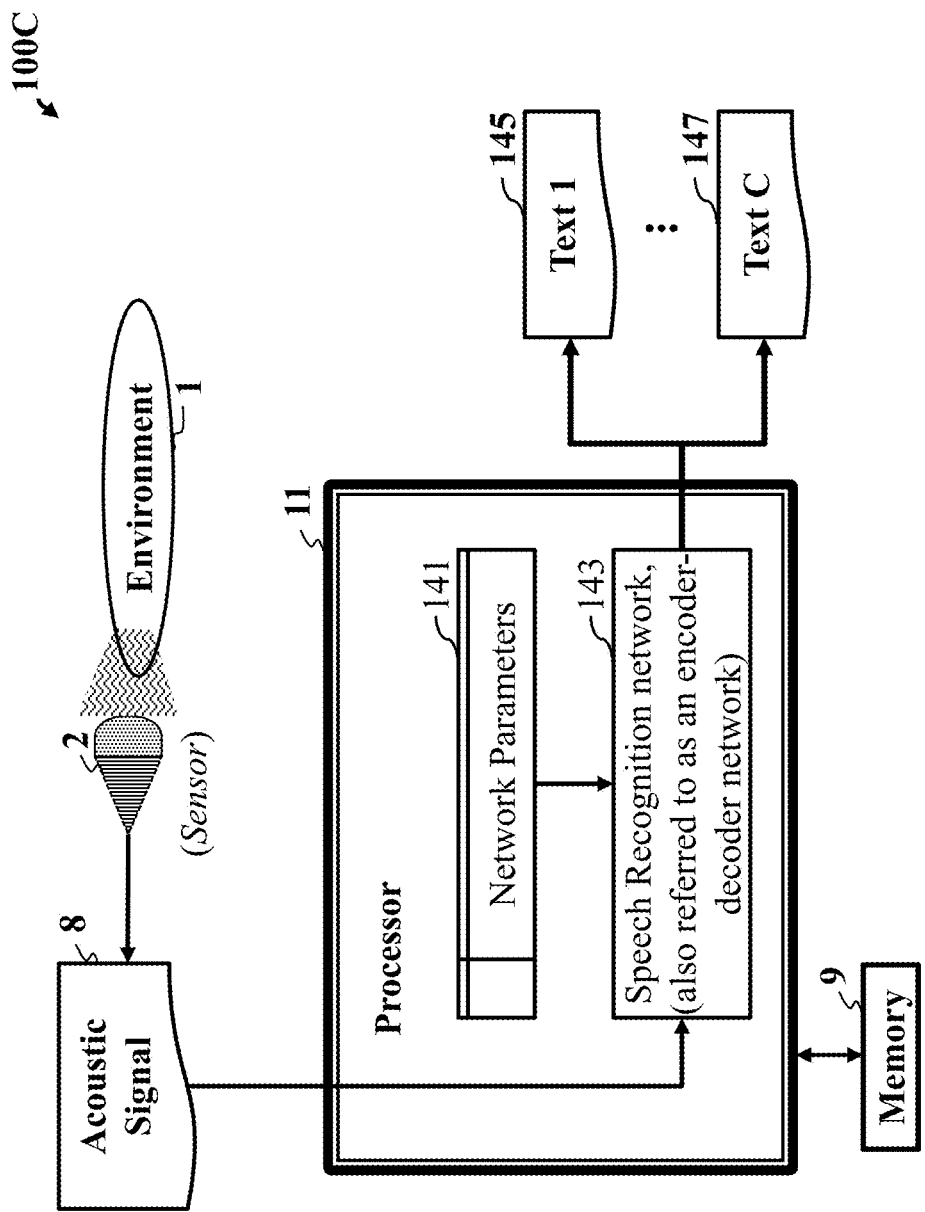
FIG. 1C is a block diagram illustrating end-to-end recognition of speech by multiple speakers speaking simultaneously, according to embodiments of the present disclosure.

FIG. 1C is a block diagram illustrating end-to-end recognition of speech by multiple speakers speaking simultaneously, according to embodiments of the present disclosure. FIG. 1C illustrates some of the features as described in claim 1. The speech recognition network, i.e., an encoder-decoder network, 143 processes the acoustic signal 8 recorded using sensor 2 from an environment 1 using stored network parameters 141 to output text for each target speaker, from Text 1 145 to Text C 147 for the case where there are C target speakers.

Figure 1D:
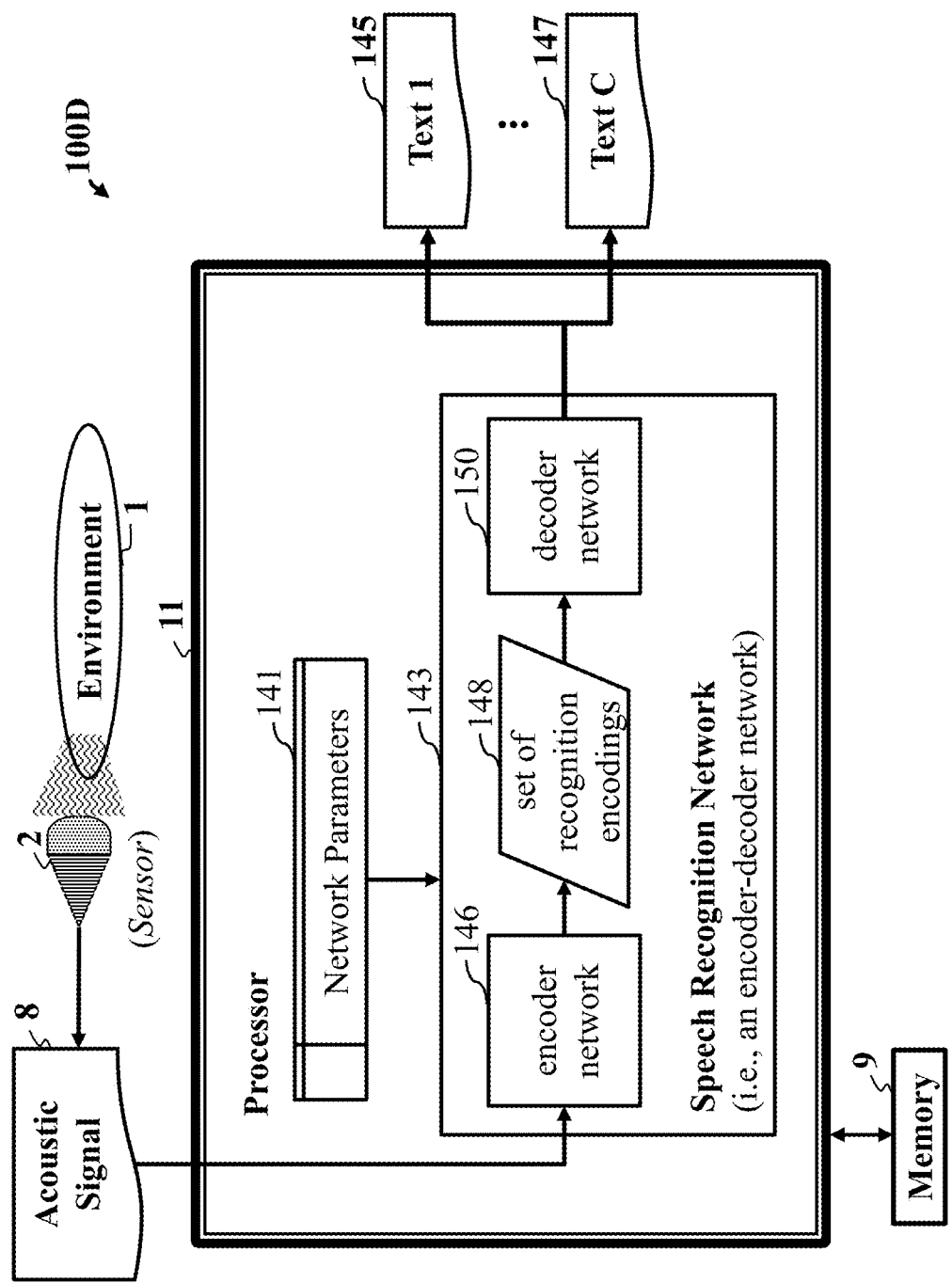
FIG. 1D is a block diagram illustrating end-to-end recognition of speech by multiple speakers speaking simultaneously, that includes a speech recognition network (also referred to as an encoder-decoder network) that is pre-trained, wherein the encoder-decoder network includes an encoder network and a decoder network, wherein the encoder network outputs a set of recognition encodings used by the decoder network to output text by each speaker, according to embodiments of the present disclosure.

FIG. 1D is a block diagram illustrating end-to-end recognition of speech by multiple speakers speaking simultaneously, that includes a speech recognition network, i.e., an encoder-decoder network, wherein the encoder-decoder network includes an encoder network and a decoder network, wherein the encoder network outputs a set of recognition encodings used by the decoder network to output text by each speaker, according to embodiments of the present disclosure. FIG. 1D illustrates some of the features as described in claim 1. The encoder-decoder network 143 of FIG. 1C processes the acoustic signal 8 by using an encoder network 146 to output a set of recognition encodings 148, further processed by a decoder network 150 to output text for each target speaker, from Text 1 145 to Text C 147 for the case where there are C target speakers. In some embodiments, the encoder 146 includes a feature extractor (not shown) configured to extract an acoustic feature sequence from the acoustic signal 8 to be used by the encoder-decoder network. The feature extractor is a differentiable function and thus can be connected into the single encoder-decoder network. Examples of the differentiable function include a Mel function of a magnitude of the channel signal and a bark function of a magnitude of the channel signal.

Figure 2:
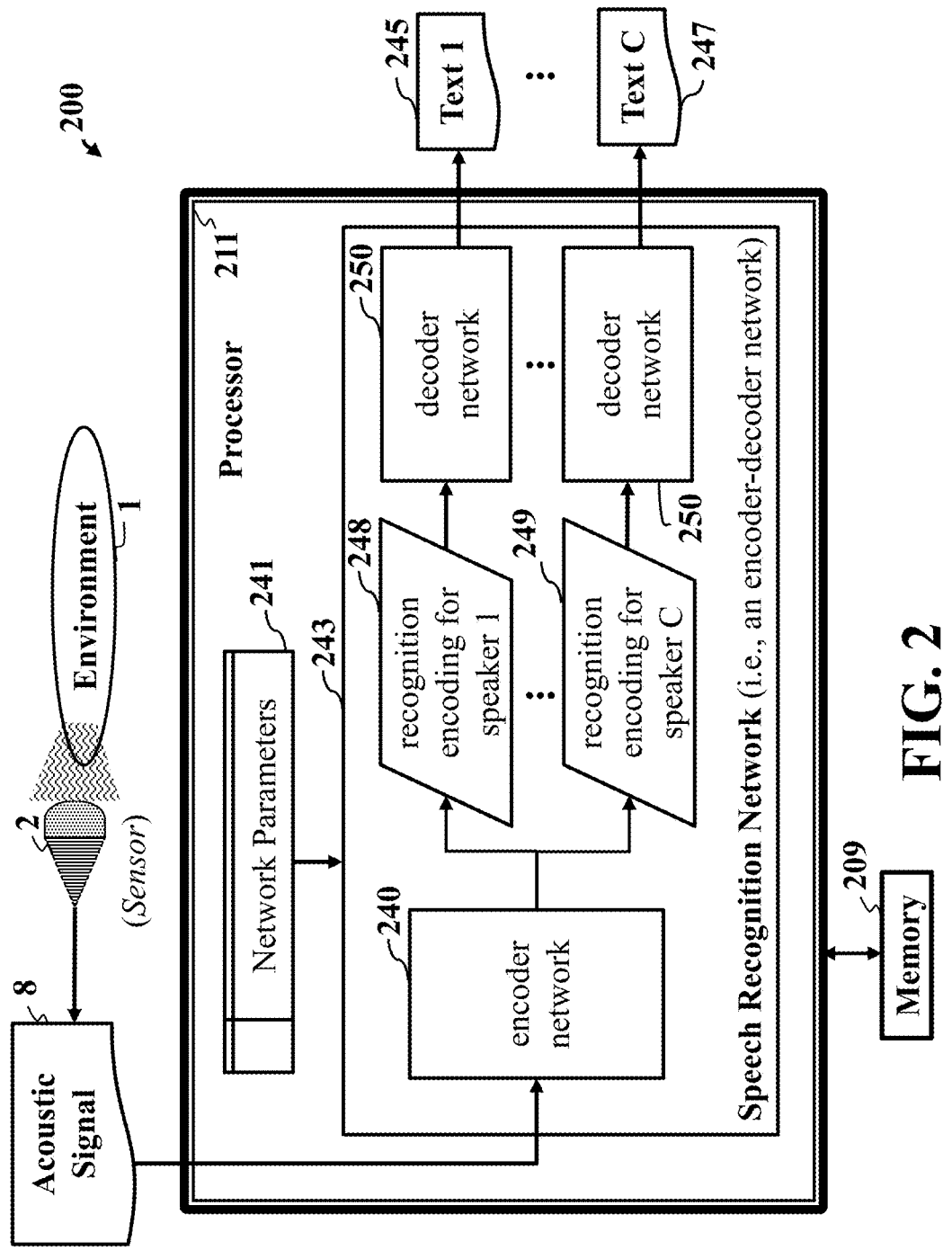
FIG. 2 is a block diagram illustrating end-to-end recognition of speech by multiple speakers speaking simultaneously, that includes a speech recognition network (also referred to as an encoder-decoder network) that is pre-trained, wherein the encoder-decoder network includes an encoder network and a decoder network, wherein the encoder network outputs a recognition encoding for each speaker, and the decoder network uses the recognition encoding for each speaker to output text for that speaker, according to embodiments of the present disclosure.

FIG. 2 is a block diagram illustrating end-to-end recognition of speech by multiple speakers speaking simultaneously, that includes a speech recognition network, i.e., an encoder-decoder network, wherein the encoder-decoder network includes an encoder network and a decoder network, wherein the encoder network outputs a recognition encoding for each speaker, and the decoder network uses the recognition encoding for each speaker to output text for that speaker, according to embodiments of the present disclosure.

Still referring to FIG. 2, FIG. 2 illustrates some of the features as described in claim 2. A speech recognition network, i.e., an encoder-decoder network 243 processes the acoustic signal 8 by using an encoder network 240 to output a recognition encoding for each speaker, from recognition encoding for speaker 1 248 to recognition encoding for speaker C 259, for the case where there are C target speakers. Each recognition encoding is separately processed by a decoder network 250 to output text for the corresponding target speaker. In particular, recognition encoding for speaker 1 248 is processed by the decoder network 250 to output Text 1 245, and recognition encoding for speaker C 249 is processed by the decoder network 250 to output Text C 147. The encoder network 240 and decoder network 250 use stored network parameters 241.

Figure 3:
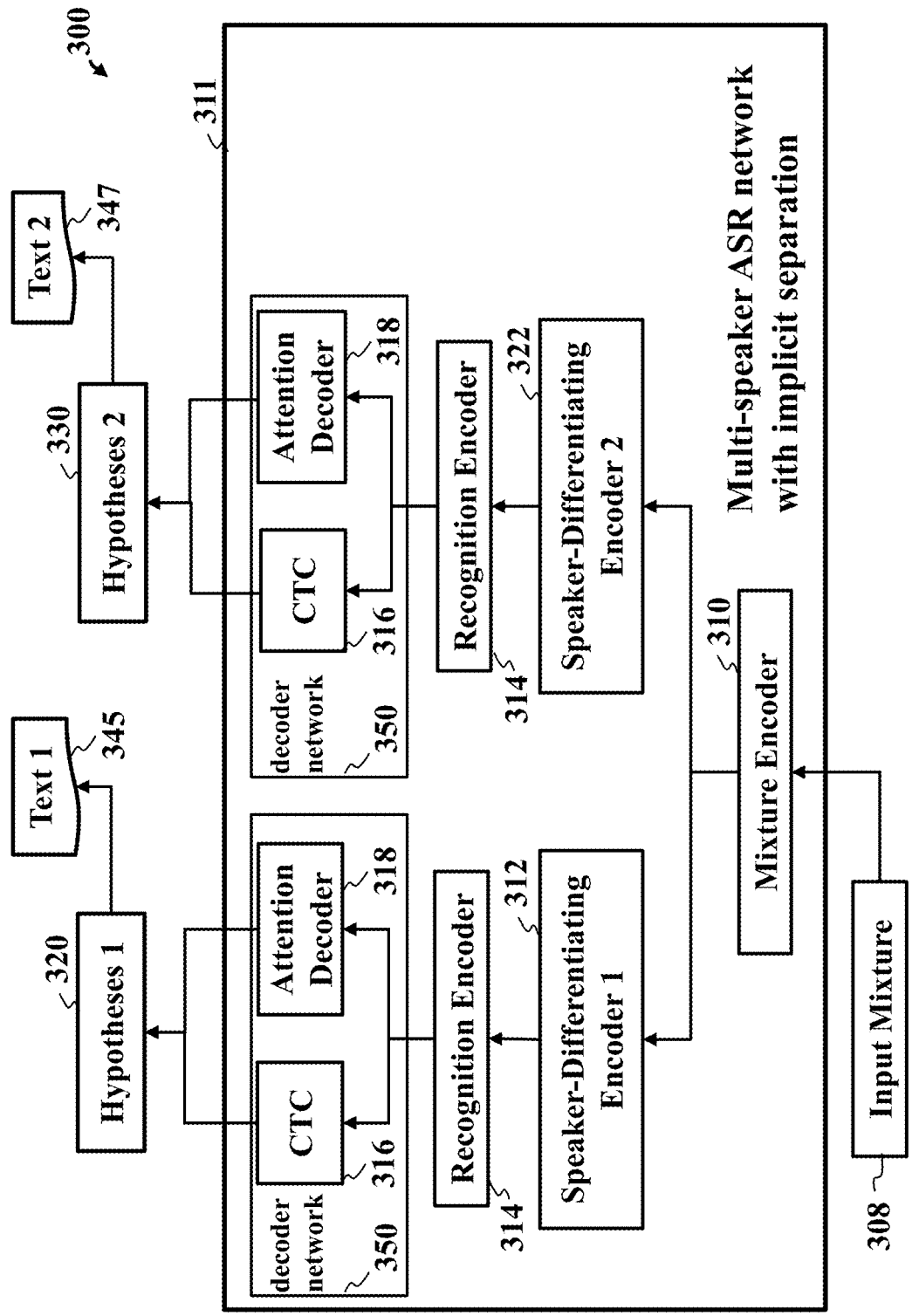
FIG. 3 is a flow diagram illustrating end-to-end recognition of speech by multiple speakers speaking simultaneously, that includes a multi-speaker ASR network with implicit separation, according to embodiments of the present disclosure.

FIG. 3 is a flow diagram illustrating end-to-end recognition of speech by multiple speakers speaking simultaneously, that includes a multi-speaker ASR network with implicit separation, according to embodiments of the present disclosure. FIG. 3 illustrates some of the features as described in claim 3. The input mixture 308 is processed by a mixture encoder 310 into a mixture encoding. The figure illustrates concepts using as example the case of two target speakers. The mixture encoding is further processed separately by a speaker-differentiating encoder 1 312 and a speaker-differentiating encoder 2 322, leading to speaker-differentiated encodings. Each speaker-differentiated encoding is separately further processed by a recognition encoder 314, each leading to a recognition encoding. Each recognition encoding is separately further processed by both a CTC module 316 and an attention decoder 318 of a decoder network 350. The outputs of the CTC module 316 and the attention decoder 318 for the pipeline starting with the speaker-differentiating encoder 1 312 are combined to output a set of hypotheses 1 320, and the outputs of the CTC module 316 and the attention decoder 318 for the pipeline starting with the speaker-differentiating encoder 2 322 are combined to output a set of hypotheses 2 330. Text 1 345 is output from the set of hypotheses 1 320. Text 2 347 is output from the set of hypotheses 2 330.

Figure 4:
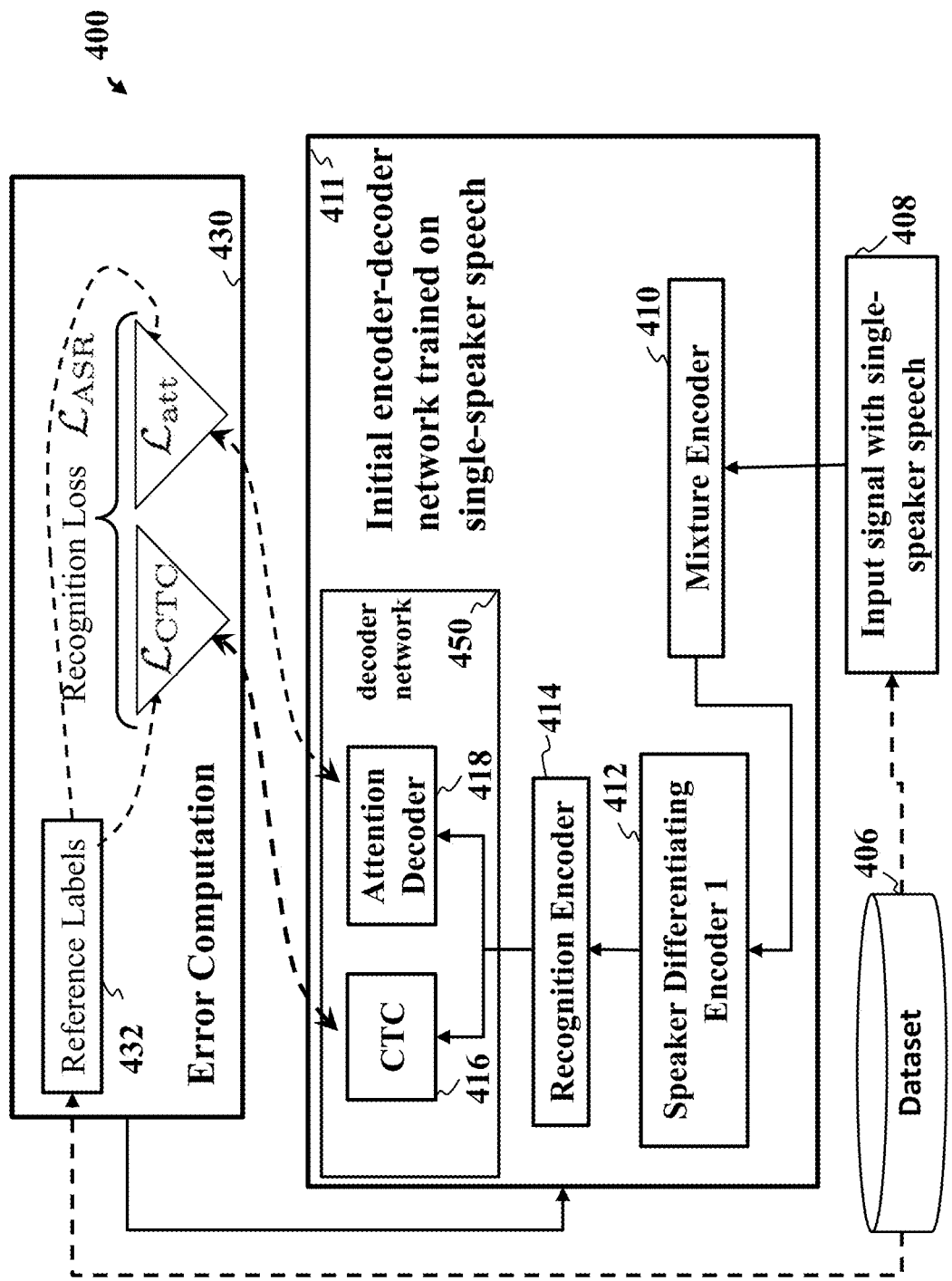
FIG. 4 is a flow diagram illustrating training of an initial speech recognition network, i.e., an encoder-decoder network, that uses datasets including acoustic signals with speech by a single speaker and corresponding text labels, wherein the training includes an error computation, according to embodiments of the present disclosure.

FIG. 4 is a flow diagram illustrating training of an initial speech recognition network, i.e., an encoder-decoder network, that uses datasets including acoustic signals with speech by a single speaker and corresponding text labels, wherein the training includes an error computation, according to embodiments of the present disclosure. FIG. 4 illustrates some of the features as described in claim 4. An input signal with single-speaker speech 408 and the corresponding Reference Labels 432 are sampled from the Dataset 406. A Mixture Encoder 410 processes the input signal with single-speaker speech 408, outputting a mixture encoding. The mixture encoding is then processed by a Speaker-differentiating Encoder 1 412, outputting a speaker-differentiated encoding. The speaker-differentiated encoding is then processed by a Recognition Encoder 414, outputting a recognition encoding. The recognition encoding is further processed by a CTC module 416 and an Attention Decoder 418 of a decoder network 450. The Error Computation module 430 uses the output of the CTC module 416 and the Reference Labels 432 to compute a CTC loss, and uses the output of the Attention Decoder 418 and the Reference Labels 432 to compute an Attention loss. A weighted combination of the CTC loss $\mathcal{L}_{CTC}$ and the Attention loss $\mathcal{L}_{att}$ is a Recognition loss $\mathcal{L}_{ASR}$, which is used to compute updates for the parameters of the initial encoder-decoder network trained on single-speaker speech 411. Typically, a batch of multiple pairs of input signal with single-speaker speech 408 and corresponding Reference Labels 432 are sampled from the Dataset 406 and processed as above, and the sum of the Recognition losses over the multiple pairs within the batch is used to compute updates for the parameters of the initial encoder-decoder network trained on single-speaker speech 411. Such updates can be obtained based on the gradient of the Recognition loss with respect to the parameters.

Figure 5:
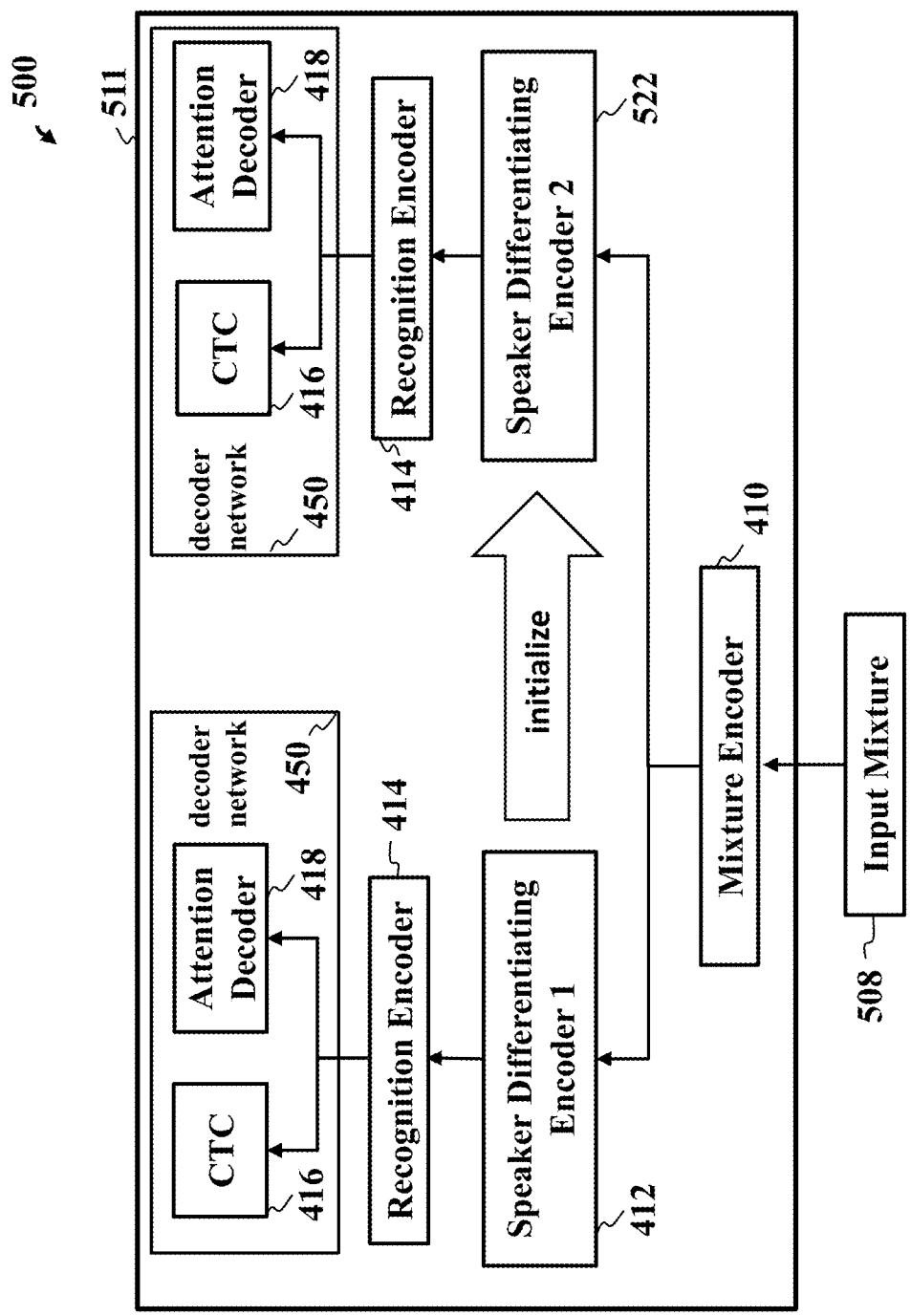
FIG. 5 is a flow diagram illustrating initializing of a speech recognition network, i.e., an encoder-decoder network, with a set of speaker-differentiating encoder networks using an initial speech recognition network, based on the initialization of speaker-differentiating encoder networks in the set of speaker-differentiating encoder networks using the speaker-differentiating encoder network of the initial speech recognition network, according to embodiments of the present disclosure.

FIG. 5 is a flow diagram illustrating initializing of a speech recognition network, i.e., an encoder-decoder network, including a set of speaker-differentiating encoder networks that uses an initial speech recognition network, based on the initialization of speaker-differentiating encoder networks in the set of speaker-differentiating encoder networks using the speaker-differentiating encoder network of the initial speech recognition network, according to embodiments of the present disclosure. Parameters of the Speaker-Differentiating Encoder 2 522 of the speech recognition network 511 can be obtained from the Speaker-Differentiating Encoder 1 412 of FIG. 4 by copying its parameters, optionally perturbing them, for example using random perturbations. All other parameters of speech recognition network 511 can be initialized using the parameters of the corresponding component of FIG. 4. After such initialization, an Input Mixture 508 can then be processed as in FIG. 3.

Figure 6:
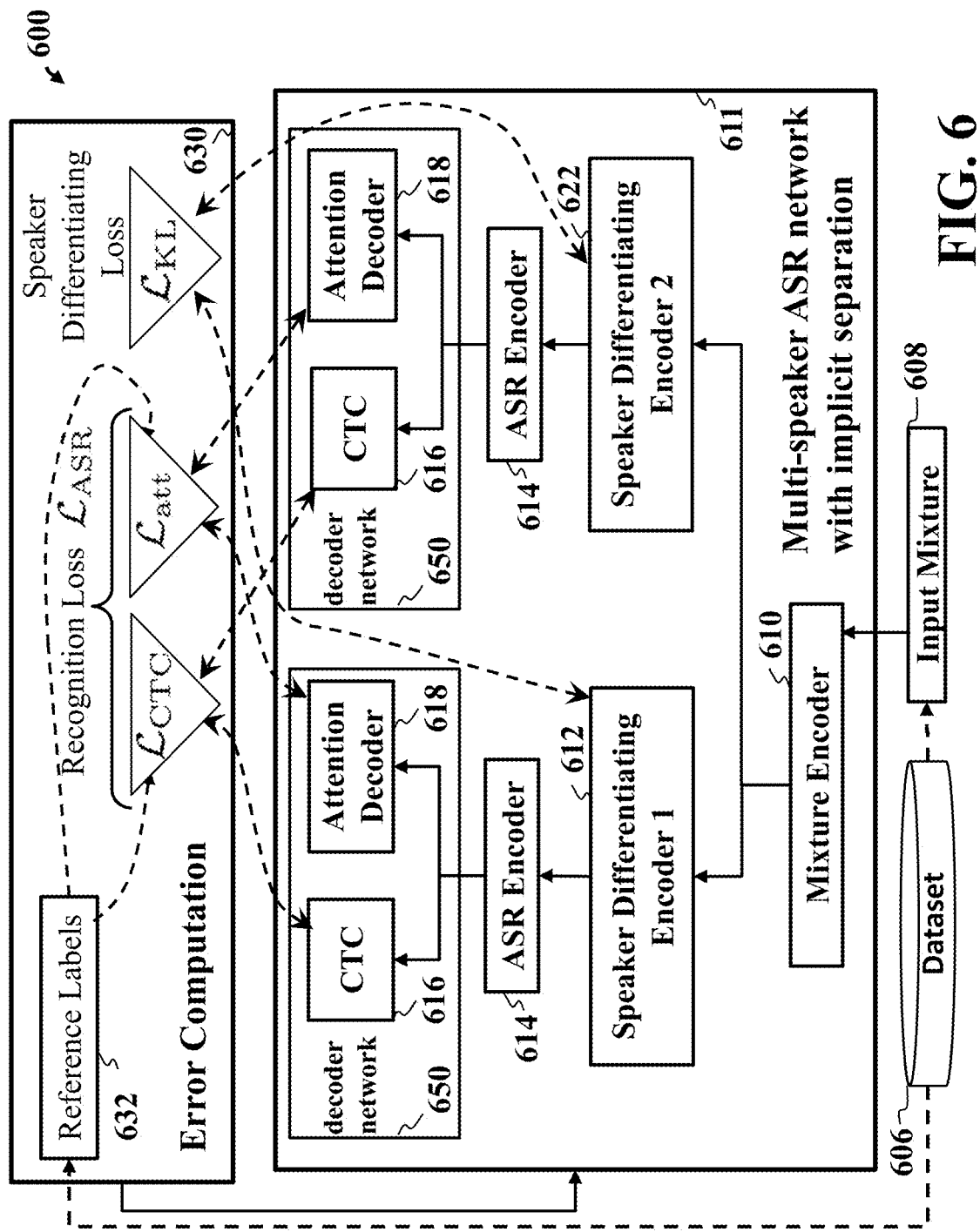
FIG. 6 is a flow diagram illustrating training of a multi-speaker ASR network with implicit separation for end-to-end recognition of speech by multiple speakers speaking simultaneously, wherein training includes an error computation, according to embodiments of the present disclosure.

FIG. 6 is a flow diagram illustrating training of a multi-speaker ASR network with implicit separation for end-to-end recognition of speech by multiple speakers speaking simultaneously, wherein training includes an error computation, according to embodiments of the present disclosure. An Input Mixture 608 and the corresponding Reference Labels 632 are sampled from the Dataset 606. A Mixture Encoder 610 processes the Input Mixture 608, outputting a mixture encoding. The mixture encoding is further processed separately by a speaker-differentiating encoder 1 612 and a speaker-differentiating encoder 2 622, leading to speaker-differentiated encodings. Each speaker-differentiated encoding is separately further processed by a recognition encoder 614, each leading to a recognition encoding. Each recognition encoding is separately further processed by both a CTC module 616 and an attention decoder 618 of a decoder network 650. The Error Computation module 630 uses both outputs of the CTC module 616 and the Reference Labels 632 to compute a CTC loss $\mathcal{L}_{ctc}$, and uses both outputs of the Attention Decoder 618 and the Reference Labels 632 to compute an Attention loss $\mathcal{L}_{att}$. A weighted combination of the CTC loss and the Attention loss is a Recognition loss $\mathcal{L}_{ASR}$. The Error Computation module 630 also uses the outputs of the speaker-differentiating encoder 1 612 and the speaker-differentiating encoder 2 622 to compute a speaker-differentiating loss $\mathcal{L}_{KL}$. A weighted combination of the Recognition loss and the speaker-differentiating loss is used to compute updates for the parameters of the multi-speaker ASR network with implicit separation 611.

Figure 7:
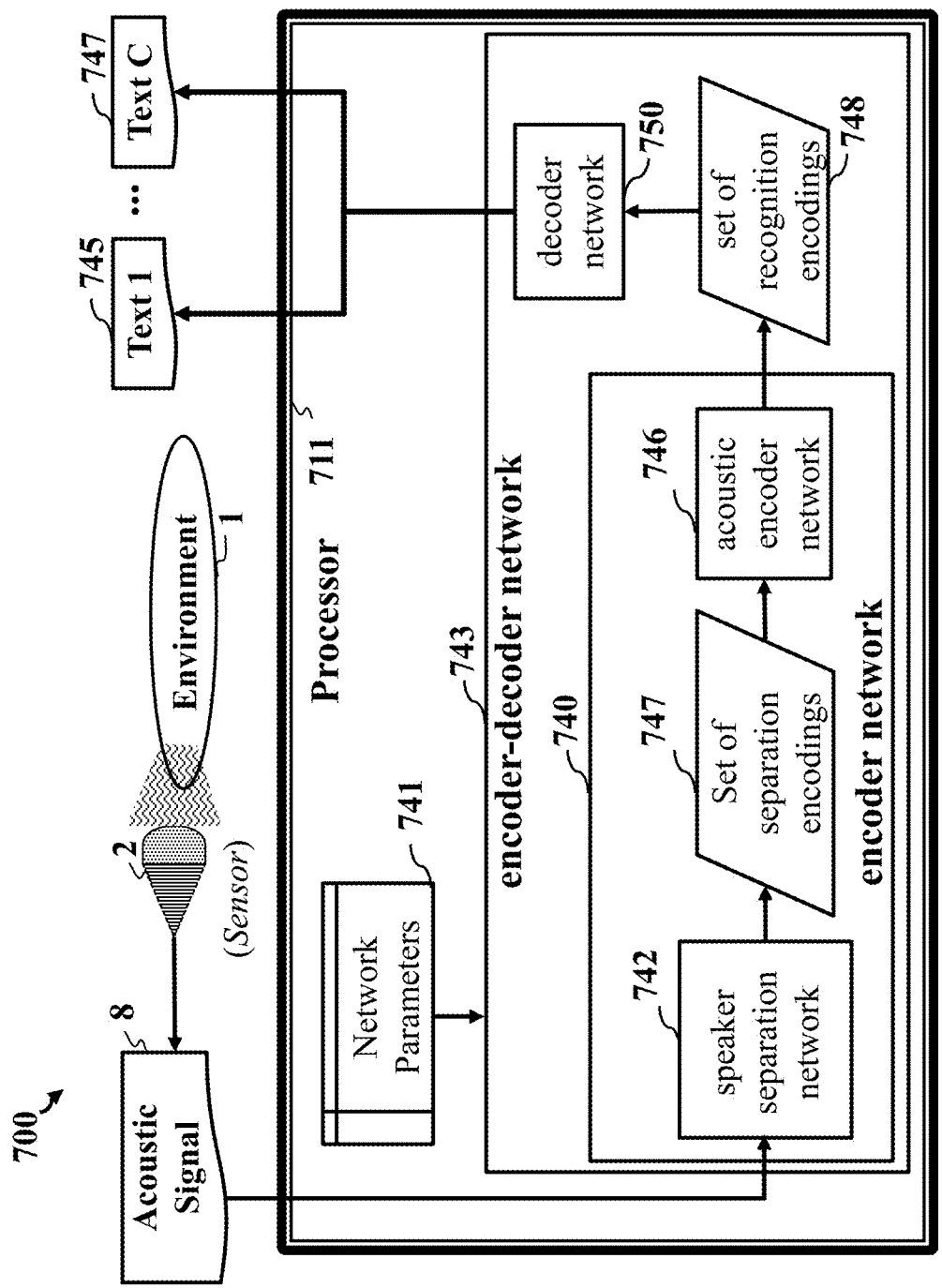
FIG. 7 is a flow diagram illustrating another method for end-to-end recognition of speech by multiple speakers speaking simultaneously, that includes a multi-speaker ASR network with explicit separation, according to embodiments of the present disclosure.

FIG. 7 is a flow diagram illustrating another method for end-to-end recognition of speech by multiple speakers speaking simultaneously, that includes a multi-speaker ASR network with explicit separation, according to embodiments of the present disclosure. An encoder-decoder network 743 processes the acoustic signal 8 by using an encoder network 740 to output a set of recognition encodings 748, further processed by a decoder network 750 to output text for each target speaker, from Text 1 745 to Text C 747 for the case where there are C target speakers. The encoder network 740 includes a speaker separation network 742 which processes the acoustic signal 8 to output a set of separation encodings 747, and an acoustic encoder network 746 which processes the set of separation encodings 747 to output the set of recognition encodings 748. Network parameters 841 specify the parameters of the speaker separation network 742, the acoustic encoder network 746, and the decoder network 750.

Figure 8:
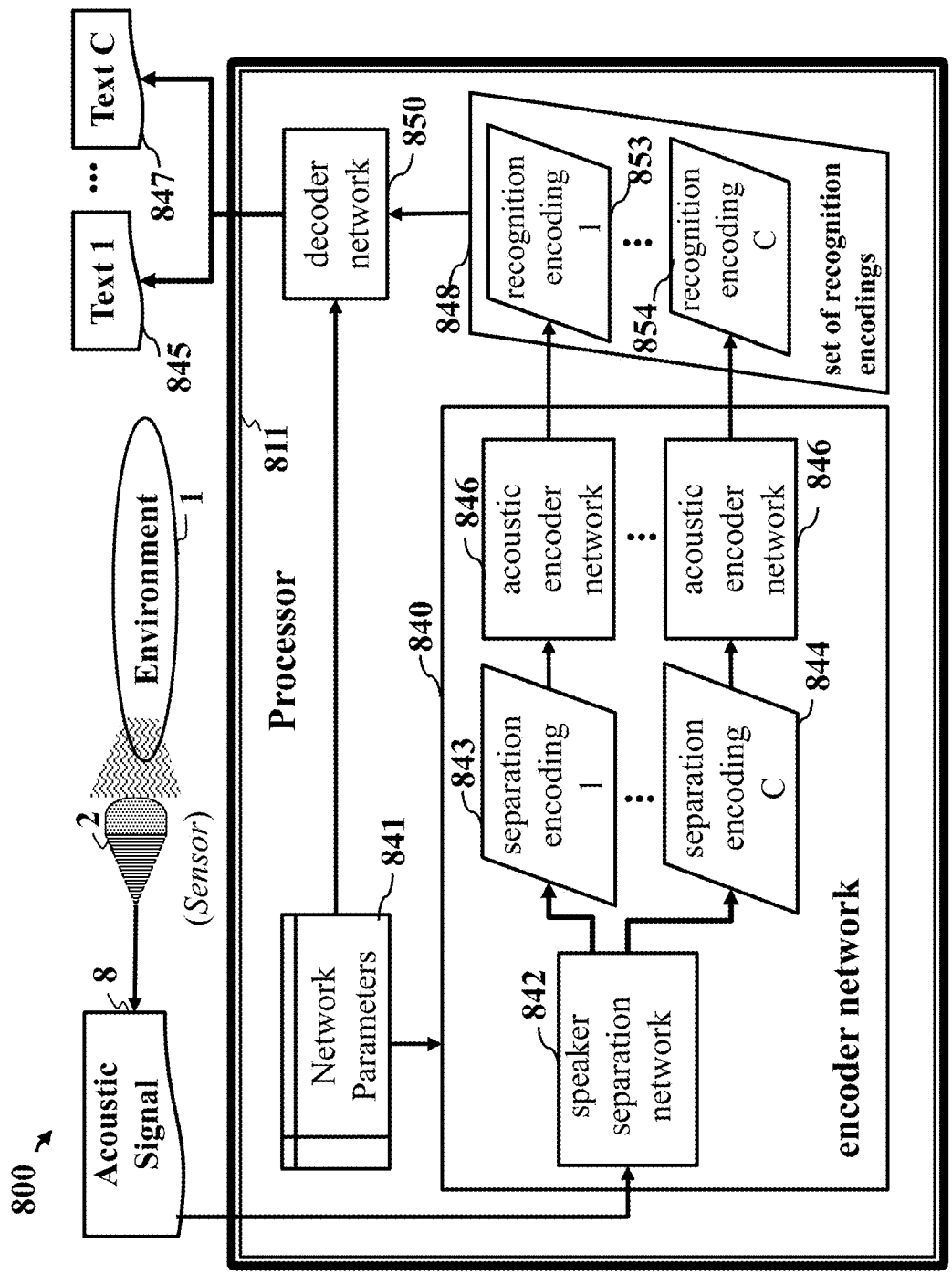
FIG. 8 is a flow diagram illustrating another method for end-to-end recognition of speech by multiple speakers speaking simultaneously, that includes a multi-speaker ASR network with explicit separation, wherein the multi-speaker ASR network includes a speaker separation network outputting a separation encoding for each target speaker, an acoustic encoder network outputting a recognition encoding for each target speaker from the separation encoding for that target speaker, and a decoder network outputting a text for each target speaker from the set of recognition encodings, according to embodiments of the present disclosure.

FIG. 8 is a flow diagram illustrating another method for end-to-end recognition of speech by multiple speakers speaking simultaneously, that includes a multi-speaker ASR network with explicit separation, wherein the multi-speaker ASR network includes a speaker separation network outputting a separation encoding for each target speaker, an acoustic encoder network outputting a recognition encoding for each target speaker from the separation encoding for that target speaker, and a decoder network outputting a text for each target speaker from the set of recognition encodings, according to embodiments of the present disclosure. An encoder network 840 processes the acoustic signal 8 to output a set of recognition encodings 848, further processed by a decoder network 850 to output text for each target speaker, from Text 1 845 to Text C 847 for the case where there are C target speakers. The encoder network 840 includes a speaker separation network 842 and an acoustic encoder network 746. The speaker separation network 842 processes the acoustic signal 8 to output a separation encoding for each target speaker, from separation encoding 1 843 to separation encoding C 844. The acoustic encoder network 846 processes each separation encoding separately to output a corresponding recognition encoding, with separation encoding 1 843 being processed by the acoustic encoder network 746 to output recognition encoding 1 853 and separation encoding C 844 being processed by the acoustic encoder network 846 to output recognition encoding C 854. The set of recognition encodings 848 includes recognition encoding 1 853 to recognition encoding C 854. Network parameters 841 specify the parameters of the speaker separation network 842, the acoustic encoder network 846, and the decoder network 850. The separation encodings can, for example and without limitation, be in the form of sequences of feature vectors that correspond to an estimate of the speech of the corresponding target speaker if that speech were to have been observed in isolation.

Figure 9A:
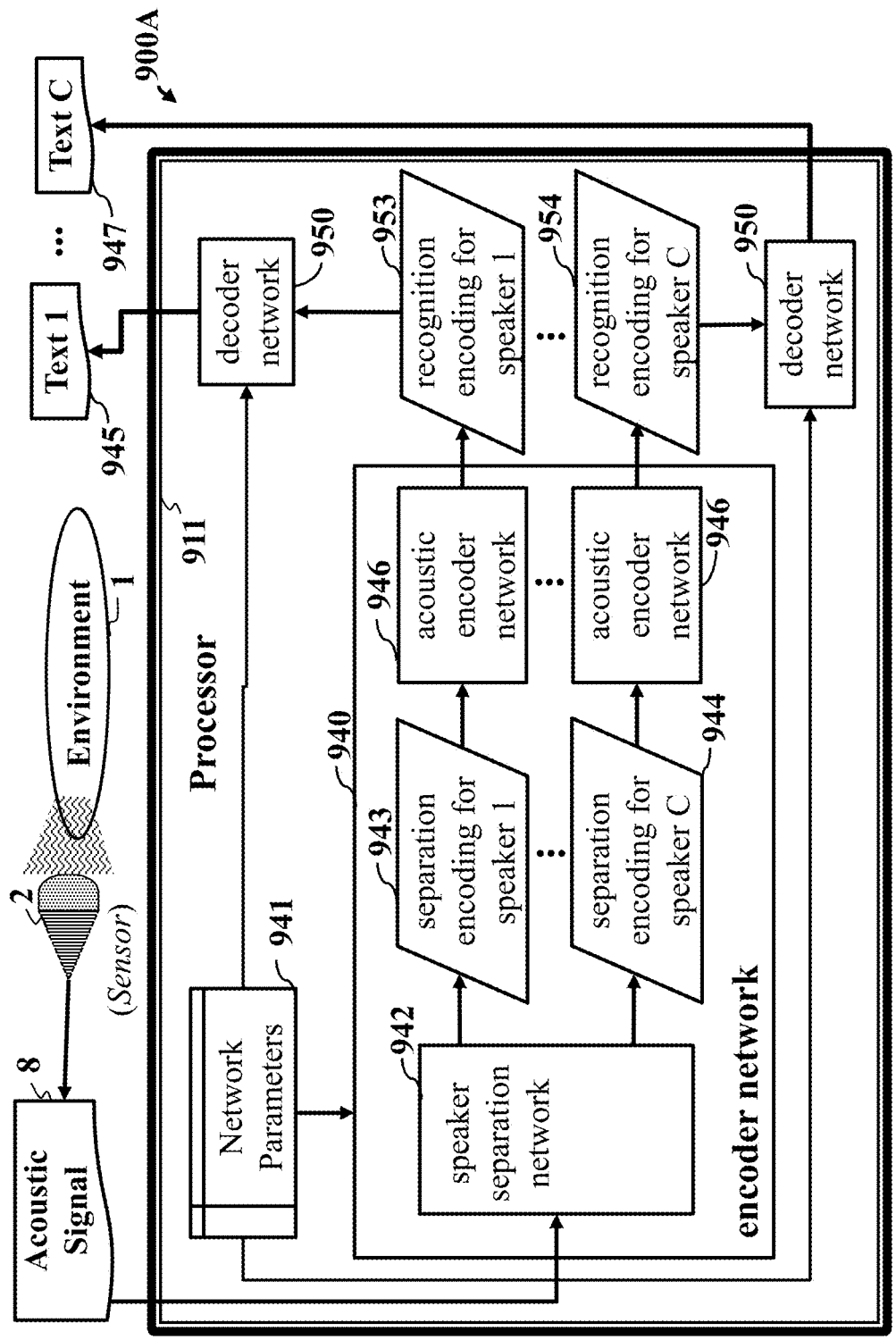
FIG. 9A is a flow diagram illustrating another method for end-to-end recognition of speech by multiple speakers speaking simultaneously, that includes a multi-speaker ASR network with explicit separation, wherein the multi-speaker ASR network includes a speaker separation network outputting a separation encoding for each target speaker, an acoustic encoder network outputting a recognition encoding for each target speaker from the separation encoding for that target speaker, and a decoder network outputting a text for each target speaker from the recognition encoding for that target speaker, according to embodiments of the present disclosure.

FIG. 9A is a flow diagram illustrating another method for end-to-end recognition of speech by multiple speakers speaking simultaneously, that includes a multi-speaker ASR network with explicit separation, wherein the multi-speaker ASR network includes a speaker separation network outputting a separation encoding for each target speaker, an acoustic encoder network outputting a recognition encoding for each target speaker from the separation encoding for that target speaker, and a decoder network outputting a text for each target speaker from the recognition encoding for that target speaker, according to embodiments of the present disclosure. An encoder network 940 includes a speaker separation network 942 and an acoustic encoder network 946. The speaker separation network 942 processes the acoustic signal 8 to output a separation encoding for each target speaker, from separation encoding 1 943 to separation encoding C 944 for the case where there are C target speakers. The acoustic encoder network 946 processes each separation encoding separately to output a corresponding recognition encoding, with separation encoding 1 943 being processed by the acoustic encoder network 946 to output recognition encoding 1 953 and separation encoding C 944 being processed by the acoustic encoder network 946 to output recognition encoding C 954. The recognition encodings are each further processed separately by a decoder network 950 to output text for each target speaker, with recognition encoding 1 953 being processed by the decoder network 950 to output Text 1 945 and recognition encoding C 954 being processed by the decoder network 950 to output Text C 947. Network parameters 941 specify the parameters of the speaker separation network 942, the acoustic encoder network 946, and the decoder network 950.

Figure 9B:
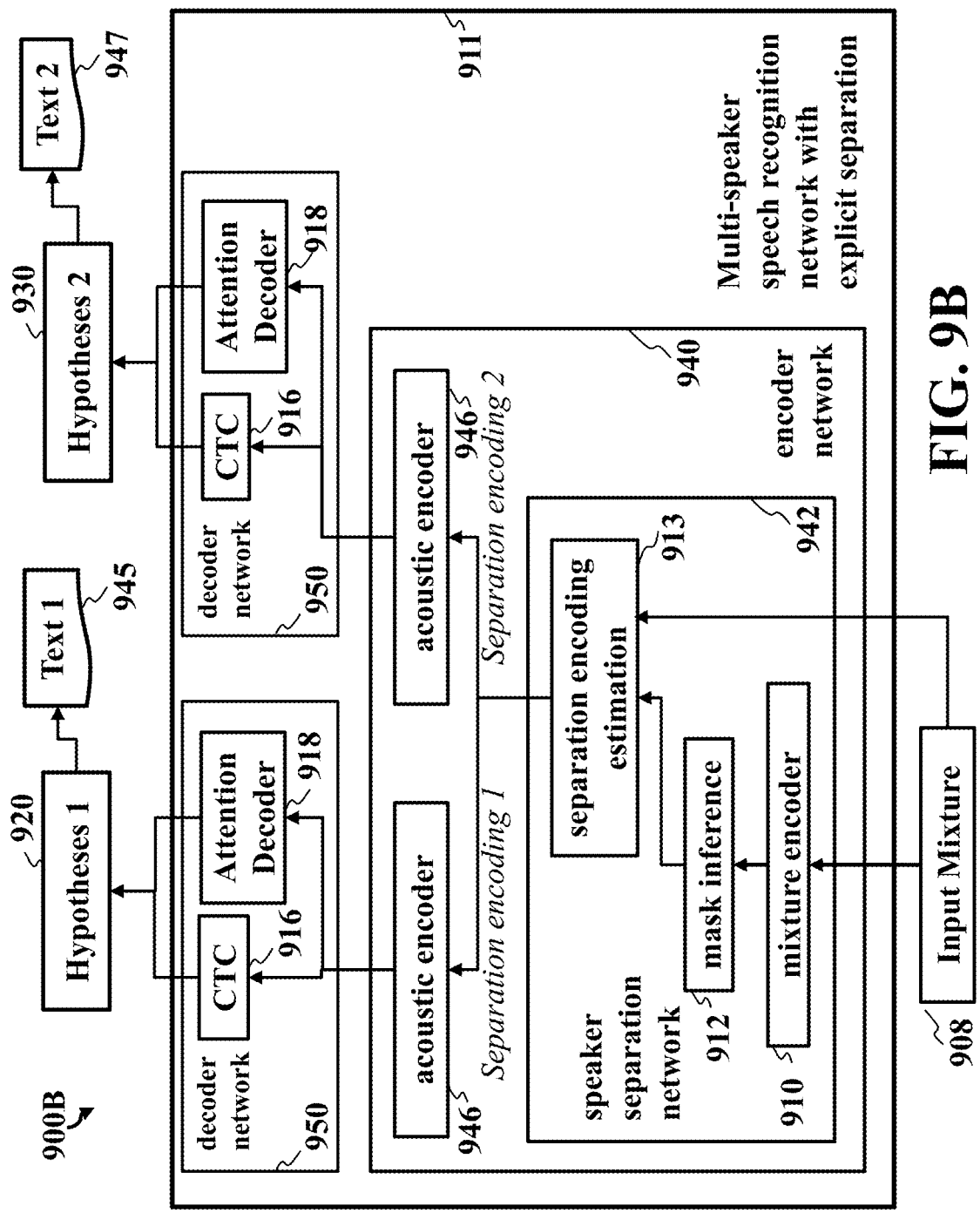
FIG. 9B is a flow diagram illustrating end-to-end recognition of speech by multiple speakers speaking simultaneously, that includes a multi-speaker ASR network with explicit separation, wherein the explicit separation involves mask inference, according to embodiments of the present disclosure.

FIG. 9B is a flow diagram illustrating end-to-end recognition of speech by multiple speakers speaking simultaneously, that includes a multi-speaker ASR network with explicit separation, wherein the explicit separation involves mask inference, according to embodiments of the present disclosure. The figure illustrates concepts using as example the case of two target speakers. The input mixture 908 is processed by a speaker separation network 942 to output a separation encoding for each target speaker.

The speaker separation network 942 includes a mixture encoder 910, a mask inference module 912, and a separation encoding estimation module 913. The mixture encoder 910 processes the input mixture 908 to output a mixture encoding. The mixture encoding is further processed by a mask inference module 912, which estimates a set of masks. The set of masks is used together with the input mixture by the separation encoding estimation module 913 to obtain separation encodings for each target speaker. For example, the mask inference module 912 can output a mask for each target speaker, and the separation encoding estimation module can apply the mask for a target speaker to a representation of the input mixture to obtain a representation of an estimate of the separated signal for that target speaker. The representation can for example be a time-frequency representation of the input mixture such as the short-time Fourier transform, in which case the mask is applied to the short-time Fourier transform of the input mixture to obtain an estimate of the short-time Fourier transform of the separated signal for that target speaker, which is an estimate of short-time Fourier transform of what the isolated signal for that target speaker would have been if it had been observed in isolation. Each separation encoding is separately further processed by an acoustic encoder 946, each leading to a recognition encoding.

Still referring to FIG. 9B, each recognition encoding is separately further processed by both a CTC module 916 and an attention decoder 918. The outputs of the CTC module 916 and the attention decoder 918 are combined to output a set of hypotheses 1 920 for the pipeline taking separation encoding 1 for a first target speaker as input, and to a set of hypotheses 2 930 for the pipeline starting with separation encoding 2 for a second target speaker as input. Text 1 945 is output from the set of hypotheses 1 920. Text 2 947 is output from the set of hypotheses 2 930.

Figure 10:
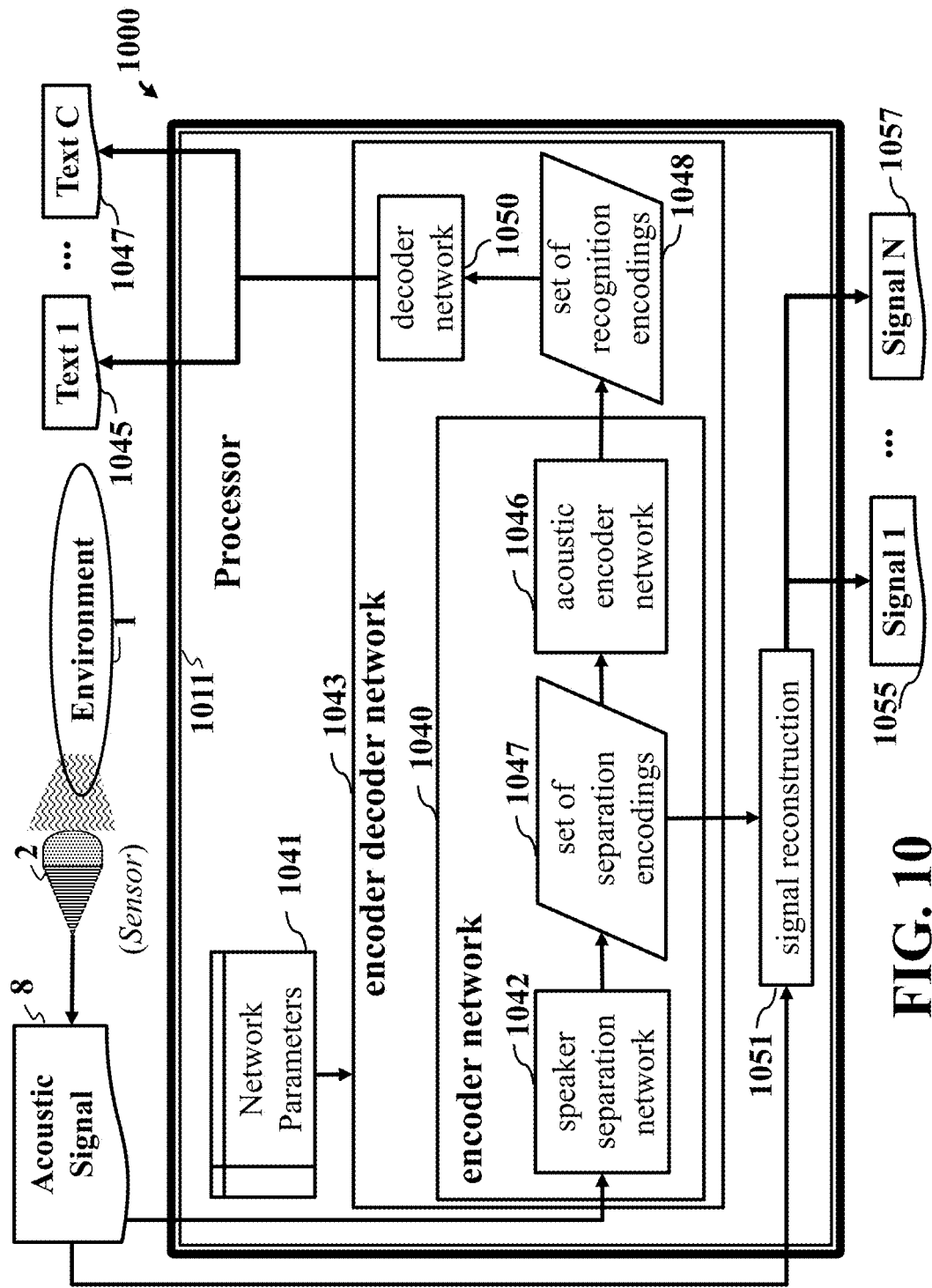
FIG. 10 is a flow diagram illustrating end-to-end separation and recognition of speech by multiple speakers speaking simultaneously, according to embodiments of the present disclosure.

FIG. 10 is a flow diagram illustrating end-to-end separation and recognition of speech by multiple speakers speaking simultaneously, according to embodiments of the present disclosure. An encoder-decoder network 1043 processes the acoustic signal 8 by using an encoder network 1040 to output a set of recognition encodings 1048, further processed by a decoder network 1050 to output text for each target speaker, from Text 1 1045 to Text C 1047 for the case where there are C target speakers. The encoder network 1040 includes a speaker separation network 1042 which processes the acoustic signal 8 to output a set of separation encodings 1047, and an acoustic encoder network 1046 which processes the set of separation encodings 1047 to output the set of recognition encodings 1048. Network parameters 1041 specify the parameters of the speaker separation network 1042, the acoustic encoder network 1046, and the decoder network 1050. The set of separation encodings 1047 can be used, together with the acoustic signal 8, by a signal reconstruction module 1051, to output an estimate of the separated signal for each target speaker, from signal 1 1055 to signal C 1057. The estimated separated signals are an estimate of what the signal for that speaker would have been like if it had been observed in isolation. For example, the speaker separation network 1042 can output a set of separation encodings 1047 in the form of estimated magnitude spectrograms in the magnitude short-time Fourier transform domain for each target speaker. The magnitude spectrograms for each target speaker can be combined with the phase of the acoustic signal 8 to obtain an estimated complex spectrogram for each target speaker, from which a time-domain signal can be reconstructed by inverse short-time Fourier transform.

Figure 11A:
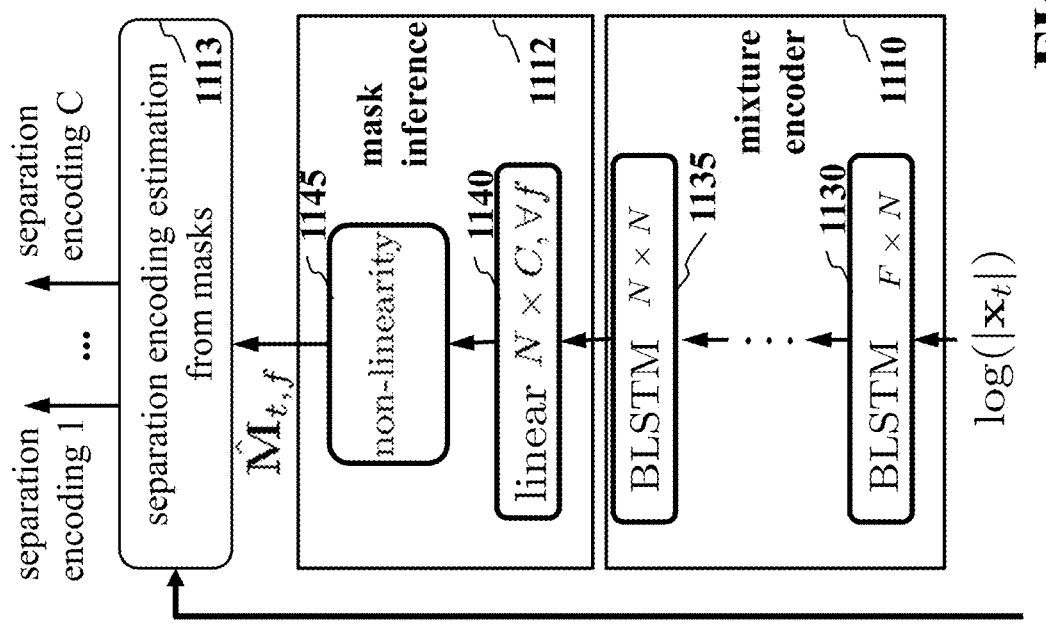
FIG. 11A is a block diagram illustrating a single-channel mask inference network architecture, according to embodiments of the present disclosure.

FIG. 11A is a block diagram illustrating a single-channel mask inference network architecture, according to embodiments of the present disclosure. A sequence of feature vectors obtained from the input mixture, for example the log magnitude of the short-time Fourier transform of the input mixture, is used as input to a mixture encoder 1110. For example, the dimension of the input vector in the sequence can be F. The mixture encoder 1110 is composed of multiple bidirectional long short-term memory (BLSTM) neural network layers, from the first BLSTM layer 1130 to the last BLSTM layer 1135. Each BLSTM layer is composed of a forward long short-term memory (LSTM) layer and a backward LSTM layer, whose outputs are combined and use as input by the next layer. For example, the dimension of the output of each LSTM in the first BLSTM layer 1130 can be N, and both the input and output dimensions of each LSTM in all other BLSTM layers including the last BLSTM layer 1135 can be N. The output of the last BLSTM layer 1135 is used as input to a mask inference module 1112, including a linear neural network layer 1140 and a non-linearity 1145. For each time frame and each frequency in a time-frequency domain, for example the short-time Fourier transform domain, the linear layer 1140 uses output of the last BLSTM layer 1135 to output C numbers, where C is the number of target speakers. The non-linearity 1145 is applied to this set of C numbers for each time frame and each frequency, leading to mask values which indicate, for each time frame, each frequency, and each target speaker, the dominance of that target speaker in the input mixture at that time frame and that frequency. A separation encoding estimation from masks module 1113 uses these masks, together with a representation of the input mixture in the time-frequency domain for which the masks were estimated, for example the magnitude short-time Fourier transform domain, to output separation encodings for each target speaker. For example, the separation encoding estimation from masks module 1113 can multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

Figure 11B:
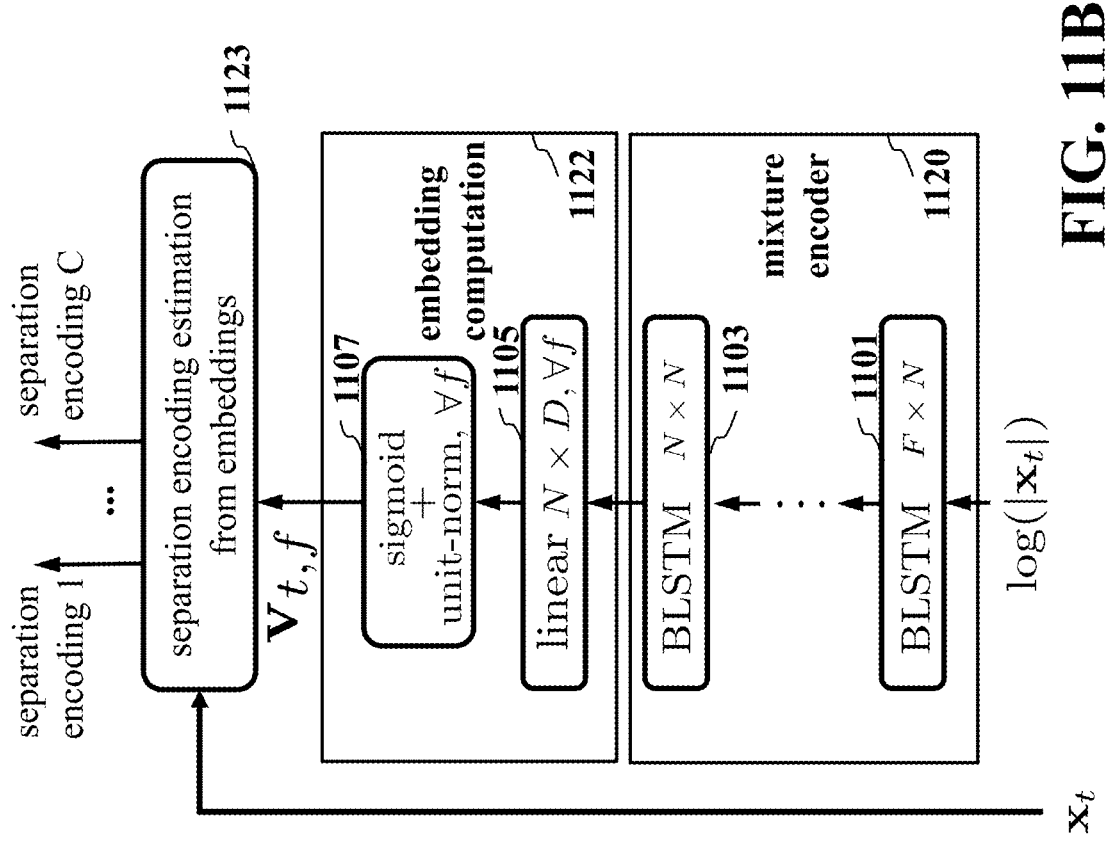
FIG. 11B is a block diagram illustrating a single-channel deep clustering network architecture, according to embodiments of the present disclosure.

FIG. 11B is a block diagram illustrating a single-channel deep clustering network architecture, according to embodiments of the present disclosure. A sequence of feature vectors obtained from the input mixture, for example the log magnitude of the short-time Fourier transform of the input mixture, is used as input to a mixture encoder 1120. For example, the dimension of the input vector in the sequence can be F. The mixture encoder 1120 is composed of multiple bidirectional long short-term memory (BLSTM) neural network layers, from the first BLSTM layer 1101 to the last BLSTM layer 1103. Each BLSTM layer is composed of a forward long short-term memory (LSTM) layer and a backward LSTM layer, whose outputs are combined and use as input by the next layer. For example, the dimension of the output of each LSTM in the first BLSTM layer 1101 can be N, and both the input and output dimensions of each LSTM in all other BLSTM layers including the last BLSTM layer 1103 can be N. The output of the last BLSTM layer 1103 is used as input to an embedding computation module 1122, including a linear neural network layer 1105 and a module implementing a sigmoid non-linearity followed by a unit-norm normalization 1107. For each time frame and each frequency in a time-frequency domain, for example the short-time Fourier transform domain, the linear layer 1105 uses output of the last BLSTM layer 1103 to output a D-dimensional vector, where D is an embedding dimension. The module implementing a sigmoid non-linearity followed by a unit-norm normalization 1107 applies a sigmoid to each element of the D-dimension vector, and renormalizes it so that it has unit Euclidean norm, leading to an embedding vector for each time frame and frequency. A separation encoding estimation from embeddings module 1123 uses these embedding vectors, together with a representation of the input mixture in the time-frequency domain for which the embeddings were estimated, for example the magnitude short-time Fourier transform domain, to output separation encodings for each target speaker. For example, the separation encoding estimation from embeddings module 1123 can use a clustering algorithm such as the k-means algorithm to cluster the embedding vectors into C groups, where C is the number of target speakers, and each group corresponds to time and frequency components that are dominated by a same speaker. A binary mask can be obtained for each speaker, indicating whether a time and frequency component is dominated by that speaker or not. The separation encoding estimation from embeddings module 1123 can then multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker. More elaborate schemes to obtain such masks using a separation encoding estimation from embeddings module 1123 can also be considered, and the descriptions above shall not be considered limiting in any way.

Figure 11C:
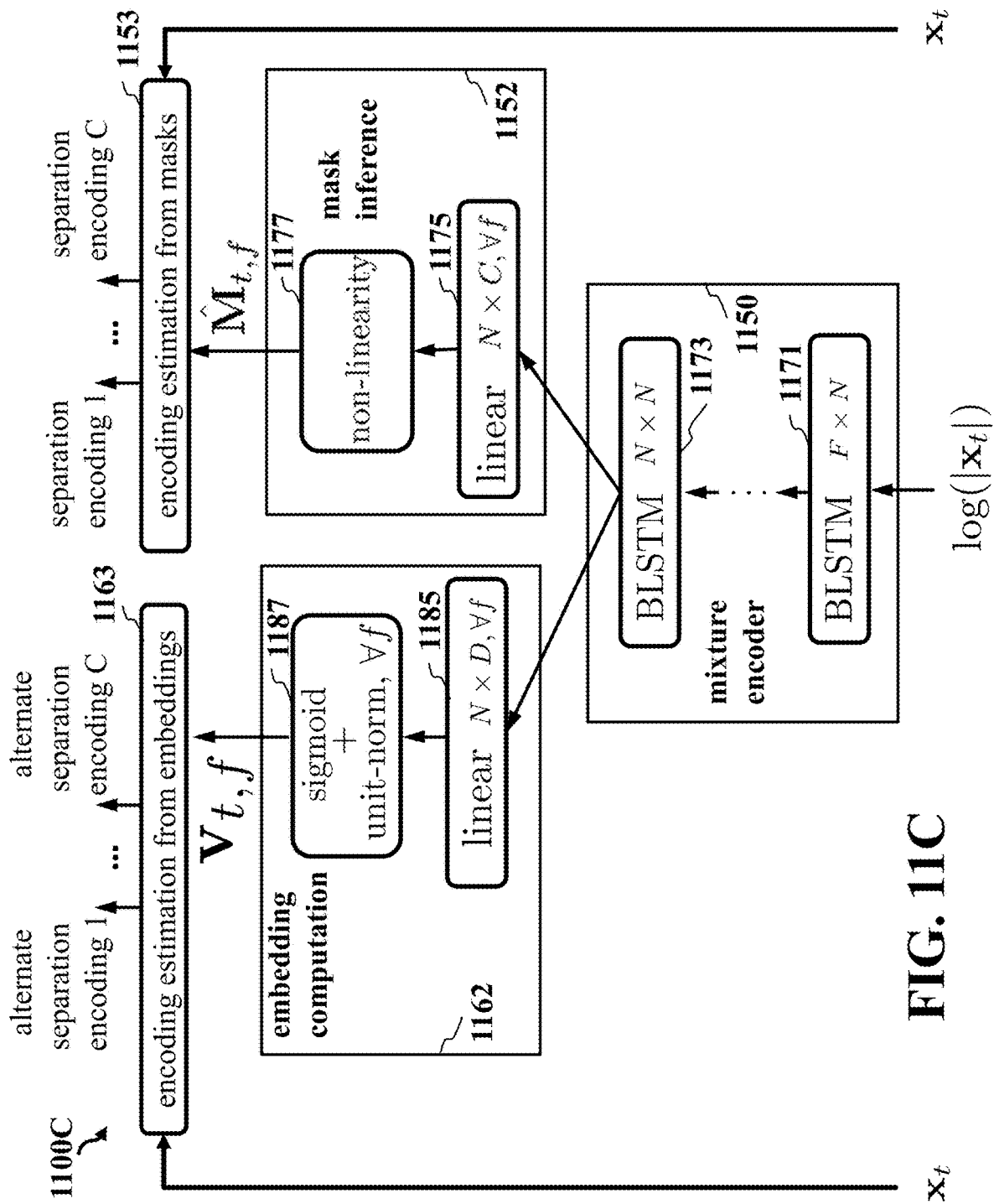
FIG. 11C is a block diagram illustrating a single-channel chimera network architecture, according to embodiments of the present disclosure.

FIG. 11C is a block diagram illustrating a single-channel chimera network architecture, according to embodiments of the present disclosure. A sequence of feature vectors obtained from the input mixture, for example the log magnitude of the short-time Fourier transform of the input mixture, is used as input to a mixture encoder 1150. For example, the dimension of the input vector in the sequence can be F. The mixture encoder 1150 is composed of multiple bidirectional long short-term memory (BLSTM) neural network layers, from the first BLSTM layer 1171 to the last BLSTM layer 1173. Each BLSTM layer is composed of a forward long short-term memory (LSTM) layer and a backward LSTM layer, whose outputs are combined and use as input by the next layer. For example, the dimension of the output of each LSTM in the first BLSTM layer 1171 can be N, and both the input and output dimensions of each LSTM in all other BLSTM layers including the last BLSTM layer 1103 can be N.

The output of the last BLSTM layer 1173 is used as input to a mask inference module 1152, including a linear neural network layer 1175 and a non-linearity 1177. For each time frame and each frequency in a time-frequency domain, for example the short-time Fourier transform domain, the linear layer 1175 uses output of the last BLSTM layer 1173 to output C numbers, where C is the number of target speakers. The non-linearity 1177 is applied to this set of C numbers for each time frame and each frequency, leading to mask values which indicate, for each time frame, each frequency, and each target speaker, the dominance of that target speaker in the input mixture at that time frame and that frequency. A separation encoding estimation from masks module 1153 uses these masks, together with a representation of the input mixture in the time-frequency domain for which the masks were estimated, for example the magnitude short-time Fourier transform domain, to output separation encodings for each target speaker. For example, the separation encoding estimation from masks module 1153 can multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

The output of the last BLSTM layer 1173 can also be used as input to an embedding computation module 1162, including a linear neural network layer 1185 and a module implementing a sigmoid non-linearity followed by a unit-norm normalization 1187. For each time frame and each frequency in a time-frequency domain, for example the short-time Fourier transform domain, the linear layer 1185 uses output of the last BLSTM layer 1173 to output a D-dimensional vector, where D is an embedding dimension. The module implementing a sigmoid non-linearity followed by a unit-norm normalization 1187 applies a sigmoid to each element of the D-dimension vector, and renormalizes it so that it has unit Euclidean norm, leading to an embedding vector for each time frame and frequency. A separation encoding estimation from embeddings module 1163 uses these embedding vectors, together with a representation of the input mixture in the time-frequency domain for which the embeddings were estimated, for example the magnitude short-time Fourier transform domain, to output separation encodings for each target speaker. For example, the separation encoding estimation from embeddings module 1163 can use a clustering algorithm such as the k-means algorithm to cluster the embedding vectors into C groups, where C is the number of target speakers, and each group corresponds to time and frequency components that are dominated by a same speaker. A binary mask can be obtained for each speaker, indicating whether a time and frequency component is dominated by that speaker of not. The separation encoding estimation from embeddings module 1163 can then multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

At training time, the output of the last BLSTM layer 1173 is used as input both to the mask inference module 1152, and to the embedding computation module 1162. One or more of the embeddings outputted by the embedding computation module 1162, the masks outputted by the mask inference module 1152, the separation encodings outputted by the encoding estimation from embeddings module 1163, and the separation encodings outputted by the encoding estimation from masks module 1153, can be used to compute a training error as described in FIG. 12. At test time, one can also use both modules and combine the separation encodings obtained from each, or one can select to proceed with only one module and use the corresponding separation encodings.

Figure 12:
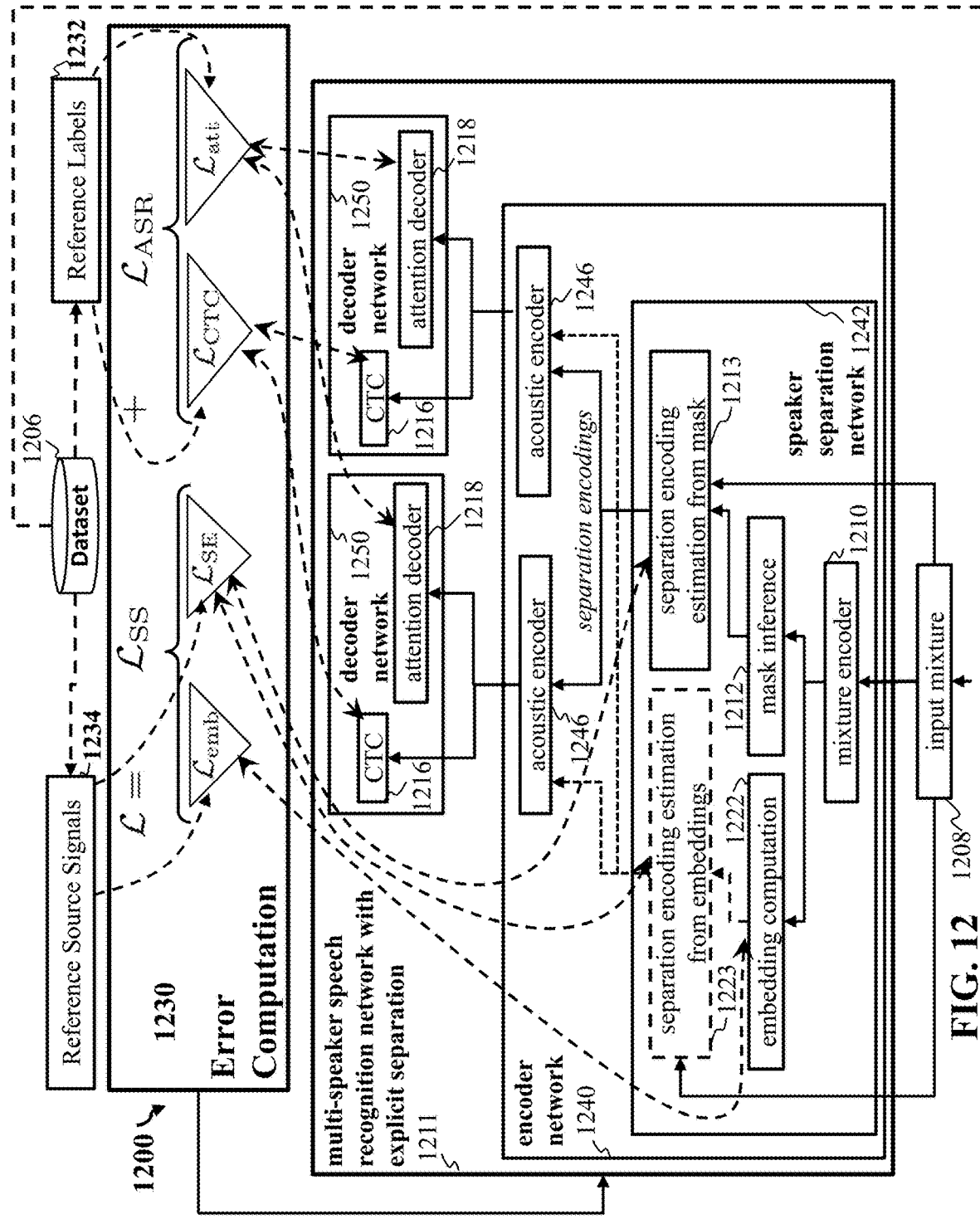
FIG. 12 is a flow diagram illustrating training of a multi-speaker ASR network with explicit separation for end-to-end recognition of speech by multiple speakers speaking simultaneously, wherein training includes an error computation, according to embodiments of the present disclosure.

FIG. 12 is a flow diagram illustrating training of a multi-speaker ASR network with explicit separation for end-to-end recognition of speech by multiple speakers speaking simultaneously, wherein training includes an error computation, according to embodiments of the present disclosure. The figure illustrates concepts using as example the case of two target speakers. The multi-speaker speech recognition network with explicit separation 1211 includes an encoder network 1240 and a decoder network 1250. The encoder network 1240 includes a speaker separation network 1242 and an acoustic encoder network 1246. An Input Mixture 1208 and the corresponding Reference Labels 1232 and Reference Source Signals 1234 are sampled from the Dataset 1206. The Reference Source Signals correspond to the part of the input mixture 1208 corresponding to each target speaker observed in isolation. The input mixture 1208 is processed by the speaker separation network 1242 to output a separation encoding for each target speaker. The speaker separation network 1242 includes a mixture encoder 1210, a mask inference module 1212, a separation encoding estimation from mask module 1213, an embedding computation module 1222, and optionally a separation encoding estimation from embedding module 1223.

The mixture encoder 1210 processes the input mixture 1208 to output a mixture encoding. The mixture encoding is further processed by the mask inference module 1212, which estimates a set of masks. The set of masks is used together with the input mixture by the separation encoding estimation from mask module 1213 to obtain separation encodings for each target speaker. For example, the mask inference module 1212 can output a mask for each target speaker, and the separation encoding estimation from mask module can apply the mask for a target speaker to a representation of the input mixture to obtain a representation of an estimate of the separated signal for that target speaker, which is used as separation encoding for that target speaker. The representation can for example be a time-frequency representation of the input mixture such as the short-time Fourier transform, in which case the mask is applied to the short-time Fourier transform of the input mixture to obtain an estimate of the short-time Fourier transform of the separated signal for that target speaker, which is an estimate of the short-time Fourier transform of what the isolated signal for that target speaker would have been if it had been observed in isolation.

The mixture encoding is also further processed by the embedding computation module 1222, which estimates a set of embeddings. A separation encoding estimation from embeddings module 1223 can use these embedding vectors, together with the input mixture 1208, to output another set of separation encodings.

These separation encodings from embeddings can be combined with the separation encodings from masks to obtain combined separation encodings, or can be used instead of the separation encodings from masks, to be used as input to the acoustic encoder network 1246 and subsequent steps. Each separation encoding is separately further processed by the acoustic encoder 1246, each leading to a recognition encoding. Each recognition encoding is separately further processed by both a CTC module 1216 and an attention decoder 1218. The Error Computation module 1230 uses both outputs of the CTC module 1216 and the Reference Labels 1232 to compute a CTC loss $\mathcal{L}_{ctc}$, and uses the outputs of the Attention Decoder 1218 the Reference Labels 1232 to compute an Attention loss $\mathcal{L}_{att}$. A weighted combination of the CTC loss and the Attention loss is a Recognition loss $\mathcal{L}_{ASR}$. The Error Computation module 1230 also uses the outputs of the separation encoding estimation from mask module 1213 and the reference source signals 1234 to compute a separation encoding loss $\mathcal{L}_{SE}$. The Error Computation module 1230 can also use the outputs of the separation encoding estimation from embeddings module 1223 and the reference source signals 1234 to compute the separation encoding loss $\mathcal{L}_{SE}$, in combination with the above separation encoding loss or instead of it. The Error Computation module 1230 also uses the outputs of the embedding computation module 1222 and the reference source signals 1234 to compute an embedding loss $\mathcal{L}_{emb}$. A weighted combination of the separation encoding loss and the embedding loss is a source separation loss $\mathcal{L}_{SS}$. A weighted combination of the recognition loss and the source separation loss is used to compute updates for the parameters of the multi-speaker ASR network with explicit separation 1211.

Figure 13:
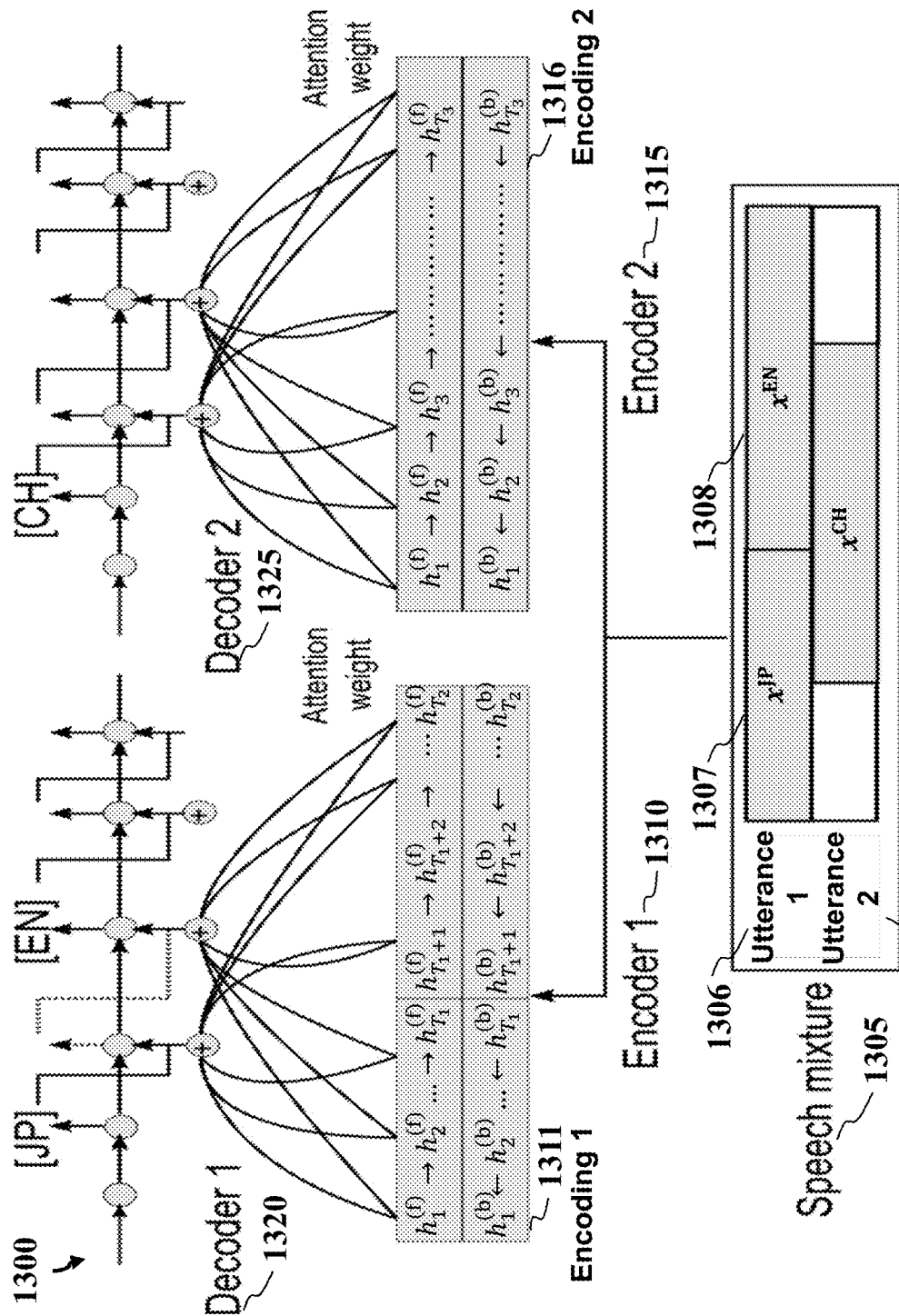
FIG. 13 is a schematic illustrating end-to-end recognition of speech by multiple speakers speaking simultaneously in multiple languages, according to embodiments of the present disclosure.

FIG. 13 is a schematic illustrating end-to-end recognition of speech by multiple speakers speaking simultaneously in multiple languages, according to embodiments of the present disclosure. A speech mixture 1305 includes speech by multiple speakers, for example two speakers, where utterance 1 1306 is an utterance spoken by speaker 1 with a first part 1307 in Japanese and a second part 1308 in English, and utterance 2 1309 is an utterance spoken by speaker 2 in Chinese. The speech mixture 1305 is processed by two encoder networks Encoder 1 1310 and Encoder 2 1315, outputting Encoding 1 1311 and Encoding 2 1316. Encoding 1 1311 and Encoding 2 1316 are separately processed by decoder networks, respectively Decoder 1 1320 and Decoder 2 1325, leading to texts for speaker 1, for example, in Japanese then English, and for speaker 2, for example, in Chinese. Whether the text outputted by Decoder 1 1320 corresponds to utterance 1 1306 and that outputted by Decoder 2 1325 corresponds to utterance 2 1309, or vice-versa, is determined by the system.

Figure 14:
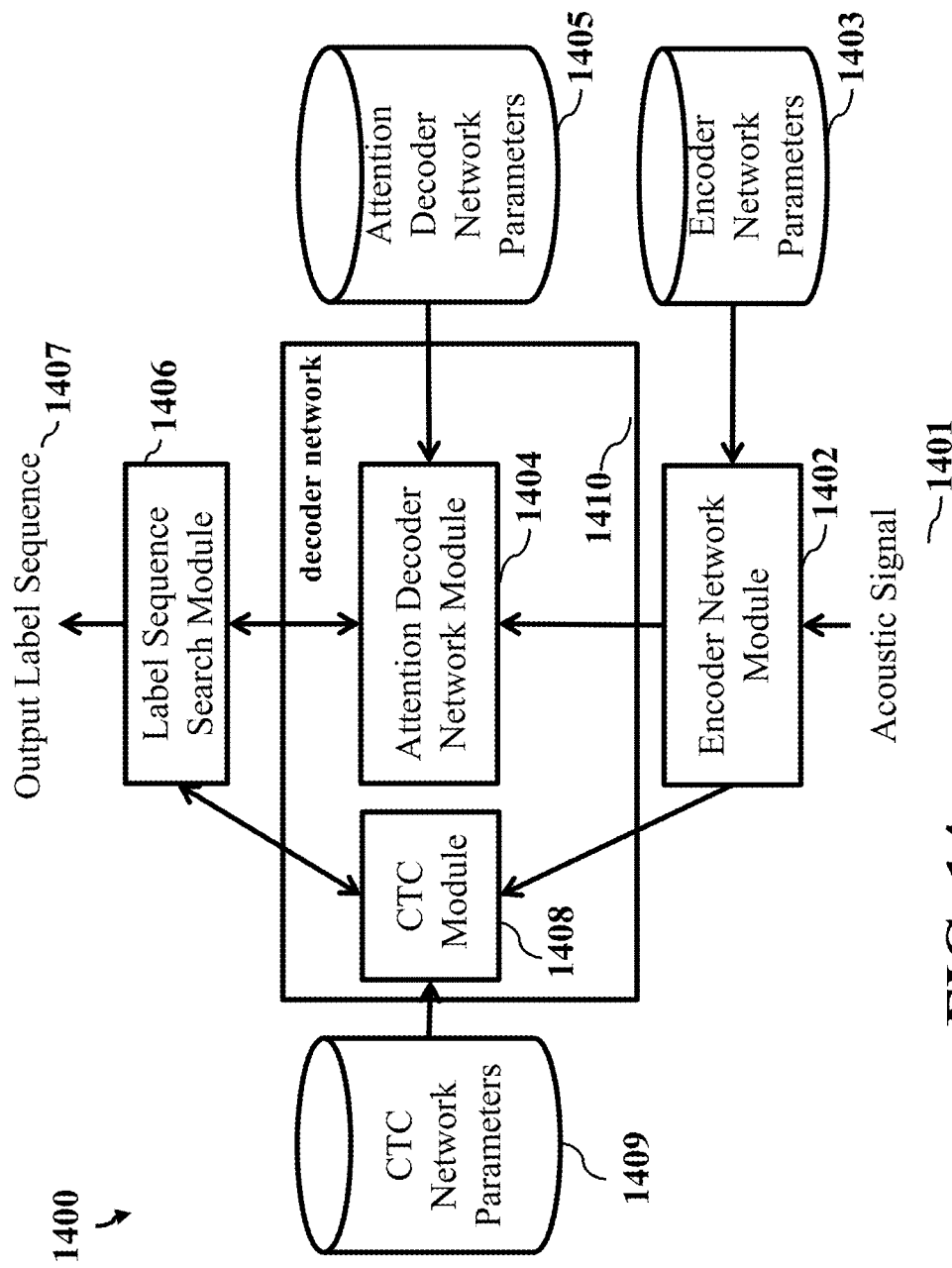
FIG. 14 is a block diagram illustrating a speech recognition module using a hybrid CTC/attention end-to-end network, according to embodiments of the present invention.

FIG. 14 is a block diagram illustrating a speech recognition module using a hybrid CTC/attention end-to-end network, according to embodiments of the present disclosure.

The end-to-end speech recognition module 1400 includes an encoder network module 1402, encoder network parameters 1403, a decoder network including an attention decoder module 1404 and a CTC module 1408, attention decoder network parameters 1405, CTC network parameters 1409, and a label sequence search module 1406. The encoder network parameters 1403, the attention decoder network parameters 1405 and the CTC network parameters 1409 are respectively stored in a storage device to provide parameters to corresponding modules 1402, 1404 and 1408.

The encoder network module 1402 includes an encoder network that converts acoustic signal 1401 into a hidden vector sequence using the encoder network reading parameters from encoder network parameters 1403. In some embodiments, the encoder network module 1402 includes a feature extractor (not shown) configured to extract an acoustic feature sequence from the acoustic signal to be further processed by the encoder network. The feature extractor is a differentiable function and thus can be connected into the single end-to-end neural network. Examples of the differentiable function include a Mel function of a magnitude of the channel signal and a bark function of a magnitude of the channel signal.

Still referring to FIG. 14, an attention mechanism using an attention decoder network 1404 is described as follows. The attention decoder network module 1404 includes an attention decoder network. The attention decoder network module 1404 receives the hidden vector sequence from the encoder network module 1402 and a previous label from the label sequence search module 1406, and then computes first posterior probability distributions of the next label for the previous label using the decoder network reading parameters from attention decoder network parameters 1405. The attention decoder network module 1404 provides the first posterior probability distribution to the label sequence search module 1406. The CTC module 1408 receives the hidden vector sequence from the encoder network module 1402 and the previous label from the label sequence search module 1406, and computes second posterior probability distributions of the next label sequence using the CTC network parameters 1409 and a dynamic programming technique. After the computation, the CTC module 1408 provides the second posterior probability distributions to the label sequence search module 1406.

The label sequence search module 1406 finds the label sequence with the highest sequence probability using the first and second posterior probability distributions provided from the attention decoder network module 1404 and the CTC module 1408. The first and second posterior probabilities of label sequence computed by the attention decoder network module 1404 and the CTC module 1408 are combined into one probability. In this case, the combination of the computed posterior probabilities may be performed based on the linear combination. With the end-to-end speech recognition module 1400, it becomes possible to take the CTC probabilities into account to find a better aligned hypothesis to the input acoustic feature sequence.

Neural Network Architecture for Language-Independent End-To-End Speech Recognition End-to-end speech recognition is generally defined as a problem to find the most probable label sequence $\hat{Y}$ given input acoustic feature sequence X, i.e.

$$\hat{Y} = \underset{Y \in \mathcal{U}^*}{\arg\max}\, p(Y|X), \quad (1)$$

where $\mathcal{U}^*$ denotes a set of possible label sequences given a set of pre-defined labels $\mathcal{U}$. A label may be a character or a word. The label sequence probability p(Y|X) can be computed using a pre-trained neural network.

In the embodiments of the present disclosure, the language-independent neural network may be a combination of different networks such as feed-forward neural networks (FFNNs), convolutional neural networks (CNNs), and recurrent neural networks (RNNs).

Still referring to FIG. 14, for example, hybrid attention/CTC architecture may be used for the neural network. FIG. 14 is a block diagram illustrating the speech recognition module 1400 using an end-to-end network with the hybrid attention/CTC architecture, wherein the label sequence probabilities are computed as follows.

An encoder module 1402 includes an encoder network used to convert acoustic feature sequence X=$x_1, \ldots, x_T$ into hidden vector sequence H=$h_1, \ldots, h_T$ as $$H = \text{Encoder}(X), \quad (2)$$

where function Encoder(X) may consist of one or more recurrent neural networks (RNNs), which are stacked. An RNN may be implemented as a Long Short-Term Memory (LSTM), which has an input gate, a forget gate, an output gate and a memory cell in each hidden unit. Another RNN may be a bidirectional RNN (BRNNs) or a bidirectional LSTM (BLSTM). A BLSTM is a pair of LSTM RNNs, one is a forward LSTM and the other is a backward LSTM. A Hidden vector of the BLSTM is obtained as a concatenation of hidden vectors of the forward and backward LSTMs.

With the forward LSTM, the forward t-th hidden vector $h_t^F$ is computed as $$h_t^F = o_t^F \odot \tan h(c_t^F) \quad (3)$$

$$o_t^F = \sigma(W_{xo}^F x_t + W_{xc}^F h_{t-1}^F + b_o^F) \quad (4)$$

$$c_t^F = f_t^F \odot c_{t-1}^F + i_t^F \odot \tan h(W_{xc}^F x_t + W_{hc}^F h_{t-1}^F + b_c^F) \quad (5)$$

$$f_t^F = \sigma(W_{xf}^F x_t + W_{hg}^F h_{t-1}^F + b_f^F) \quad (6)$$

$$i_t^F = \sigma(W_{xi}^F x_t + W_{hi}^F h_{t-1}^F + b_i^F). \quad (7)$$

where $\sigma(\cdot)$ is the element-wise sigmoid function, tan h($\cdot$) is the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript z∈{x, h, i, f, o, c}. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

Still referring to FIG. 14, with the backward LSTM, the backward t-th hidden vector $h_t^B$ is computed as $$h_t^B = o_t^B \odot \tan h(c_t^B) \quad (8)$$

$$o_t^B = \sigma(W_{xo}^B x_t + W_{xc}^B h_{t+1}^B + b_o^B) \quad (9)$$

$$c_t^B = f_t^B \odot c_{t+1}^B + i_t^B \odot \tan h(W_{xc}^B x_t + W_{hc}^B h_{t+1}^B + b_c^B) \quad (10)$$

$$f_t^B = \sigma(W_{xf}^B x_t + W_{hg}^B h_{t+1}^B + b_f^B) \quad (11)$$

$$i_t^B = \sigma(W_{xi}^B x_t + W_{hi}^B h_{t+1}^B + b_i^B). \quad (12)$$

where $i_t^B$, $f_t^B$, $o_t^B$ and $c_t^B$ are the input gate, forget gate, output gate, and cell activation vectors for $x_t$, respectively. The weight matrices $W_{zz}^B$ and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = [h_t^{F^T}, h_t^{B^T}]^T \quad (13)$$

where T denotes the transpose operation for the vectors assuming all the vectors are column vectors. $W_{zz}^F$, $b_z^F$, $W_{zz}^B$, and $b_z^B$ are considered the parameters of the BLSTM.

To obtain better hidden vectors, we may stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, we assume $x_t = h_t'$ when feeding it to another BLSTM. To reduce the computation, it may feed only every second hidden vectors of one BLSTM to another BLSTM. In this case, the length of output hidden vector sequence becomes the half of the length of input acoustic feature sequence.

All the parameters $W_{zz}^F$, $b_z^F$, $W_{zz}^B$, and $b_z^B$ identified by the subscript z∈{x, h, i, f, o, c} of the multiple BLSTMs are stored in the encoder network parameters 1403, and used to compute hidden vector sequence H.

An attention decoder network module 1404 includes an attention decoder network used to compute label sequence probability $p_{att}(Y|X)$ using hidden vector sequence H. Suppose Y is an L-length label sequence $y_1, y_2, \ldots, y_L$. To compute $p_{att}(Y|X)$ efficiently, the probability can be factorized by a probabilistic chain rule as $$p_{att}(Y|X) = \prod_{l=1}^{L} p_{att}(y_l|y_1, \ldots, y_{l-1}, X), \quad (14)$$

and each label probability $p_{att}(y_l|y_1, \ldots, y_{l-1}, X)$ is obtained from a probability distribution over labels, which is estimated using the attention decoder network as $$p_{att}(y|y_1, \ldots, y_{l-1}, X) = \text{Decoder}(r_l, q_{l-1}), \quad (15)$$

where y is a random variable representing a label, $r_l$ is called a content vector, which has content information of H. $q_{l-1}$ is a decoder state vector, which contains contextual information of the previous labels, $y_1, \ldots y_{l-1}$ and the previous content vectors $r_0, \ldots, r_{l-1}$. Accordingly, the label probability is obtained as the probability of $y = y_l$ given the context, i.e.

$$p_{att}(y_l|y_1, \ldots, y_{l-1}, X) = p_{att}(y = y_l|y_1, \ldots, y_{l-1}, X). \quad (16)$$

The content vector $r_l$ is usually given as a weighted sum of hidden vectors of the encoder network, i.e.

$$r_l = \sum_t a_{lt} h_t, \quad (17)$$

where $a_{lt}$ is called an attention weight that satisfies $\Sigma_t a_{lt}=1$. The attention weights can be computed using $q_{l-1}$ and H as $$e_{lt} = w^T \tanh(W q_{l-1} + v h_t + U f_{lt} + b) \quad (18)$$

$$f_l = F * a_{l-1} \quad (19)$$

$$a_{lt} = \frac{\exp(e_{lt})}{\sum_{\tau=1}^{T} \exp(e_{l\tau})} \quad (20)$$

where W, V, F and U are matrices, and w and b are vectors, which are trainable parameters of the attention decoder network. $e_{lt}$ is a matching score between the (l-1)-th state vector $q_{l-1}$ and the t-th hidden vector $h_t$ to form a temporal alignment distribution $a_l = \{a_{lt} | t=1, \ldots, T\}$. $a_{l-1}$ represents the previous alignment distribution $\{a_{(l-1)t} | t=1, \ldots, T\}$ used for predicting the previous label $y_{l-1}$. $f_l = \{f_{lt} | t=1, \ldots, T\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l, q_{l-1}) = \text{softmax}(W_{qy} q_{l-1} + W_{ry} r_l + b_y), \quad (21)$$

where $W_{qy}$ and $W_{ry}$ are matrices and $b_y$ is a vector, which are trainable parameters of the attention decoder network. The softmax( ) function is computed as $$\text{softmax}(v) = \frac{\exp(v[i])}{\sum_{j=1}^{K} \exp(v[j])} \bigg|_{i=1,\ldots,K} \quad (22)$$

for a K-dimensional vector v, where v[i] indicates the i-th element of v.

After that, decoder state vector $q_{l-1}$ is updated to $q_l$ using an LSTM as $$q_l = o_l^D \odot \tanh(c_l^D) \quad (23)$$

$$o_l^D = \sigma(W_{xo}^D x_l^D + W_{xc}^D q_{l-1} + b_o^D) \quad (24)$$

$$c_l^D = f_l^D \odot c_{l-1}^D + i_l^D \odot \tanh(W_{xc}^D x_l^D + W_{hc}^D q_{l-1} + b_c^D) \quad (25)$$

$$f_l^D = \sigma(W_{xf}^D x_l^D + W_{hg}^D q_{l-1} + b_f^D) \quad (26)$$

$$i_l^D = \sigma(W_{xi}^D x_l^D + W_{hi}^D q_{l-1} + b_i^D), \quad (27)$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1}=0$, $y_0=\text{<sos>}$, and $a_0=1/T$. For the attention decoder network, the input vector $x_l^D$ is given as a concatenated vector of label $y_l$ and content vector $r_l$, which can be obtained as $x_l^D = [\text{Embed}(y_l)^T, r_l^T]^T$, where Embed(•) denotes label embedding, that converts a label into a fixed dimensional vector. For example, it can be computed by $$\text{Embed}(y) = W_e^D \text{OneHot}(y), \quad (28)$$

where OneHot(y) denotes a 1-of-N coding of label y which converts a label index to a one hot vector representation. $W_e^D$ is a matrix, which is a trainable parameter.

All the parameters $W_{zz}^D$ and $b_z^D$ identified by the subscript $z \in \{x, h, i, f, o, c\}$ and $W_{qy}$, $W_{ry}$, $b_y$, $W_e^D$ are stored in the attention decoder network parameters 1405, and used to compute the label probability distribution $p_{att}(y=y_l | y_1, \ldots, y_{l-1}, X)$.

The CTC module 1408 computes a CTC forward probability of label sequence Y given hidden vector sequence H. Note that the CTC formulation uses L-length label sequence $Y=\{y_l \in \mathcal{U} | l=1, \ldots, L\}$ with a set of distinct labels $\mathcal{U}$. By introducing framewise label sequence with an additional "blank" label, $Z=\{z_t \in \mathcal{U} \cup \{b\} | t=1, \ldots, T\}$, where b represents a blank label. By using the probabilistic chain rule and conditional independence assumption, the posterior distribution p(Y|X) is factorized as follows:

$$p(Y|X) \approx \sum_Z p(Y|Z) p(Z|X) \approx \sum_Z p(Y|Z) \prod_t p(z_t|X) \quad (29)$$

$$\approx \sum_Z \prod_t p(z_t | z_{t-1}, Y) p(z_t | X),$$

where $p(z_t | z_{t-1}, Y)$ is considered a label transition probability including blank labels. $p(z_t | X)$ is the framewise posterior distribution conditioned on the input sequence X, and modeled by using bidirectional long short-term memory (BLSTM):

$$p(z_t|X) = \text{softmax}(W_{hy}^{CTC} h_t + b_y^{CTC}), \quad (30)$$

where $h_t$ is obtained with an encoder network. $W_{hy}^{CTC}$ is a matrix and $b_y^{CTC}$ is a vector, which are trainable parameters of CTC and stored in CTC network parameters 1409. Although Eq. (29) has to deal with a summation over all possible Z, it is efficiently computed by using a forward algorithm.

The forward algorithm for CTC is performed as follows. We use an extended label sequence $Y' = y'_1, y'_2, \ldots, y'_{2L+1} = b, y_1, b, y_2, \ldots, b, y_L, b$ of length 2L+1, where a blank label "b" is inserted between each pair of adjacent labels. Let $\alpha_t(s)$ be a forward probability, which represents the posterior probability of label sequence $y_1, \ldots, y_l$ for time frames $1, \ldots, t$, where s indicates the position in the extended label sequence Y'.

For initialization, we set $$\alpha_1(1) = p(z_1 = b | X) \quad (31)$$

$$\alpha_1(2) = p(z_1 = y_1 | X) \quad (32)$$

$$\alpha_1(s) = 0, \forall s > 2. \quad (33)$$

For t=2 to T, $\alpha_t(s)$ is computed recursively as $$\alpha_t(s) = \begin{cases} \bar{\alpha}_t(s)p(z_t = y'_s \mid X) & \text{if } y'_s = b \text{ or } y'_{s-2} = y'_s \\ (\bar{\alpha}_t(s) + \alpha_{t-1}(s-2))p(z_t = y'_s \mid X) & \text{otherwise} \end{cases}, \quad (34)$$

where $$\bar{\alpha}_t(s) = \alpha_{t-1}(s) + \alpha_{t-1}(s-1). \quad (35)$$

Finally, the CTC-based label sequence probability is obtained as $$p_{ctc}(Y|X) = \alpha_T(2L+1) + \alpha_T(2L). \quad (36)$$

The framewise label sequence Z represents an alignment between input acoustic feature sequence X and output label sequence Y. When computing the forward probability, the recursion of Eq. (34) enforces Z to be monotonic and does not allow looping or big jumps of s in alignment Z, because the recursion to obtain $\alpha_t(s)$ only considers at most $\alpha_{t-1}(s)$, $\alpha_{t-1}(s-1)$, $\alpha_{t-1}(s-2)$. This means that when time frame proceeds one frame, the label changes from the previous label or blank, or keeps the same label. This constraint plays a role of the transition probability $p(z_t|z_{t-1}, Y)$ that enforces alignments to be monotonic. Hence, $p_{ctc}(Y|X)$ can be 0 or a very small value when it is computed based on irregular (non-monotonic) alignments.

Finally, we obtain the label sequence probability by combining the CTC-based probability in Eq. (36) and attention-based probability in Eq. (14) in log domain as $$\log p(Y|X) = \lambda \log p_{ctc}(Y|X) + (1-\lambda)\log p_{att}(Y|X), \quad (37)$$

where $\lambda$ is a scalar weight such that $0 \le \lambda \le 1$ and may be determined manually.

Figure 15:
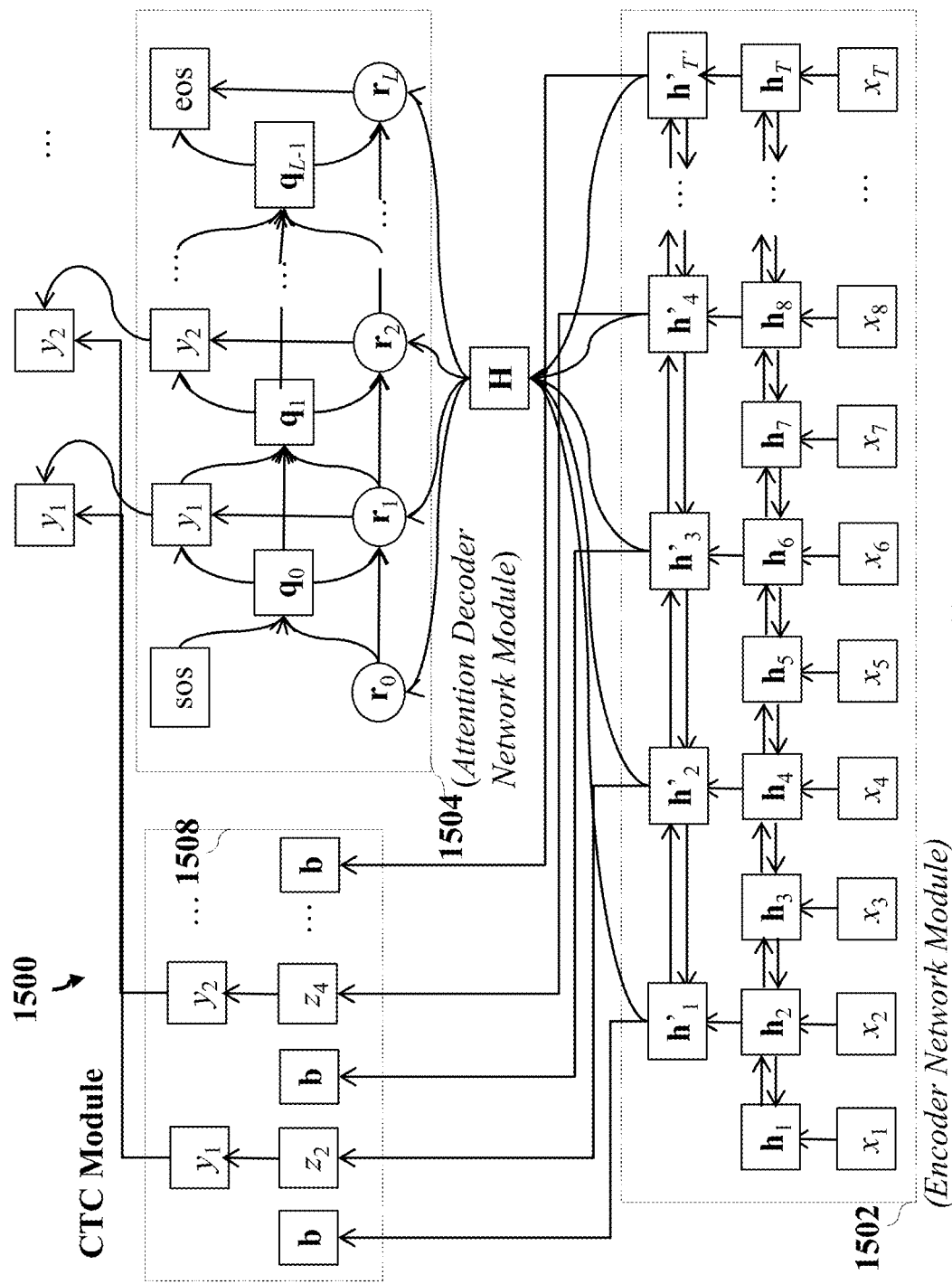
FIG. 15 is a block diagram illustrating neural networks in a hybrid CTC/attention speech recognition module, according to embodiments of the present disclosure.

FIG. 15 is a schematic diagram illustrating neural networks in a hybrid CTC/attention speech recognition module, according to embodiments of the present disclosure. The combined neural network 1500 includes an encoder network module 1502, an attention decoder network module 1504 and a CTC module 1508. Each arrow represents a data transfer with or without transformation, and each square or circle node represents a vector or a predicted label. Acoustic feature sequence $X=x_1, \ldots, x_T$ is fed to the encoder network module 1502, where two BLSTMs are stacked and every second hidden vectors of the first BLSTM are fed to the second BLSTM. The output of the encoder module 1502 results in hidden vector sequence $H=h'_1, h'_2, \ldots, h'_{T'}$, where $T'=T/2$. Then, H is fed to the CTC module 1508 and the attention decoder network module 1504. The CTC-based and attention-based sequence probabilities are computed with the CTC module 1508 and the attention decoder network module 1504, respectively, and combined to obtain the label sequence probability.

Joint Language Identification and Speech Recognition

A key idea of language-independent end-to-end system is to consider as the set of output labels an augmented character set including the union of character sets appearing in all the target languages, i.e., $\mathcal{U}^{union} = \mathcal{U}^{EN} \cup \mathcal{U}^{JP} \cup \ldots$, where $\mathcal{U}^{EN/JP/\ldots}$ is a character set of a specific language. By using this augmented character set, likelihoods of character sequences can be computed for any language, without requiring a separate language identification module. The network is trained to automatically predict the correct character sequence for the target language of each utterance. The use of the union, as opposed to using a unique character set for each language, eliminates the duplication of output symbols that occur in multiple languages, and yields a more compact model representation with reduced computational cost. The language-independent system repeats the prediction of language ID and speech recognition given consecutive multilingual speech.

Furthermore, we make the prediction of the language ID an explicit part of the system by further augmenting the set of output labels to include the language ID, leading to a final augmented character set $\mathcal{U}^{final} = \mathcal{U}^{union} \cup \{[EN], [JP], \ldots\}$ used as a set of labels $\mathcal{U}$ for end-to-end speech recognition. According to embodiments of the present disclosure, the network first predicts a language ID, $k \in \{[EN], [JP], \ldots\}$. Instead of a posterior distribution p(Y|X) where $Y = y_1, \ldots, y_L$ is a sequence of characters in $\mathcal{U}$ and X is a sequence of acoustic feature vectors, the system models the joint distribution p(k, Y|X) of the language ID and character sequence as that of an augmented sequence $Y' = (k, Y)$ where $y'_1 = k$ and $y'_l = y_{l+1}$, $\forall l \ge 1$. This is formulated by using the probabilistic chain rule as follows:

$$p(Y' \mid X) = p(k) \prod_{l=1}^{L} p(y_l \mid k, y_1, \ldots, y_{l-1}, X). \quad (38)$$

Furthermore, for the case including multiple languages in an utterance, it allows the network to output multiple language IDs throughout. For a sequence $Y' = y'_1, \ldots, y'_L$, of characters in $\mathcal{U}^{final}$, we denote by $l_1, \ldots, l_N$ the indices of the characters $k_n = y'_{l_n}$ in Y' that are language IDs (i.e., $k_n \in \{[EN], [JP], \ldots\}$). The system now models the joint distribution of language ID and characters as $$p(Y' \mid X) = \quad (39)$$

$$\prod_n p(k_n \mid y'_1, \ldots, y'_{l_n-1}, X) \prod_{l=l_n+1}^{l_{n+1}-1} p(y'_l \mid k_n, y'_1, \ldots, y'_{l-1}, X).$$

This is the same as modeling the distribution of language-mixed character sequence including language IDs such as "[EN] h o w <space> a r e <space> y o u ? [FR] c o m m e n t <space> a l l e z-v o u s ?", where <space> formally represents a space character.

Figure 16:
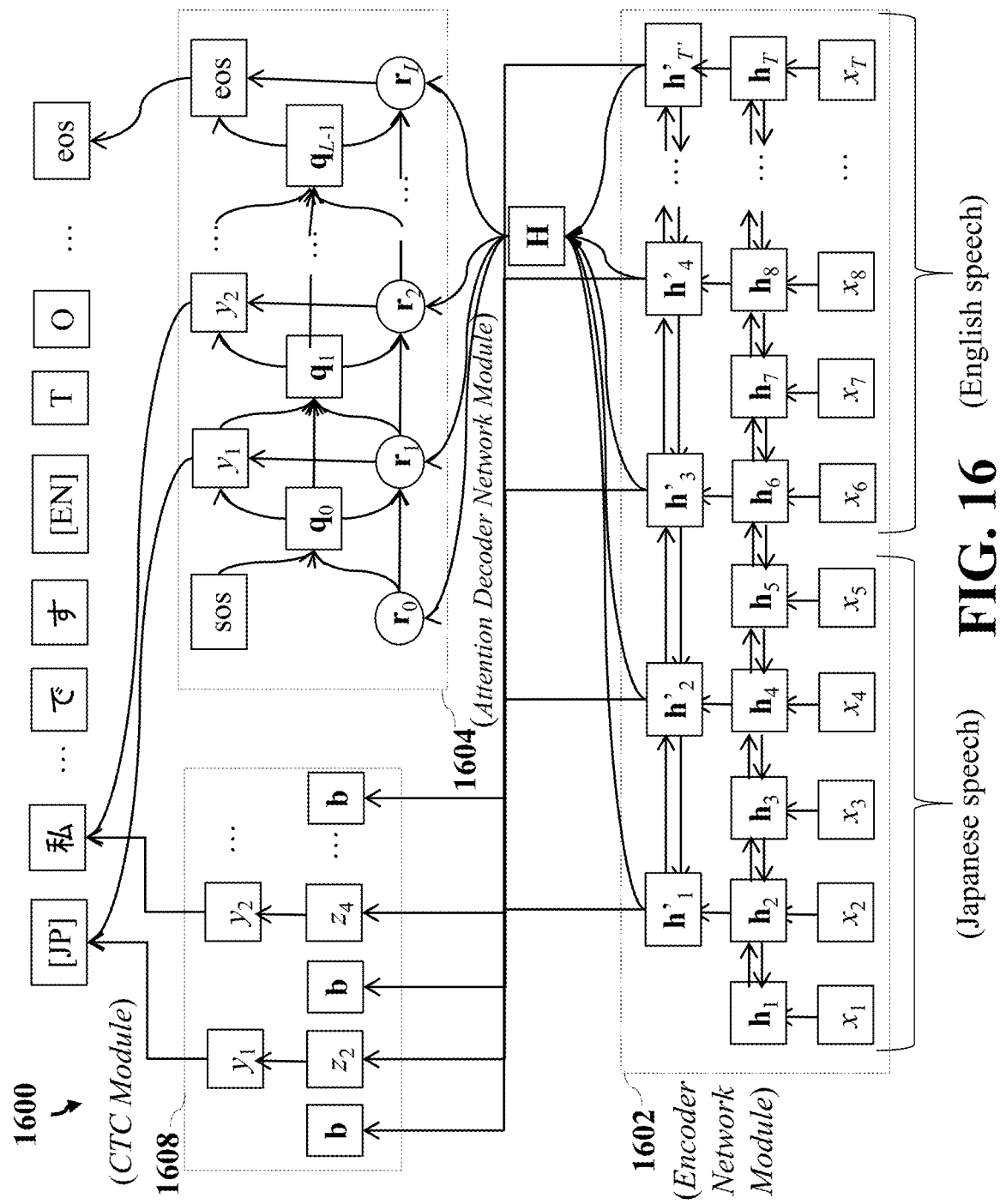
FIG. 16 is a schematic diagram illustrating neural networks in a multi-lingual speech recognition module, according to embodiments of the present disclosure.

FIG. 16 is a schematic diagram illustrating neural networks in a multi-lingual speech recognition module, according to embodiments of the present disclosure. The hybrid attention/CTC architecture may be used to model such language-mixed character sequence. When recognizing a language-mixed utterance, the network can switch the language of the output sequence. FIG. 16 shows an example of character sequence prediction using the hybrid attention/CTC network 1600. The encoder network computes hidden vector sequence H by taking as input acoustic features consisting of Japanese and English speech. Although we assume $x_1, \ldots, x_5$ corresponds to Japanese and $x_6, \ldots, x_T$ corresponds to English in the example, in there is no indicator that separates the languages in the actual acoustic feature sequence. According to embodiments of the present disclosure, the attention decoder network can predict language ID "[JP]" followed by a Japanese character sequence, and after decoding the first Japanese character sequence, the network can further predict the language ID that matches the character sequence that follows, here "[EN]".

Data Generation for Multi-Lingual Speech Recognition

To predict language-mixed utterances, the hybrid attention/CTC network needs to be trained using a set of such language-mixed corpus. However, it is very difficult to collect a sufficient amount of such speech corpus, in which multiple languages appear within the same utterance. In actual, collecting and transcribing such utterances is very costly and time consuming. Such corpus can however be artificially generated from a set of language-dependent corpora, which already exist.

Suppose each utterance in the multiple corpora has its corresponding transcript as a sequence of characters. Hereafter, a method to generate such language-mixed corpus is explained. First we insert a language ID to the transcript of each utterance in the language-dependent corpora. The language ID may be located at the head of each character sequence. Next, we randomly select utterances from the language-dependent corpora while paying attention to the coverage of selected utterances and the variation of language transitions as described further below. The selected utterances (and their transcripts) are then concatenated and considered as a single utterance in the generated corpus. This procedure is repeated until the duration of the generated corpus reaches that of the union of the original corpora.

The probability of sampling a language is proportional to the duration of its original corpus, with a constant term 1/N added to alleviate the selection bias caused by data size. We set a maximum number $N_{concat}$ of utterances to concatenate, 3 in our experiments. For each number $n_{concat}$ between 1 and $N_{concat}$, we create a concatenated utterance consisting of $n_{concat}$ utterances from the original corpora, by sampling $n_{concat}$ languages and utterances based on their sampling probabilities. In order to maximize the coverage of the original corpora, we prevent utterances from being reused too much by introducing maximum usage count, $n_{reuse}$, set to 5 for the training set, and 2 for the development and evaluation sets. We use this procedure to generate a training set, a development set, and an evaluation set.

To generate multi-speaker multi-lingual training data, we can randomly select multi-lingual utterances as generated above, and mix them together with a random gain.

Training Procedure

Encoder Network Parameters 1403 of FIG. 14, Attention Decoder Network Parameters 1405, and CTC Network Parameters 1409 are jointly optimized so that the loss function $$\mathcal{L}(X, Y, \Theta) = \sum_{n=1}^{N} -\lambda \log p_{ctc}(Y_n | X_n, \Theta) - (1-\lambda) \log p_{att}(Y_n | X_n, \Theta), \quad (40)$$

is reduced, where X and Y are training data including acoustic feature sequences and label sequences.

Θ denotes a set of network parameters including Encoder Network Parameters 1403 of FIG. 14, Attention Decoder Network Parameters 1405, and CTC Network Parameters 1409. $\mathcal{N}$ is the number of training samples. $X_n$ is the n-th acoustic feature sequence in X and $Y_n$ is the n-th label sequence in Y. $p_{ctc}(Y_n|X_n, \Theta)$ is the CTC-based sequence probability computed with parameter set Θ and $p_{att}(Y_n|X_n, \Theta)$ is the attention-based sequence probability computed with parameter set Θ.

The set of network parameters Θ may be optimized by a stochastic gradient descent method. The sizes of matrices and vectors may be decided manually or automatically. For instance, for the matrices and vectors depending on the size of label set $\mathcal{U}^{final}$, the sizes are determined according to the label set size $|\mathcal{U}^{final}|$. For example, the number of rows of matrices $W_{qy}$ and $W_{ry}$ should equal $|\mathcal{U}^{final}|$, and the number of dimensions of vector by should also equal $|\mathcal{U}^{final}|$, because the number should equal the dimension of label probability distribution $p_{att}(y|y_1, \ldots, y_{l-1}, X)$. Each element of the matrices and vectors may be set as a random real number. $\mathcal{U}^{final}$ is determined by obtaining unique characters and language IDs in the dataset of interest.

Next, the encoder, decoder, and CTC network parameters in parameter set Θ are jointly optimized. Based on a gradient descent method, each element of the parameter set Θ is repeatedly updated as $$\Theta \leftarrow \Theta - \eta \frac{\partial}{\partial \Theta} \mathcal{L}(X, Y, \Theta), \quad (41)$$

until $\mathcal{L}(X, Y, \Theta)$ converges, where η is a learning rate.

It is also possible to split X and Y into M small subsets $\{\mathbb{X}_m, \mathbb{Y}_m\}_{m=1, \ldots, M}$ such that $X = \mathbb{X}_1 \cup \ldots \cup \mathbb{X}_M$ and $Y = \mathbb{Y}_1 \cup \ldots \cup \mathbb{Y}_M$, and update the parameters by repeating $$\Theta \leftarrow \Theta - \eta \frac{\partial}{\partial \Theta} \mathcal{L}(\mathbb{X}_m, \mathbb{Y}_m, \Theta), \quad (42)$$

for m=1, ..., M. By updating the parameters with the small subsets, the parameters are updated more frequently and the loss function converges more quickly.

It is understood that parameters for all networks in the present disclosure can be optimized similarly as described above. For example, regarding FIG. 10, Network parameters 1041 for the speaker separation network 1042, the acoustic encoder network 1046, and the decoder network 1050, can be jointly optimized using a procedure similar to that described above.

Label Sequence Search

Label sequence search module 1406 of FIG. 14 finds the most probable label sequence Ŷ according to the combined label sequence probabilities as $$\hat{Y} = \underset{Y \in \mathcal{U}^*}{\operatorname{argmax}} \{\lambda \log p_{ctc}(Y|X) + (1-\lambda) \log p_{att}(Y|X)\}, \quad (43)$$

where $p_{ctc}(Y|X)$ is the CTC-based label sequence probability in Eq. (36), $p_{att}(Y|X)$ is the attention-based label sequence probability in Eq. (14), and $\mathcal{U} = \mathcal{U}^{final}$ according to embodiments of the present disclosure.

However, it is difficult to enumerate all possible label sequences for Y and compute λ log $p_{ctc}(Y|X)$+(1−λ)log $p_{att}(Y|X)$, because the number of possible label sequences increases exponentially to the length of the sequence. Therefore, a beam search technique is usually used to find Ŷ, in which shorter label sequence hypotheses are generated first, and only a limited number of hypotheses, which have a higher score than others, are extended to obtain longer hypotheses. Finally, the best label sequence hypothesis is selected in the complete hypotheses that reached the end of the sequence.

Let $\Omega_l$ be a set of partial hypotheses of the length l. At the beginning of the beam search, $\Omega_0$ contains only one hypothesis with the starting symbol <sos>. For l=1 to $L_{max}$, each partial hypothesis in $\Omega_{l-1}$ is expanded by appending possible single labels, and the new hypotheses are stored in $\Omega_l$, where $L_{max}$ is the maximum length of the hypotheses to be searched.

The score of each partial hypothesis h is computed as $$\psi_{joint}(h) = \lambda \psi_{ctc}(h,X) + (1-\lambda)\psi_{att}(h), \qquad (44)$$

where $\psi_{att}(h)$ is computed as $$\psi_{att}(h) = \psi_{att}(g) + \log p_{att}(y|g). \qquad (45)$$

To compute $\psi_{ctc}(h, X)$, we utilize the CTC prefix probability defined as the cumulative probability of all label sequences that have h as their prefix:

$$p_{ctc}(h, \ldots \mid X) \triangleq \sum_{v \in (\mathcal{U} \cup \{\langle eos \rangle\})^+} p_{ctc}(h \cdot v \mid X), \qquad (46)$$

and we define the CTC score as $$\psi_{ctc}(h,X) \triangleq \log p_{ctc}(h, \ldots \mid X), \qquad (47)$$

where v represents all possible label sequences except the empty string. The CTC score cannot be obtained recursively as $\psi_{att}(h)$ in Eq. (45) but it can be computed efficiently by keeping the forward probabilities over the input time frames for each partial hypothesis.

According to the embodiments of the present disclosure, label sequence search module 1406 finds $\hat{Y}$ according to the following procedure.

---

Input: X, $L_{max}$
Output: $\hat{Y}$
1: $\Omega_0 \leftarrow \{\langle sos \rangle\}$
2: $\hat{\Omega} \leftarrow \emptyset$
3: $\psi_{att}(\langle sos \rangle) \leftarrow 0$
4: for l = 1 ... $L_{max}$ do
5: $\quad \Omega_l \leftarrow \emptyset$
6: $\quad$ while $\Omega_{l-1} \neq \emptyset$ do
7: $\quad\quad$ g $\leftarrow$ Head($\Omega_{l-1}$)
8: $\quad\quad$ Dequeue($\Omega_{l-1}$)
9: $\quad\quad$ for each y $\in \mathcal{U} \cup \{\langle eos \rangle\}$ do
10: $\quad\quad\quad$ h $\leftarrow$ g $\cdot$ y
11: $\quad\quad\quad$ $\psi_{att}(h) \leftarrow \psi_{att}(g) + \log p_{att}(y|g, X)$
12: $\quad\quad\quad$ $\psi_{joint}(h) \leftarrow \lambda \psi_{ctc}(h, X) + (1 - \lambda)\psi_{att}(h)$
13: $\quad\quad\quad$ if y = $\langle eos \rangle$ then
14: $\quad\quad\quad\quad$ Enqueue($\hat{\Omega}$, h)
15: $\quad\quad\quad$ else
16: $\quad\quad\quad\quad$ Enqueue($\Omega_l$, h)
17: $\quad\quad\quad\quad$ if $|\Omega_l|$ > beam Width then
18: $\quad\quad\quad\quad\quad$ $h_{min} \leftarrow \arg\min_{h \in \Omega_l} \psi_{joint}(h)$
19: $\quad\quad\quad\quad\quad$ Remove($\Omega_l$, $h_{min}$)
20: $\quad\quad\quad\quad$ end if
21: $\quad\quad\quad$ end if
22: $\quad\quad$ end for
23: $\quad$ end while
24: end for
25: $\hat{Y} \leftarrow \arg\max_{h \in \hat{\Omega}} \psi_{joint}(h)$

---

In this procedure, $\Omega_l$ and $\hat{\Omega}$ are implemented as queues that accept partial hypotheses of the length l and complete hypotheses, respectively. In lines 1-2, $\Omega_0$ and $\hat{\Omega}$ are initialized as empty queues. In line 3, the score for the initial hypothesis $\langle sos \rangle$ is set to 0. In lines 4-24, each partial hypothesis g in $\Omega_{l-1}$ is extended by each label y in label set $\mathcal{U} \cup \{\langle eos \rangle\}$, where operations Head($\Omega$) returns the first hypothesis in queue $\Omega$, and Dequeue($\Omega$) removes the first hypothesis from the queue.

Each extended hypothesis h is scored using the attention decoder network in line 11 and combined with CTC score in line 12. After that, if y=$\langle eos \rangle$, the hypothesis h is assumed to be complete and stored in $\hat{\Omega}$ in line 14, where Enqueue($\hat{\Omega}$, h) is an operation that adds h to $\hat{\Omega}$. If y$\neq \langle eos \rangle$, h is stored in $\Omega_l$ in line 16, where the number of hypotheses in $\Omega_l$, i.e. $|\Omega_l|$, is compared with a pre-determined number beamWidth in line 17. If $|\Omega_l|$ exceeds beamWidth, the hypothesis with the minimum score $h_{min}$ in $\Omega_l$ is removed from $\Omega_l$ in lines 18-19, where Remove($\Omega_l$, $h_{min}$) is an operation that removes $h_{min}$ from $\Omega_l$. Finally, $\hat{Y}$ is selected as the best hypothesis in line 25.

CTC score $\psi_{ctc}(h, X)$ can be computed using a modified forward algorithm. Let $\gamma_t^{(n)}(h)$ and $\gamma_t^{(b)}(h)$ be the forward probabilities of the hypothesis h over the time frames 1 ... t, where the superscripts (n) and (b) denote different cases in which all CTC paths end with a nonblank or blank label, respectively. Before starting the beam search, $\gamma_t^{(n)}(\cdot)$ and $\gamma_t^{(b)}(\cdot)$ are initialized for t=1, ..., T as $$\gamma_t^{(n)}(\langle sos \rangle) = 0, \qquad (48)$$

$$\gamma_t^{(b)}(\langle sos \rangle) = \prod_{\tau=1}^{t} \gamma_{\tau-1}^{(b)}(\langle sos \rangle) p(z_\tau = b \mid X), \qquad (49)$$

where we assume that $\gamma_0^{(b)}(\langle sos \rangle)=1$ and b is a blank label. Note that the time index t and input length T may differ from those of the input utterance X owing to the subsampling technique for the encoder. The CTC score function can be implemented as follows.

---

Input: h, X
Output: $\psi_{ctc}(h, X)$
1: $\quad$ g, y $\leftarrow$ h $\quad\triangleleft$ split h into the last label y and the rest g
2: $\quad$ if y = $\langle eos \rangle$ then
3: $\quad\quad$ return $\log\{\gamma_T^{(n)}(g) + \gamma_T^{(b)}(g)\}$
4: $\quad$ else
5: $\quad\quad$ $\gamma_1^{(n)}(h) \leftarrow \begin{cases} p(z_1 = y \mid X) & \text{if } g = \langle sos \rangle \\ 0 & \text{otherwise} \end{cases}$
6: $\quad\quad$ $\gamma_1^{(b)}(h) \leftarrow 0$
7: $\quad\quad$ $\Psi \leftarrow \gamma_1^{(n)}(h)$
8: $\quad\quad$ for t = 2 ... T do
9: $\quad\quad\quad$ $\Phi \leftarrow \gamma_{t-1}^{(b)}(g) + \begin{cases} 0 & \text{if last}(g) = y \\ \gamma_{t-1}^{(n)}(g) & \text{otherwise} \end{cases}$
10: $\quad\quad\quad$ $\gamma_t^{(n)}(h) \leftarrow (\gamma_{t-1}^{(n)}(h) + \Phi) \, p(z_t = y|X)$
11: $\quad\quad\quad$ $\gamma_t^{(b)}(h) \leftarrow (\gamma_{t-1}^{(b)}(h) + \gamma_{t-1}^{(n)}(h)) \, p(z_t = b|X)$
12: $\quad\quad\quad$ $\Psi \leftarrow \Psi + \Phi \cdot p(z_t = y|X)$
13: $\quad\quad$ end for
14: $\quad\quad$ return $\log(\Psi)$
15: $\quad$ end if

---

In this function, the given hypothesis h is first split into the last label y and the rest g in line 1. If y is $\langle eos \rangle$, it returns the logarithm of the forward probability assuming that h is a complete hypothesis in line 3. The forward probability of h is given by $$p_{ctc}(h|X) = \gamma_T^{(n)}(g) + \gamma_T^{(b)}(g) \qquad (50)$$

according to the definition of $\gamma_t^{(n)}(\cdot)$ and $\gamma_t^{(b)}(\cdot)$. If y is not $\langle eos \rangle$, it computes the forward probabilities $\gamma_t^{(n)}(h)$ and $\gamma_t^{(b)}(h)$, and the prefix probability $\Psi = p_{ctc}(h, \ldots |X)$ assuming that h is not a complete hypothesis. The initialization and recursion steps for those probabilities are described in lines 5-13. In this function, it is assumed that whenever computing $\gamma_t^{(n)}(h), \gamma_t^{(b)}(h)$ and $\Psi$ in lines 10-12, the probabilities $\gamma_{t-1}^{(n)}(g)$ and $\gamma_{t-1}^{(b)}(g)$ in line 9 have already been obtained through the beam search process because g is a prefix of h such that |g|<|h|. Accordingly, the prefix and forward probabilities can be computed efficiently. Note that last(g) in line 9 is a function that returns the last label of g.

Further Review of Technical Concepts

Speech Separation—Deep Clustering

During this experimentation process, recognized was that deep clustering can train a deep neural network to output for each time-frequency (T-F) unit of a time-frequency domain a high-dimensional embedding vector, given an acoustic signal with multiple speakers speaking simultaneously as input. Such that, the embeddings for the T-F unit pairs dominated by the same speaker in the input acoustic signal are close to each other, while those for pairs dominated by different speakers are farther away. The speaker assignment of each T-F unit can thus be inferred from the embeddings by simple clustering algorithms, to produce masks that isolate each single speaker.

For a mixture spectrogram with N T-F elements and C speakers we can define a label matrix $Y \in \mathbb{R}^{N \times C}$ such that $y_{i,c}=1$, if T-F element i is dominated by source c, and $y_{i,c}=0$ otherwise. The ith row, $y_i$, is thus a unit-length indicator vector for the speaker that dominates T-F element i. The ordering of the C speakers has an arbitrary permutation, whereas the ideal affinity matrix, $YY^T$, provides a permutation-invariant representation of the same information. This matrix $(YY^T)_{i,j}=1$ if T-F elements i and j are dominated by the same speaker, and otherwise $(YY^T)_{i,j}=0$. The network learns to produce a matrix $V \in \mathbb{R}^{N \times D}$ composed of unit-length D-dimensional embedding vectors $v_i$ such that the affinity matrix $VV^T$ approximates the ideal affinity matrix. At training time, deep clustering minimizes the following objective function with respect to V for each training mixture:

$$\mathcal{L}_{DC,classic}(V, Y) = \|VV^T - YY^T\|_F^2$$
$$= \|V^T V\|_F^2 + \|Y^T Y\|_F^2 - 2\|V^T Y\|_F^2,$$

where the embedding matrix $V \in \mathbb{R}^{TF \times D}$ and the label matrix $Y \in \mathbb{R}^{TF \times C}$ are respectively obtained by vertically stacking all the embedding vectors $v_i$ and all the one hot vectors $y_i$ in an utterance. In some embodiments, the network consists in multiple bidirectional long short-term memory (BLSTM) recurrent neural network (RNN) layers stacked on top of each other, followed by a linear layer to compute a D-dimensional vector for each T-F unit within a given frame from the output of the stack of BLSTM layers at that frame, followed by a non-linearity such as a sigmoid, and a unit-norm normalization of the D-dimensional vector to obtain a D-dimensional embedding.

The present disclosure includes other embodiments that provide further improvements using an alternative cost function based on whitening the embeddings in a k-means objective:

$$\mathcal{L}_{DC,W}(V, Y) = \|V(V^T V)^{-\frac{1}{2}} - Y(Y^T Y)^{-1} Y^T V(V^T V)^{-\frac{1}{2}}\|_F^2$$
$$= D - tr((V^T V)^{-1} V^T Y (Y^T Y)^{-1} Y^T V).$$

It is contemplated some embodiments of the present disclosure can use different deep clustering objective functions as well as other objective functions for providing further improvements based on the specific objectives or results being sought.

The present disclosure also includes other embodiments that use soft weights to reduce the influence of T-F bins with very low energy at training time. Wherein some embodiments use magnitude ratio weights $W_{MR}$ defined as the ratio of the mixture magnitude at T-F bin i over the sum of the mixture magnitudes at all bins within an utterance: $w_i = |x_i|/\Sigma_j |x_j|$, where |x| is the magnitude of the mixture. Other types of weights could also be considered, by non-limiting example, such as binary weights.

Speech Separation—Chimera Network

Some embodiments of the present disclosure train mask-inference (MI) networks for speech separation. Some embodiments use a mask approximation (MA) objective, where the loss function is computed based on a distance between the estimated mask and a reference mask. Some embodiments use magnitude spectrum approximation (MSA), where the loss function is computed based on a distance between the estimated magnitude of a target source obtained by multiplying the estimated mask with the mixture magnitude, and a reference magnitude. Some embodiments use phase-sensitive spectrum approximation (PSA), where the loss function is computed based on a distance between the estimated magnitude of a target source obtained by multiplying the estimated mask with the mixture magnitude, and a reference magnitude multiplied by a term depending on the phase difference between the mixture and the source. Some embodiments use truncated phase-sensitive spectrum approximation (tPSA), where the loss function is computed based on a distance between the estimated magnitude of a target source obtained by multiplying the estimated mask with the mixture magnitude, and the truncation to a given range of the output of the multiplication of a reference magnitude multiplied with a term depending on the phase difference between the mixture and the source.

Learned through experimentation, was that using a logistic sigmoid activation for the last layer of a mask-inference network together with an objective function measuring a truncated phase-sensitive approximation using the $L_1$ distance led to the best results among mask-inference (MI) networks:

$$\mathcal{L}_{MI,tPSA,L_1} = \min_{\pi \in \mathcal{P}} \sum_c \left\| \hat{M}_c \circ |X| - T_0^{|X|}(|S_{\pi(c)}| \circ \cos(\theta_X - \theta_{\pi(c)})) \right\|_1,$$

where $\mathcal{P}$ is the set of permutations on $\{1, \ldots, C\}$, $|X|$ and $\theta_x$ are the magnitude and phase of the mixture, $\hat{M}_c$ the c-th estimated mask, $|S_c|$ and $\theta_c$ the magnitude and phase of the c-th reference source, and $T_a^b(x)=\min(\max(x, a), b)$.

Some embodiments use a chimera network that combines deep clustering with mask inference in a multi-task learning fashion, leveraging the regularizing property of the deep clustering loss and the simplicity of the mask-inference network. These embodiments use an architecture which predicts a mask directly from the BLSTM hidden layer output, via a fully-connected layer. The speaker separation loss $\mathcal{L}_{ss}$ that is being minimized is a weighted sum of the deep clustering loss and the MI loss:

$$\mathcal{L}_{ss} = \alpha_{DC} \mathcal{L}_{DC} + (1 - \alpha_{DC}) \mathcal{L}_{MI},$$

where $\mathcal{L}_{DC}$ is a deep-clustering loss involving the embeddings, such as the $\mathcal{L}_{DC,classic}$ and $\mathcal{L}_{DC,W}$ losses mentioned above, $\mathcal{L}_{MI}$ is a mask-inference loss involving the masks, such as the $\mathcal{L}_{MI,tPSA,L_1}$ loss mentioned above, and $\alpha_{DC}$ is a weight, $0 \leq \alpha_{DC} \leq 1$. The deep clustering loss $\mathcal{L}_{DC}$ is an example of embedding loss $\mathcal{L}_{emb}$ involving the embeddings. The mask-inference loss $\mathcal{L}_{MI}$ is an example of separation encoding loss $\mathcal{L}_{SE}$ involving separation encodings: in the case of a mask-inference network, the separation encodings can be defined as the estimated magnitude spectrograms of the target speakers. A more general expression for the speaker separation loss $\mathcal{L}_{ss}$ is thus $$\mathcal{L}_{ss} = \alpha_{emb} \mathcal{L}_{emb} + (1-\alpha_{emb}) \mathcal{L}_{SE},$$

where $\alpha_{emb}$ is a weight, $0 \leq \alpha_{emb} \leq 1$. Other embedding losses and separation encoding losses could be considered as well, for example by using the embeddings as well to obtain masks, for example via a clustering step, and computing a separation encoding loss as a mask-inference loss based on these masks.

At run time, in some embodiments, the MI output can be used to make predictions, in which case the computations that are specific to the deep clustering branch can be omitted. In other embodiments, the deep clustering embeddings can be converted into masks using a clustering algorithm, in which case the computations that are specific to the mask inference branch can be omitted.

By setting the weight $\alpha_{DC}$ to 0, some embodiments effectively train a mask-inference network. By setting the weight $\alpha_{DC}$ to 1, some embodiments effectively train a deep-clustering network.

If the separated signals are desired, they can be reconstructed by multiplying the estimated mask for a target speaker with the complex spectrogram of the input mixture to obtain an estimated complex spectrogram for that target speaker, and applying inverse short-time Fourier transform to that estimated complex spectrogram to obtain a time-domain waveform signal.

Speech Recognition with Explicit Separation

Speech Recognition—Connectionist Temporal Classification (CTC)

Some embodiments of the present disclosure use a hybrid CTC/attention architecture to better utilize the strengths and mitigate shortcomings of each approach.

CTC maps an input sequence to an output sequence of shorter length. We assume here that the input to our model is a T-length sequence of frame activations $X=\{x_t \in \mathbb{R}^d | t=1, \ldots, T\}$ and the output is an L-length character sequence $C=\{c_l \in \mathcal{U} | l=1, \ldots, L\}$ from a set of distinct characters $\mathcal{U}$. CTC introduces a "blank" symbol to give a one-to-one correspondence between inputs X and outputs $Z=\{z_t \in \mathcal{U} \cup <\text{blank}> | t=1, \ldots, T\}$. By using conditional independence assumptions, the posterior distribution p(C|X) can then factorized as follows:

$$p(C|X) \approx \sum_Z \prod_t p(z_t | z_{t-1}, C) p(z_t | X) p(C).$$

We define:

$$p_{ctc}(C|X) \triangleq \sum_Z \prod_t p(z_t | z_{t-1}, C) p(z_t | X).$$

The CTC objective can be defined as $\mathcal{L}_{ctc} = -\log p_{ctc}(C|X)$, which does not include the language model p(C).

A stacked bidirectional long short-term memory (BLSTM) network can be used to obtain the framewise posterior distribution $p(z_t | X)$ conditioned on all inputs X:

$$p(z_t | X) = \text{Softmax}(Lin(h_t))$$

$$h_t = BLSTM(X).$$

Speech Recognition—Attention Based Encoder-Decoder

Attention-based methods use the chain rule to directly estimate the posterior p(C|X) without making conditional independence assumptions as with CTC:

$$p_{att}(C|X) = \prod_l p(c_l | c_1, \ldots, c_{l-1}, X).$$

We define $\mathcal{L}_{att} = -\log p_{att}(C|X)$ as the attention-based objective. $p(c_l | c_1, \ldots, c_{l-1}, X)$ is obtained by:

$$p(c_l | c_1, \ldots, c_{l-1}, X) = \text{Decoder}(r_l, q_{l-1}, c_{l-1})$$

$$h_t = \text{Encoder}(X)$$

$$a_{lt} = \text{Attention}(\{a_{l-1}\}_t, q_{l-1}, h_t)$$

$$r_l = \sum_t a_{lt} h_t.$$

The inputs $X=\{x_t\}_{t=1}^T$ are converted into framewise hidden vectors $h_t$ using an encoder network. For example, a BLSTM network can be used for the encoder network, in which case $\text{Encoder}(X) \triangleq BLSTM(X)$. Attention(•) in the equation above is based on a location-based attention mechanism with convolutional features. A decoder network is another recurrent network conditioned on the previous output $c_{l-1}$, the hidden vector $q_{l-1}$, and the character-wise hidden vector $r_l$. We can use $\text{Decoder}(\bullet) \triangleq \text{Softmax}(\text{Lin}(LSTM(\bullet)))$.

Speech Recognition—Multitask Learning

Attention-based models make predictions conditioned on all the previous predictions, and thus can learn language-model-like output contexts. However, without strict monotonicity constraints, these attention-based decoder models can be too flexible and may learn sub-optimal alignments or converge more slowly to desirable alignments.

In the hybrid system, the BLSTM encoder is shared by both the CTC and attention decoder networks. Unlike the attention model, the forward-backward algorithm of CTC enforces monotonic alignment between speech and label sequences during training. This approach helps to guide the system toward monotonic alignments. The multi-task objective to be minimized becomes: $\mathcal{L}_{ASR} = -(\lambda \log p_{ctc}(C|X) + (1-\lambda)\log p_{att}(C|X)) = \lambda \mathcal{L}_{CTC} + (1-\lambda)\mathcal{L}_{att}$, with a tunable parameter $\lambda: 0 \leq \lambda \leq 1$.

Speech Recognition—Decoding

The inference step of attention-based speech recognition is performed by output-label synchronous decoding with a beam search. However, we also take the CTC probabilities into account to find a better aligned hypothesis to the input speech, i.e., the decoder finds the most probable character sequence Ĉ given speech input X, according to $$\hat{C} = \arg\max_{C \in \mathcal{U}^*} \{\lambda \log p_{ctc}(C \mid X) + (1-\lambda) \log p_{att}(C \mid X)\}.$$

In the beam search process, the decoder computes a score of each partial hypothesis. During the beam search, the number of partial hypotheses for each length is limited to a pre-defined number, called a beam width, to exclude hypotheses with relatively low scores, which dramatically improves the search efficiency.

Joint Speech Separation and Recognition

To connect the separation and recognition network components into a joint system, we use the masks output from the chimera network to extract each source in the form of estimated magnitude spectrograms, by multiplying the magnitude spectrogram of the input mixture with the mask for each source. The estimated magnitude spectrogram for each source is used as separation encoding for that source. An acoustic encoder network computes log-mel filterbank features from the separation encodings, i.e., the estimated magnitude spectrograms, and uses the encoder network of the above hybrid CTC/attention architecture to output recognition encodings for each source.

In order to choose the source-transcript permutation during training, two natural options are to use either the permutation $\pi_{sig}$ that minimizes the signal-level approximation error for the separated signals, or the permutation $\pi_{asr}$ that minimizes the ASR loss:

$$\pi_{sig} = \arg\min_{\pi \in \mathcal{P}} \sum_c \left\| \hat{M}_c \cdot |X| - |S_{\pi(c)}| \right\|_F^2,$$

$$\pi_{asr} = \arg\min_{\pi \in \mathcal{P}} -\sum_c (\lambda \log p_{ctc}(C_c \mid X_{\pi(c)}) + (1-\lambda) \log p_{att}(C_c \mid X_{\pi(c)})).$$

The permutation $\pi_{sig}$ can be used when the available data includes ground truth for the separated signals, for example when the mixtures in the dataset have been obtained by artificially mixing single-speaker speech together. On the other hand, the permutation $\pi_{asr}$ has the advantage that it does not rely on the availability of a ground truth for the separated signals, and would thus allow for training on larger and acoustically more realistic data where only transcription-level labels are available.

There are multiple ways to train the joint separation and recognition network. For example, in some embodiments, the separation network is first trained by itself on data where the ground truth for the separated signals is available, the recognition network is trained by itself on clean single-speaker speech with reference labels, and the combination of the two pre-trained networks is then fine-tuned by further training based on a loss function consisting of either the recognition loss alone, or a weighted combination of the recognition loss and the separation loss. The weight in the combination can be determined through experiments, based on the performance on a held out validation set.

Multi-Speaker Speech Recognition with Implicit Separation

In other embodiments, no explicit separation is performed, and an end-to-end ASR system is designed to directly recognize the speech of multiple target speakers within a mixture of multiple speakers speaking simultaneously.

Some embodiments of the present disclosure include a new sequence-to-sequence framework to directly decode multiple label sequences from a single speech sequence by unifying source separation and speech recognition functions in an end-to-end manner. Some aspects of the present disclosure can include a new objective function that promotes disjointness in the hidden vectors to avoid generating similar hypotheses. Aspects of the present disclosure include a two-step procedure that combines deep clustering and end-to-end speech recognition, without performing an explicit speech separation step, which proved successful during experimentation.

During experimentation, a training procedure was learned to apply permutation with low computational cost by taking advantage of a joint CTC/attention-based encoder-decoder network. Experimental results show that the model is able to directly convert an input speech mixture into multiple label sequences without requiring any explicit intermediate representation including phonetic alignment information or corresponding unmixed speech.

Learned during experimentation was a permutation-free training scheme that extends the usual one-to-one mapping of outputs and labels for backpropagation to one-to-many by selecting the proper permutation of hypotheses and references, thus allowing the network to generate multiple independent hypotheses from a single-channel speech mixture. For example, when a speech mixture contains speech uttered by S speakers simultaneously, the network generates S label sequences $Y^s = (y_1^s, \ldots, y_{N_s}^s)$ with $N_s$ labels from the T-frame sequence of D-dimensional input feature vectors, $O = (o_t \in \mathbb{R}^D \mid t = 1, \ldots, T)$:

$$Y^s = g^s(O), s = 1, \ldots, S,$$

where the transformations $g^s$ are implemented as neural networks which typically share some components with each other. In the training stage, all possible permutations of the S sequences $R^s = (r_1^s, \ldots, r_{N_s'}^s)$ of $N_s'$ reference labels are considered (considering permutations on the hypotheses would be equivalent), and the one leading to minimum loss is adopted for backpropagation. Let $\mathcal{P}$ denote the set of permutations on $\{1, \ldots, S\}$. The final loss $\mathcal{L}$ is defined as $$\mathcal{L} = \min_{\pi \in \mathcal{P}} \sum_{s=1}^{S} \mathrm{Loss}(Y^s, R^{\pi(s)}),$$

where $\pi(s)$ is s-th element of a permutation $\pi$. For example, for two speakers, $\mathcal{P}$ includes two permutations (1,2) and (2,1), and the loss is defined as:

$$\mathcal{L} = \min(\mathrm{Loss}(Y^1, R^1) + \mathrm{Loss}(Y^2, R^2), \mathrm{Loss}(Y^1, R^2) + \mathrm{Loss}(Y^2, R^1)).$$

According to embodiments of the present disclosure, an attention-based encoder-decoder network predicts a target label sequence $Y = (y_1, \ldots, y_N)$ without requiring intermediate representation from an input feature vector sequence O and the past label history. At inference time, the previously emitted labels are used, while at training time, they are replaced by the reference label sequence $R = (r_1, \ldots, r_N)$ in a teacher-forcing fashion. The probability of the n-th label $y_n$ can be computed by conditioning on the past history $y_{1:n-1}$:

$$p_{att}(Y \mid O) = \prod_{n=1}^{N} p_{att}(y_n \mid O, y_{1:n-1}).$$

The model can be composed of two main sub-modules, an encoder network and a decoder network. The encoder network transforms the input feature vector sequence into a high-level representation $H=(h_l \in \mathbb{R}^C | l=1, \ldots, L)$. The decoder network emits labels based on the label history y and a context vector c calculated using an attention mechanism which weights and sums the C-dimensional sequence of representation H with attention weight a. A hidden state e of the decoder is updated based on the previous state, the previous context vector, and the emitted label. This mechanism is summarized as follows:

$H=\text{Encoder}(O)$, $y_n \sim \text{Decoder}(c_n, y_{n-1})$, $c_n, a_n = \text{Attention}(a_{n-1}, e_n, H)$, $e_n = \text{Update}(e_{n-1}, c_{n-1}, y_{n-1})$.

The decoder network sequentially generates the n-th label $y_n$ using the context vector $c_n$ and the label history $y_{1:n-1}$:

$y_n \sim \text{Decoder}(c_n, y_{n-1})$.

The context vector is calculated in a location based attention mechanism which weights and sums the C-dimensional sequence of representation $H=(h_l \in \mathbb{R}^C | l=1, \ldots, L)$ with attention weight $a_{n,l}$:

$$c_n = \text{Attention}(a_{n-1}, e_n, H),$$
$$\overset{\Delta}{=} \sum_{l=1}^{L} a_{n,l} h_l.$$

The location based attention mechanism defines the $a_{n,l}$ as follows:

$$a_{n,l} = \frac{\exp(\alpha k_{n,l})}{\sum_{l=1}^{L} \exp(\alpha k_{n,l})},$$

$$k_{n,l} = w^T \tanh(V^E e_{n-1} + V^H h_l + V^F f_{n,l} + b),$$

$$f_n = F * a_{n-1},$$

where w, $V^E$, $V^H$, $V^F$, b, F are tunable parameters, $\alpha$ is a constant value called inverse temperature, and * is convolution operation. The introduction of $f_n$ makes the attention mechanism to take into account the previous alignment information. In some experiments, for example, 10 convolution filters of width 200 can be used, and $\alpha$ can be set to 2.

The hidden state e is updated recursively by an updating LSTM function:

$e_n = \text{Update}(e_{n-1}, c_{n-1}, y_{n-1})$, $\overset{\Delta}{=} \text{LSTM}(\text{Lin}(e_{n-1}) + \text{Lin}(c_{n-1}) + \text{Emb}(y_{n-1}))$, where Emb(•) is an embedding function.

The encoder and decoder networks can be trained to maximize conditional probability using backpropagation:

$\mathcal{L}_{att} = \text{LOSS}_{att}(Y, R)$, where R is a ground truth reference label sequence and $\text{Loss}_{att}$ is the cross-entropy loss function.

Regarding the joint CTC/attention approach, some embodiments use the connectionist temporal classification (CTC) objective function as an auxiliary task to train the network. Unlike an attention model, the forward-backward algorithm of CTC enforces monotonic alignment between the input speech and the output label sequences during training and decoding. The CTC loss can be calculated from the output of the encoder network as $\mathcal{L}_{ctc} = \text{Loss}_{ctc}(\text{Encoder}(O), R)$.

The CTC loss and the attention-based encoder-decoder loss can be combined with an interpolation weight $\lambda \in [0,1]$:

$\mathcal{L}_{ASR} = \lambda \mathcal{L}_{ctc} + (1-\lambda) \mathcal{L}_{att}$

Both CTC and encoder-decoder networks can also be used in the inference step. The final hypothesis is a sequence that maximizes a weighted conditional probability:

$$\hat{Y} = \underset{Y}{\arg\max} \{ \gamma \log p_{ctc}(Y|O) + (1-\gamma) \log p_{att}(Y|O) \},$$

where $\gamma \in [0,1]$ is an interpolation weight.

Some embodiments of the present disclosure train a multi-speaker end-to-end joint CTC/attention-based network. Wherein the encoder network transforms an input sequence O into a set of high-level feature sequences by passing through source-independent (shared) and source-dependent (specific) encoder networks. The label permutation minimizing the CTC loss between $Y_{ctc}$ and R is selected, and the decoder network generates output label sequences using the permuted reference labels for teacher forcing.

To make the network output multiple hypotheses, considered during experimentation was a stacked architecture that combines both shared and unshared (or specific) neural network modules. This particular architecture splits the encoder network into three stages: (First stage) the first stage, also referred to as mixture encoder, processes the input sequence and outputs an intermediate feature sequence H, also referred to as mixture encoding; (second stage) that sequence, or mixture encoding, is then processed by S independent encoder sub-networks which do not share parameters, also referred to as speaker-differentiating encoders, leading to S feature sequences $H^s$, also referred to as speaker-differentiated encodings; (third stage) at the last stage, each feature sequence $H^s$ is independently processed by the same network, also referred to as recognition encoder, leading to S final high-level representations $G^s$, also referred to as recognition encodings.

Let $u \in \{1 \ldots, S\}$ denote an output index (corresponding to the transcription of the speech by one of the target speakers), and $v \in \{1 \ldots, S\}$ denote a reference index. Denoting by $\text{Encoder}_{Mix}$, the mixture encoder, $\text{Encoder}_{SD}^u$ the u-th speaker-differentiating encoder, and $\text{Encoder}_{Rec}$ the recognition encoder, an input sequence O corresponding to an input mixture can be processed by the encoder network as follows:

$H = \text{Encoder}_{Mix}(O)$, $H^u = \text{Encoder}_{SD}^u(H)$, $G^u = \text{Encoder}_{Rec}(H^u)$.

At least one motivation, among many motivations, for designing such an architecture can be explained as follows, following analogies with architectures where separation and recognition are explicitly performed separately: the first stage, i.e., mixture encoder, encodes the mixture into encodings that can be used to distinguish between the multiple sources; the source-dependent second stage, i.e., the set of speaker-differentiating encoders, uses the first stage's output to disentangle each speaker's speech content from the mixture, and prepare it for recognition; the final stage is amenable to an acoustic model that encodes the single-speaker speech for final decoding by the decoder.

The decoder network computes the conditional probabilities for each speaker from the S outputs of the encoder network. In general, the decoder network uses the reference label R as a history to generate the attention weights during training, in a teacher-forcing fashion. However, in the above permutation-free training scheme, the reference label to be attributed to a particular output is not determined until the loss function is computed, wherein the attention decoder is run for all reference labels. Thus, the conditional probability of the decoder output $Y^{u,v}$ for each output $G^u$ of the encoder network under the assumption that the reference label for that output is $R^v$ is considered:

$$p_{att}(Y^{u,v} \mid O) = \prod^n p_{att}(y_n^{u,v} \mid O, y_{1:n-1}^{u,v}),$$

$$c_n^{u,v}, a_n^{u,v} = \text{Attention}(a_{n-1}^{u,v}, e_n^{u,v}, G^u),$$

$$e_n^{u,v} = \text{Update}(e_{n-1}^{u,v}, c_{n-1}^{u,v}, y_{n-1}^{v,v}),$$

$$y_n^{u,v} \sim \text{Decoder}(c_n^{u,v}, y_{n-1}^{u,v}).$$

The final loss is then calculated by considering all permutations of the reference labels as follows:

$$\mathcal{L}_{att} = \min_{\pi \in \mathcal{P}} \sum^S \text{Loss}_{att}(Y^{s,\pi(s)}, R^{\pi(s)}).$$

In order to reduce the computational cost compared to the cost involved when considering all possible reference labels $R^v$ for each output $G^u$ of the encoder network, the permutation of the reference labels can be fixed based on the minimization of the CTC loss alone, and then the same permutation for the attention mechanism can be used as well. This can be at least one advantage, among many advantages, of using a joint CTC/attention based end-to-end speech recognition. Permutation is performed only for the CTC loss by assuming synchronous output where the permutation is decided by the output of CTC:

$$\hat{\pi} = \underset{\pi \in \mathcal{P}}{\text{argmin}} \sum^S \mathcal{L}_{ctc}^{s,\pi(s)}, \text{ where } \mathcal{L}_{ctc}^{u,v} = \text{Loss}_{ctc}(G^u, R^v).$$

Attention-based decoding can then be performed on the same hidden representations $G^u$, using teacher forcing with the labels determined by the permutation $\hat{\pi}$ that minimizes the CTC loss:

$$p_{att}(Y^{u,\hat{\pi}(u)} \mid O) = \prod^n p_{att}(y_n^{u,\hat{\pi}(u)} \mid O, y_{1:n-1}^{u,\hat{\pi}(u)}),$$

$$c_n^{u,\hat{\pi}(u)}, a_n^{u,\hat{\pi}(u)} = \text{Attention}(a_{n-1}^{u,\hat{\pi}(u)}, e_n^{u,\hat{\pi}(u)}, G^u),$$

$$e_n^{u,\hat{\pi}(u)} = \text{Update}(e_{n-1}^{u,\hat{\pi}(u)}, c_{n-1}^{u,\hat{\pi}(u)}, y_{n-1}^{u,\hat{\pi}(u)}),$$

$$y_n^{u,\hat{\pi}(u)} \sim \text{Decoder}(c_n^{u,\hat{\pi}(u)}, y_{n-1}^{u,\hat{\pi}(u)}).$$

In contrast with the case where all possible references are considered, the attention-based decoding is then only run once for each output $G^u$ of the encoder network. The final loss can be defined as the sum of two objective functions with interpolation $\lambda$:

$$\mathcal{L}_{ASR} = \lambda \mathcal{L}_{ctc} + (1-\lambda)\mathcal{L}_{att},$$

$$\mathcal{L}_{ctc} = \sum^S \mathcal{L}_{ctc}^{s,\hat{\pi}(s)},$$

$$\mathcal{L}_{att} = \sum^S \text{Loss}_{att}(Y^{s,\hat{\pi}(s)}, R^{\hat{\pi}(s)}), \text{ where } \hat{\pi} = \underset{\pi \in \mathcal{P}}{\text{argmin}} \sum^S \mathcal{L}_{ctc}^{s,\pi(s)}.$$

At inference time, because both CTC and attention-based decoding are performed on the same encoder output $G^u$ and should thus pertain to the same speaker, their scores can be incorporated as follows:

$$\hat{Y}^u = \underset{Y^u}{\text{argmax}}\{\gamma \log p_{ctc}(Y^u \mid G^u) + (1-\gamma)\log p_{att}(Y^u \mid G^u)\},$$

where $p_{ctc}(Y^u|G^u)$ and $p_{att}(Y^u|G^u)$ are obtained with the same encoder output $G^u$.

A single decoder network can be used to output multiple label sequences by independently decoding the multiple hidden vectors generated by the encoder network. In order for this single decoder network to generate multiple different label sequences, each of its inputs, that is, each of the hidden vector sequences output by the encoder network, also referred to as recognition encodings, should be sufficiently different from the others. In order to promote this difference among hidden vectors, a new term based on the negative symmetric Kullback-Leibler (KL) divergence can be introduced in the objective function. In the particular case of two-speaker mixtures, consider the following additional loss function:

$$\mathcal{L}_{KL} = -\eta \sum^l \{KL(\overline{G^1}(l) \| \overline{G^2}(l)) + KL(\overline{G^2}(l) \| \overline{G^1}(l))\},$$

where $\eta$ is a small constant value, and $\overline{G^u} = (\text{softmax}(G^u(l))|l=1,\ldots,L)$ is obtained from the hidden vector sequence $G^u$ at the output of the encoder network by applying an additional frame-wise softmax operation in order to obtain a quantity amenable to a probability distribution.

Various network architectures can be considered, in particular for the encoder network. In some embodiments, we can use a VGG network as the mixture encoder, a BLSTM with one or more layers for each speaker-differentiating encoder, and a BLSTM with one or more layers for the recognition encoder. In some other embodiments, we can use one or more layers of a VGG network as the mixture encoder, use one or more layers of a VGG network for each speaker-differentiating encoder, and use a BLSTM with one or more layers for the recognition encoder. In yet some other embodiments, we can use one or more layers of a VGG network as the mixture encoder, use one or more layers of a VGG network followed by one or more BLSTM layers for each speaker-differentiating encoder, and use a BLSTM with one or more layers for the recognition encoder.

In our experiments implementing some of the embodiments, 80-dimensional log Mel filterbank coefficients with pitch features and their delta and delta features (83×3=249-dimension) are used as input features. An input feature can be normalized to zero mean and unit variance.

For example, in some experiments, the mixture encoder consisted of a 6-layer VGG network (convolution, convolution, max-pooling, convolution, convolution, max-pooling), each speaker-differentiating encoder consisted of a 2-layer BLSTM network, and the recognition encoder consisted of a 5-layer BLSTM network. The VGG-network has the following 6-layer CNN architecture, in order from bottom (i.e., first) to top (i.e., last):

Convolution (# in =3, # out=64, filter=3×3)
Convolution (# in =64, # out=64, filter=3×3)
MaxPooling (patch=2×2, stride=2×2)
Convolution (# in =64, # out=128, filter=3×3)
Convolution (# in=128, # out=128, filter=3×3)
MaxPooling (patch=2×2, stride=2×2)

The first 3 channels are statistic, delta, and delta features. The BLSTM layer can be defined as the concatenation of forward-LSTM $\overrightarrow{LSTM(\cdot)}$ and backward-LSTM $\overleftarrow{LSTM(\cdot)}$ using a linear projection layer Lin(•):

$$\overrightarrow{H} = \overrightarrow{LSTM}(\cdot),$$

$$\overleftarrow{H} = \overleftarrow{LSTM}(\cdot),$$

$$H=[Lin(\overrightarrow{H});Lin(\overleftarrow{H})].$$

Each BLSTM layer can have 320 cells in the forward-LSTM and the backward-LSTM, and 320 units in the linear projection layer. The decoder network can have a 1-layer LSTM with 320 cells.

In some experiments, the mixture encoder consisted of the bottom four layers (convolution, convolution, max-pooling, convolution) of the above 6-layer VGG network, each speaker-differentiating encoder consisted of the top two layers of the above 6-layer VGG network (convolution, max-pooling), and the recognition encoder consisted of a 7-layer BLSTM network.

The networks were initialized randomly from uniform distribution in the range from −0.1 to 0.1. The AdaDelta algorithm was used with gradient clipping for optimization. The AdaDelta hyper-parameters were initialized as ρ=0.95 and ϵ=$10^{-8}$. ϵ is decayed to halve when the loss of development set was degraded. The networks were first trained using single-speaker speech, with only one speaker-differentiating network, and the network parameters are optimized to output the label sequence of the single speaker. The architecture of the speaker-differentiating network is then replicated to obtain as many speaker-differentiating networks as there are target speakers. The parameters of the newly added speaker-differentiating networks are obtained from the parameters of the speaker-differentiating network from the initial network trained using single-speaker speech by copying the parameters with random perturbation, w'=w×(1+Uniform(−0.1,0.1)) for each parameter w. The model can be trained first without the negative KL divergence loss, then retrained with addition of the negative KL divergence loss with weight η, where η was set to 0.1 in some of our experiments. The weight λ used to balance the CTC and attention losses in the objective function can for example be determined experimentally based on performance on a held-out dataset.

In the inference stage, a pre-trained RNNLM (Recurrent neural network language model) can be combined in parallel with the CTC and decoder network. Their label probabilities can be linearly combined in the log domain during beam search to find the most likely hypothesis.

Multi-Lingual Multi-Speaker Speech Recognition

Some embodiments of the present disclosure include an end-to-end multi-lingual multi-speaker ASR system. The character set from which the system selects the characters to output can be set to a final augmented character set $\mathcal{U}^{final}$ consisting of the union of the character sets of multiple languages together with a set of language IDs. A system such as the multi-speaker ASR system with implicit separation can be trained on a dataset of multi-lingual multi-speaker mixtures and their reference labels. For example, such a dataset can be obtained by concatenating in time multiple single-speaker utterances in one or more languages and from one or more speakers to obtain a set of multi-lingual speech utterances, and by further mixing multiple multi-lingual speech utterances to obtained multi-speaker multi-lingual speech. The corresponding reference labels for the multi-speaker multi-lingual speech can be obtained from the reference labels for the single-speaker utterances.

Figure 17A:
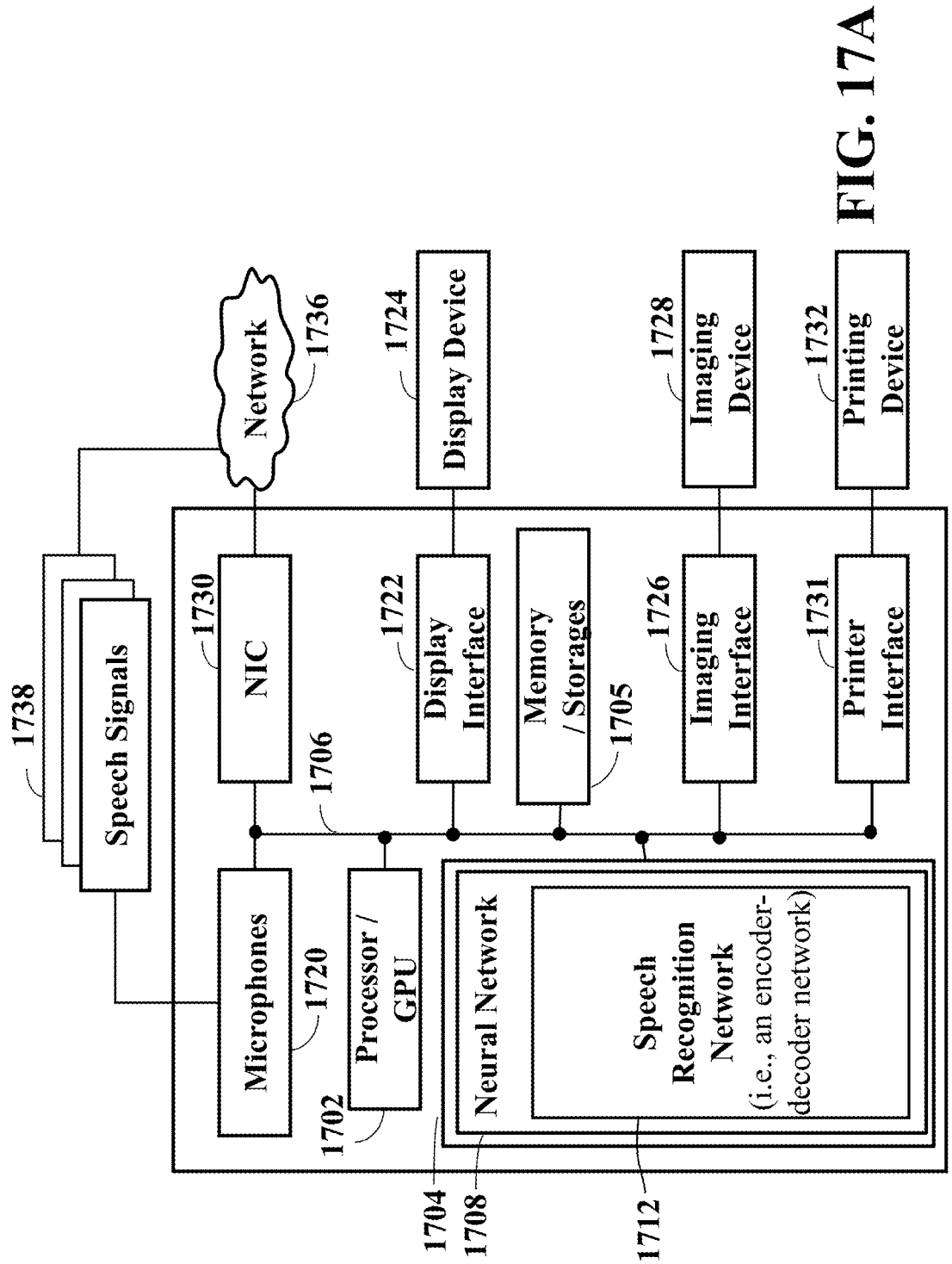
FIG. 17A and FIG. 17B show block diagrams of alternative speech recognition systems for speech recognition, in particular, FIG. 17A includes a speech recognition network, i.e., an encoder-decoder network, and FIG. 17B includes a speech separation network along with a hybrid CTC/Attention-based speech recognition ASR network, in accordance with some embodiments of the present disclosure.
Figure 17B:
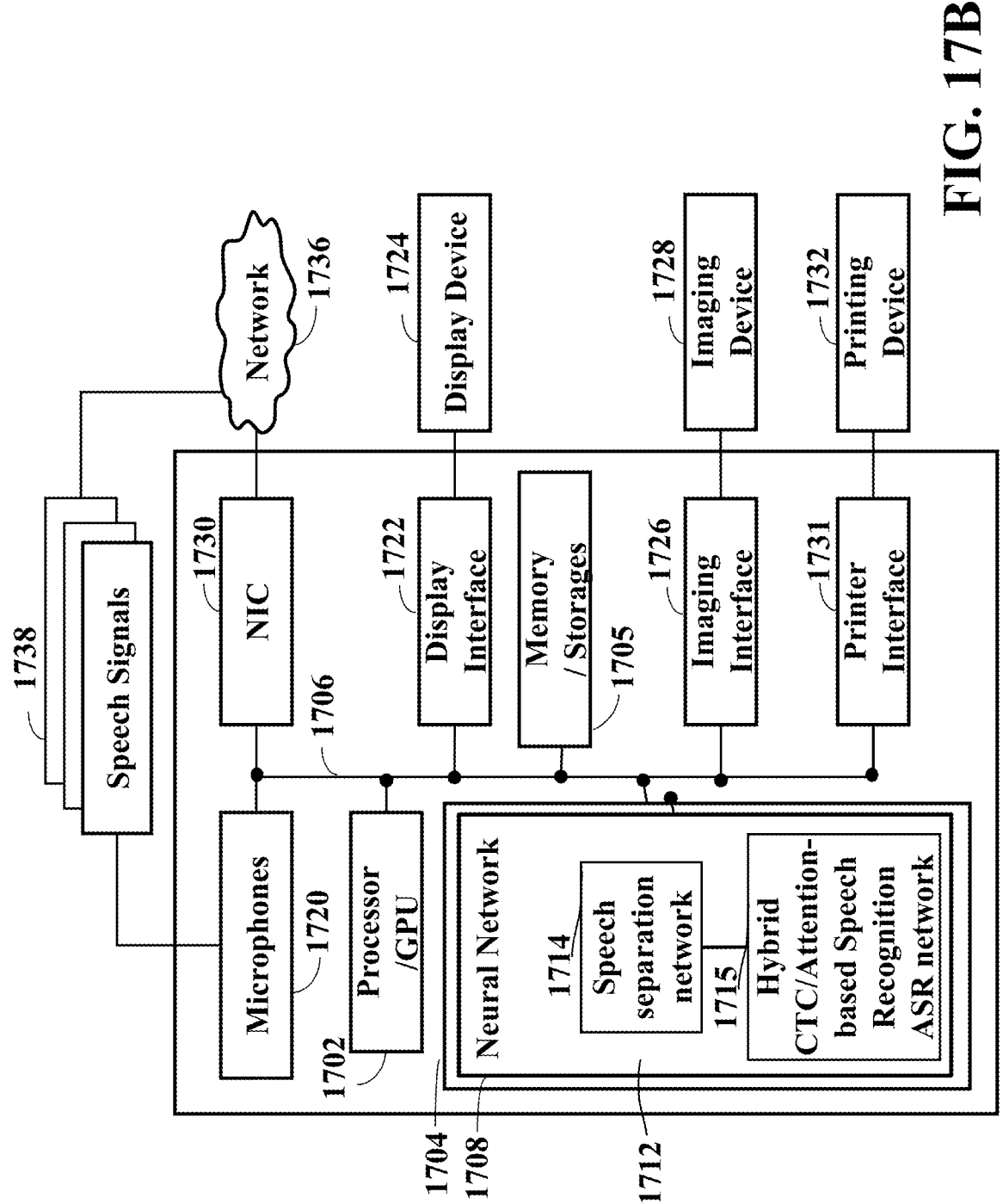

FIG. 17A and FIG. 17B show block diagrams of other speech recognition systems for speech recognition, in particular, FIG. 17A includes a speech recognition network, i.e., an encoder-decoder network, and FIG. 17B includes a speech separation network along with a hybrid CTC/Attention-based encoder decoder ASR network, in accordance with some embodiments of the present disclosure.

Referring to FIG. 17A, system 1700A includes a processor 1702 configured to execute stored instructions, as well as a memory 1704 that stores instructions regarding an automatic speech recognition (ASR) network, an encoder decoder network 1710, a hybrid CTC/Attention-based encoder decoder ASR network 1712. The processor 1702 can be a single core processor, a multi-core processor, a graphic processing unit (GPU), a computing cluster, or any number of other configurations. The memory/storage 1705 can include random access memory (RAM), read only memory (ROM), flash memory, or any other suitable memory systems. The memory 1705 can also include a hard drive, an optical drive, a thumbdrive, an array of drives, or any combinations thereof. The processor 1702 is connected through a bus 1706 to one or more input and output interfaces/devices.

The memory 1705 stores the neural network 1708 trained to transform multi-channel speech signals into a text and the processor 1702 executing the stored instructions performs the speech recognition using the neural network 1708 retrieved from the memory 1705. The neural network 1708 is trained to transform multi-channel noisy speech signals into a text. The neural network 1708 may include an encoder-decoder network 1712, which is trained to recognize text from speech features of the acoustic signals.

In one embodiment, the neural network 1708 also includes a feature extractor (not shown) configured to extract the speech features from the single-channel signal to be used by the encoder-decoder network. The feature extractor is a differentiable function and thus can be connected into the single end-to-end neural network. Examples of the differentiable function include a Mel function of a magnitude of the channel signal and a bark function of a magnitude of the channel signal.

In one implementation, the differentiable function is another neural sub-network trained to extract the speech features from the channel signal. In this implementation, the feature extraction sub-network is jointly trained with the encoder-decoder network.

A differentiable function can be optimized using a gradient descent method so that the output of the function approaches a target output for a given input. The function can also be approximated to an unknown mapping function using paired input and target output samples so that all the input samples are mapped to the corresponding target samples as correctly as possible.

Since composition of differentiable functions is also differentiable, we can combine cascaded processing modules, each of which is designed as a differentiable function, to optimize them jointly.

Neural networks are differentiable functions. In this invention, all the components of end-to-end multichannel speech recognition can be implemented with differentiable functions including multiple neural networks.

The system 1700A can include an input interface, i.e. microphone 1720, to accept speech signals and an output interface, i.e. display interface 1722, to render the recognized text. For example, multiple microphones 1720 can convert sound into multi-channel speech signals 1738. Additionally, or alternatively, the input interface can include a network interface controller (NIC) 1730 adapted to connect the system 1700A through the bus 1706 to a network 1736. Through the network 1736, the speech signal 1738 can be downloaded and stored for further processing.

Still referring to FIG. 17A, other examples of the output interface can include an imaging interface 1726, and a printer interface 1730. For example, the system 1700A can be linked through the bus 1706 to a display interface 1722 adapted to connect the system 1700A to a display device 1724, wherein the display device 1724 can include a computer monitor, camera, television, projector, or mobile device, among others.

Additionally, or alternatively, the system 1700A can be connected to an imaging interface 1726 adapted to connect the system to an imaging device 1728. The imaging device 1728 can include a camera, computer, scanner, mobile device, a webcam, or any combination thereof. Additionally, or alternatively, the system 1700A can be connected to a printer interface 1731 adapted to connect the system 1700A to a printing device 1732. The printing device 1732 can include a liquid inkjet printer, solid ink printer, large-scale commercial printer, thermal printer, UV printer, or dye-sublimation printer, among others.

Referring to FIG. 17B, FIG. 17B includes a speech separation network along with a hybrid CTC/Attention-based encoder decoder ASR network, accordance with some embodiments of the present disclosure. The neural network 1708 includes a speech separation network 1714 and a hybrid CTC/Attention-based encoder decoder ASR network 1715. The speech separation network 1714 can process the speech signals 1738 to output the separated speech for each target speaker, for example in the form of speech features, and each separated speech is further processed by the hybrid CTC/Attention-based encoder decoder ASR network 1715 to output text by each target speaker. The speech separation network 1714 can be trained to separate speech from a mixture of speech signals. The hybrid CTC/Attention-based encoder decoder ASR network 1715 can be trained to output text from separated speech by the speech separation network 1714. Both the speech separation network 1714 and the hybrid CTC/Attention-based encoder decoder ASR network 1715 can be jointly trained to output text for each target speaker from speech signals consisting of a mixture of speech by multiple speakers speaking simultaneously. The neural network 1708 can be considered as an example of multi-speaker speech recognition network with explicit separation 911, as described in FIG. 9B: the speech separation network 1714 can be considered as an example of speaker separation network 942, while the encoder part of the hybrid CTC/Attention-based encoder decoder ASR network 1715 can be considered as an example of acoustic encoder network 946, and the decoder part of the hybrid CTC/Attention-based encoder decoder ASR network 1715 can be considered as an example of decoder network 950.

Figure 18A:
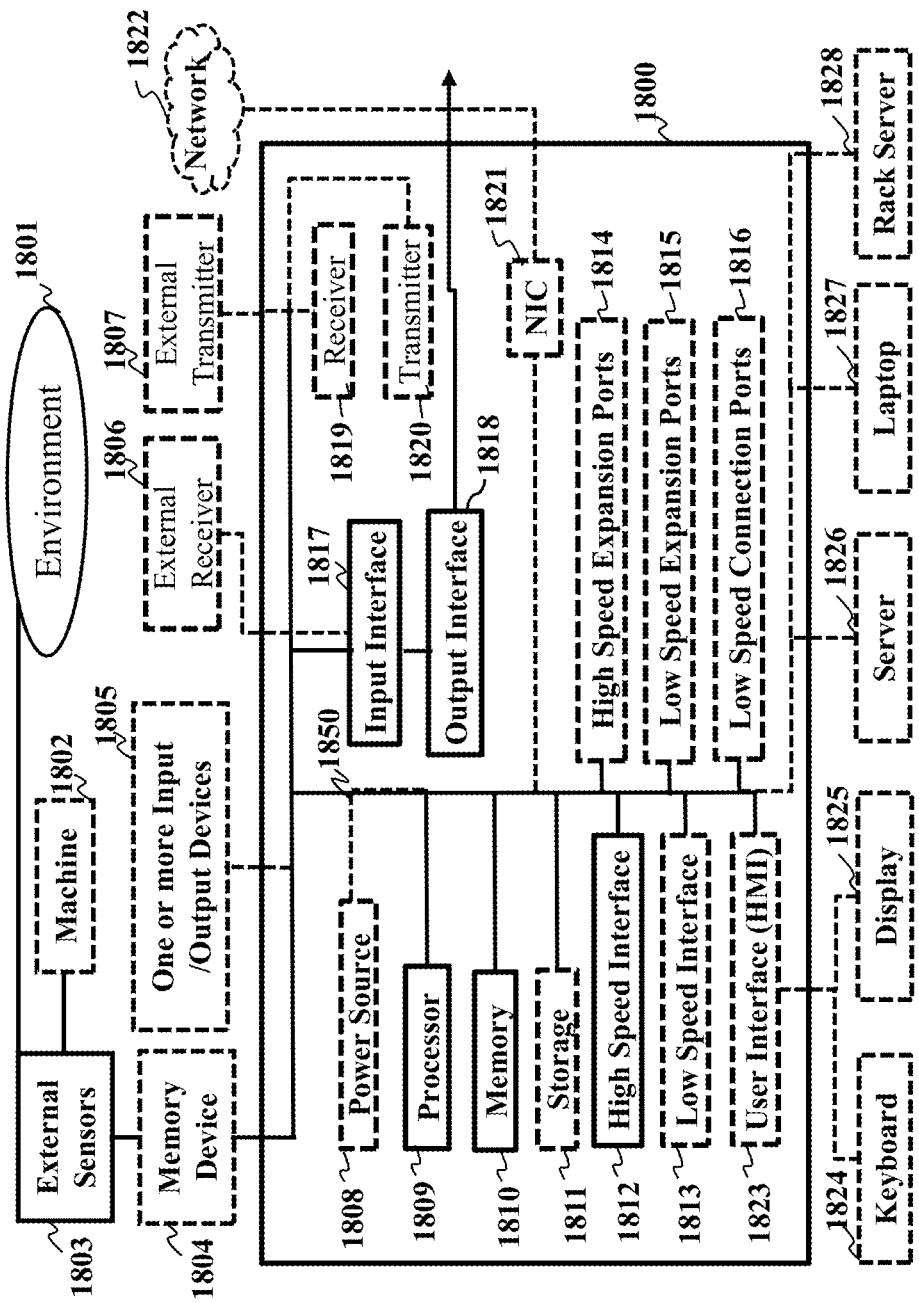
FIG. 18A is a schematic illustrating a computing apparatus that can be used to implement some techniques of the methods and systems, according to embodiments of the present disclosure.

FIG. 18A is a schematic illustrating by non-limiting example a computing apparatus 1800A that can be used to implement some techniques of the methods and systems, according to embodiments of the present disclosure. The computing apparatus or device 1800A represents various forms of digital computers, such as laptops, desktops, workstations, personal digital assistants, servers, blade servers, mainframes, and other appropriate computers.

The computing device 1800A can include a power source 1808, a processor 1809, a memory 1810, a storage device 1811, all connected to a bus 1850. Further, a high-speed interface 1812, a low-speed interface 1813, high-speed expansion ports 1814 and low speed connection ports 1815, can be connected to the bus 1850. Also, a low-speed expansion port 1816 is in connection with the bus 1850. Contemplated are various component configurations that may be mounted on a common motherboard, by non-limiting example, 1830, depending upon the specific application. Further still, an input interface 1817 can be connected via bus 1850 to an external receiver 1806 and an output interface 1818. A receiver 1819 can be connected to an external transmitter 1807 and a transmitter 1820 via the bus 1850. Also connected to the bus 1850 can be an external memory 1804, external sensors 1803, machine(s) 1802 and an environment 1801. Further, one or more external input/output devices 1805 can be connected to the bus 1850. A network interface controller (NIC) 1821 can be adapted to connect through the bus 1850 to a network 1822, wherein data or other data, among other things, can be rendered on a third party display device, third party imaging device, and/or third party printing device outside of the computer device 1800A.

Contemplated is that the memory 1810 can store instructions that are executable by the computer device 1800A, historical data, and any data that can be utilized by the methods and systems of the present disclosure. The memory 1810 can include random access memory (RAM), read only memory (ROM), flash memory, or any other suitable memory systems. The memory 1810 can be a volatile memory unit or units, and/or a non-volatile memory unit or units. The memory 1810 may also be another form of computer-readable medium, such as a magnetic or optical disk.

Still referring to FIG. 18A, a storage device 1811 can be adapted to store supplementary data and/or software modules used by the computer device 1800A. For example, the storage device 1811 can store historical data and other related data as mentioned above regarding the present disclosure. Additionally, or alternatively, the storage device 1811 can store historical data similar to data as mentioned above regarding the present disclosure. The storage device 1811 can include a hard drive, an optical drive, a thumb-drive, an array of drives, or any combinations thereof. Further, the storage device 1811 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1809), perform one or more methods, such as those described above.

The system can be linked through the bus 1850 optionally to a display interface or user Interface (HMI) 1823 adapted to connect the system to a display device 1825 and keyboard 1824, wherein the display device 1825 can include a computer monitor, camera, television, projector, or mobile device, among others.

Still referring to FIG. 18A, the computer device 1800A can include a user input interface 1817 adapted to a printer interface (not shown) can also be connected through bus 1850 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1812 manages bandwidth-intensive operations for the computing device 1800A, while the low-speed interface 1813 manages lower bandwidth-intensive operations. Such allocation of functions is an example only. In some implementations, the high-speed interface 1812 can be coupled to the memory 1810, a user interface (HMI) 1823, and to a keyboard 1824 and display 1825 (e.g., through a graphics processor or accelerator), and to the high-speed expansion ports 1814, which may accept various expansion cards (not shown) via bus 1850. In the implementation, the low-speed interface 1813 is coupled to the storage device 1811 and the low-speed expansion port 1815, via bus 1850. The low-speed expansion port 1815, which may include various communication ports (e.g., USB, Bluetooth, Ethernet, wireless Ethernet) may be coupled to one or more input/output devices 1805, and other devices a keyboard 1824, a pointing device (not shown), a scanner (not shown), or a networking device such as a switch or router, e.g., through a network adapter.

Still referring to FIG. 18A, the computing device 1800A may be implemented in a number of different forms, as shown in the figure. For example, it may be implemented as a standard server 1826, or multiple times in a group of such servers. In addition, it may be implemented in a personal computer such as a laptop computer 1827. It may also be implemented as part of a rack server system 1828. Alternatively, components from the computing device 1800A may be combined with other components in a mobile device (not shown), such as a mobile computing device 1800B of FIG. 18B. Each of such devices may contain one or more of the computing device 1800A and the mobile computing device 1800B, and an entire system may be made up of multiple computing devices communicating with each other.

Figure 18B:
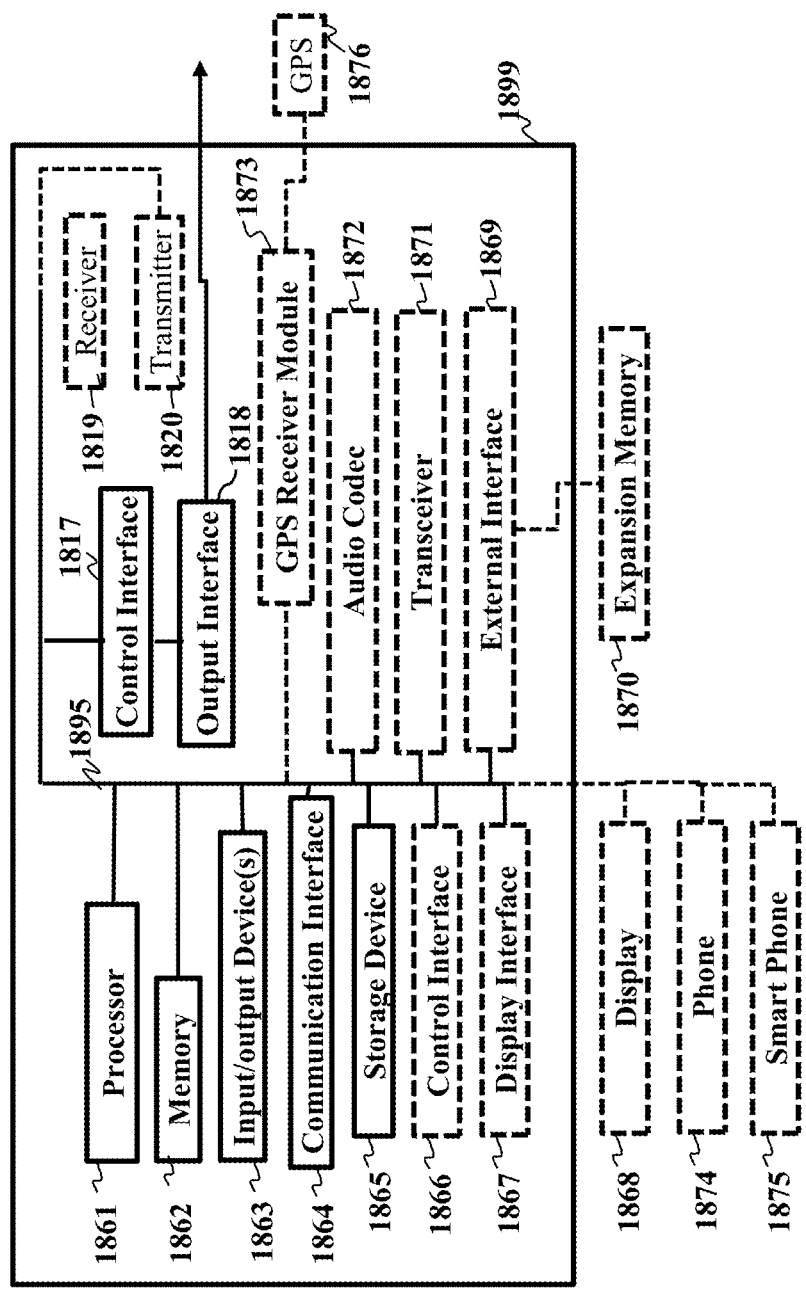
FIG. 18B is a schematic illustrating a mobile computing apparatus that can be used to implement some techniques of the methods and systems, according to embodiments of the present disclosure.

FIG. 18B is a schematic illustrating a mobile computing apparatus that can be used to implement some techniques of the methods and systems, according to embodiments of the present disclosure. The mobile computing device 1800B includes a bus 1895 connecting a processor 1861, a memory 1862, an input/output device 1863, a communication interface 1864, among other components. The bus 1895 can also be connected to a storage device 1865, such as a micro-drive or other device, to provide additional storage.

Referring to FIG. 18A, the processor 1861 can execute instructions within the mobile computing device 1800B, including instructions stored in the memory 1862. The processor 1861 may be implemented as a chipset of chips that include separate and multiple analog and digital processors. The processor 1861 may provide, for example, for coordination of the other components of the mobile computing device 1800B, such as control of user interfaces, applications run by the mobile computing device 1800B, and wireless communication by the mobile computing device 1800B. Contemplated are various component configurations that may be mounted on a common motherboard, by non-limiting example, 1899, depending upon the specific application.

The processor 1861 may communicate with a user through a control interface 1866 and a display interface 1867 coupled to the display 1868. The display 1868 may be, for example, a TFT (Thin-Film-Transistor Liquid Crystal Display) display or an OLED (Organic Light Emitting Diode) display, or other appropriate display technology. The display interface 1867 may comprise appropriate circuitry for driving the display 1868 to present graphical and other information to a user. The control interface 1866 may receive commands from a user and convert them for submission to the processor 1861. In addition, an external interface 1869 may provide communication with the processor 1861, so as to enable near area communication of the mobile computing device 1800B with other devices. The external interface 1869 may provide, for example, for wired communication in some implementations, or for wireless communication in other implementations, and multiple interfaces may also be used.

Still referring to FIG. 18B, the memory 1862 stores information within the mobile computing device 1800B. The memory 1862 can be implemented as one or more of a computer-readable medium or media, a volatile memory unit or units, or a non-volatile memory unit or units. An expansion memory 1870 may also be provided and connected to the mobile computing device 1899 through an expansion interface 1869, which may include, for example, a SIMM (single in line memory module) card interface. The expansion memory 1870 may provide extra storage space for the mobile computing device 1899, or may also store applications or other information for the mobile computing device 1899. Specifically, the expansion memory 1870 may include instructions to carry out or supplement the processes described above, and may include secure information also. Thus, for example, the expansion memory 1870 may be providing as a security module for the mobile computing device 1899, and may be programmed with instructions that permit secure use of the mobile computing device 1800B. In addition, secure applications may be provided via the SIMM cards, along with additional information, such as placing identifying information on the SIMM card in a non-hackable manner.

The memory 1862 may include, for example, flash memory and/or NVRAM memory (non-volatile random access memory), as discussed below. In some implementations, instructions are stored in an information carrier, that the instructions, when executed by one or more processing devices (for example, processor 1800B), perform one or more methods, such as those described above. The instructions can also be stored by one or more storage devices, such as one or more computer or machine readable mediums (for example, the memory 1862, the expansion memory 1870, or memory on the processor 1862). In some implementations, the instructions can be received in a propagated signal, for example, over the transceiver 1871 or the external interface 1869.

The mobile computing apparatus or device 1800B of FIG. 18B is intended to represent various forms of mobile devices, such as personal digital assistants, cellular telephones, smart-phones, and other similar computing devices. The mobile computing device 1800B may communicate wirelessly through the communication interface 1864, which may include digital signal processing circuitry where necessary. The communication interface 1864 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1871 using a radio-frequency. In addition, short-range communication may occur, such as using a Bluetooth, WiFi, or other such transceiver (not shown). In addition, a GPS (Global Positioning System) receiver module 1873 may provide additional navigation and location related wireless data to the mobile computing device 1800B, which may be used as appropriate by applications running on the mobile computing device 1800B.

The mobile computing device 1800B may also communicate audibly using an audio codec 1872, which may receive spoken information from a user and convert it to usable digital information. The audio codec 1872 may likewise generate audible sound for a user, such as through a speaker, e.g., in a handset of the mobile computing device 1800B. Such sound may include sound from voice telephone calls, may include recorded sound (e.g., voice messages, music files, etc.) and may also include sound generated by applications operating on the mobile computing device 1800B.

Still referring to FIG. 18B, the mobile computing device 1800B may be implemented in a number of different forms, as shown in the figure. For example, it may be implemented as a cellular telephone 1874. It may also be implemented as part of a smart-phone 1875, personal digital assistant, or other similar mobile device.

Features

According to aspects of the present disclosure, the set of recognition encodings can include a recognition encoding for each target speaker, and the decoder network can use the recognition encoding for each target speaker to output the text for that target speaker. Further an aspect can include the encoder network that includes a mixture encoder network, a set of speaker-differentiating encoder networks, and a recognition encoder network, such that a number of speaker-differentiating encoder networks is equal to, or larger than, a number of target speakers, wherein the mixture encoder network outputs a mixture encoding for the received acoustic signal, each speaker-differentiating encoder network outputs a speaker-differentiated encoding from the mixture encoding, and the recognition encoder network outputs a recognition encoding from each speaker-differentiated encoding. Wherein the stored speech recognition network is pre-trained with an initial speaker-differentiating encoder network using datasets including acoustic signals with speech by a single speaker and corresponding text labels. Further, some of the speaker-differentiating encoder networks in the set of speaker-differentiating encoder networks are initialized based on the initial speaker-differentiating encoder network. Wherein the initialization includes random perturbations.

Another aspect of the present disclosure can include the encoder network includes a speaker separation network and an acoustic encoder network, such that the speaker separation network outputs a set of separation encodings, wherein a number of separation encodings is equal to, or larger than, a number of target speakers, and the acoustic encoder network uses the set of separation encodings to output a set of recognition encodings. Wherein each recognition encoding of the set of recognition encodings corresponds to each separation encoding in the set of separation encodings, such that the acoustic encoder network outputs a recognition encoding for each separation encoding. Further, the set of separation encodings includes a single separation encoding for each target speaker, and the set of recognition encodings includes a single recognition encoding for each target speaker, such that the acoustic encoder network uses the single separation encoding for each target speaker to output the single recognition encoding for that target speaker. Further still, the set of separation encodings and the received acoustic signal are used to output separated signals for each target speaker. It is possible the at least one speaker separation network is trained to output separation encodings using datasets including acoustic signals from multiple speakers and their corresponding mixture. Further, the acoustic encoder network and the decoder network are trained to output text using datasets including acoustic signals with speech by at least one speaker and corresponding text labels. Further still, the at least one speaker separation network, the acoustic encoder network, and the decoder network are jointly trained using datasets including acoustic signals with speech by multiple overlapping speakers and corresponding text labels. It is possible the stored speech recognition network is trained using datasets including acoustic signals with speech by multiple overlapping speakers and corresponding text labels, such that the training involves minimizing an objective function using a weighted combination of decoding costs and separation costs.

Another aspect of the present disclosure can include the speech from the target speakers includes speech from one or more language. Wherein the text for at least one target speaker includes information about the language of the speech of that at least one target speaker. Further an aspect can include the stored speech recognition network is trained using datasets including acoustic signals with speech by multiple overlapping speakers and corresponding text labels.

Another aspect of the present disclosure can include a number of speaker-differentiating encoder networks is equal to, or larger than, a number of target speakers, such that the mixture encoder network outputs a mixture encoding for the received acoustic signal, each speaker-differentiating encoder network outputs a speaker-differentiated encoding from the mixture encoding, and the recognition encoder network outputs a recognition encoding from each preliminary recognition encoding. Further an aspect can include the stored speech recognition network is pretrained with an initial speaker-differentiating encoder network using datasets including acoustic signals with speech by a single speaker and corresponding text labels, wherein some of the speaker-differentiating encoder networks in the set of speaker-differentiating encoder networks are initialized based on the initial speaker-differentiating encoder network, such that the initialization includes random perturbations.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A speech recognition system for recognizing speech including overlapping speech by multiple speakers, comprising:
   a hardware processor;
   computer storage memory to store data along with having computer-executable instructions stored thereon that, when executed by the processor is to implement a stored speech recognition network;
   an input interface to receive an acoustic signal, the received acoustic signal including a mixture of speech signals by multiple speakers, wherein the multiple speakers include target speakers;
   an encoder network and a decoder network of the stored speech recognition network are trained to transform the received acoustic signal into a text for each target speaker, such that the encoder network outputs a set of recognition encodings, and the decoder network uses the set of recognition encodings to output the text for each target speaker, such that the training is performed by minimizing a loss function computed on the output of the decoder and defined based on unaligned text for each target speaker; and
   an output interface to transmit the text for each target speaker.

2. The speech recognition system of claim 1, wherein the set of recognition encodings includes a recognition encoding for each target speaker, and the decoder network uses the recognition encoding for each target speaker to output the text for that target speaker.

3. The speech recognition system of claim 1, wherein the encoder network includes a mixture encoder network, a set of speaker-differentiating encoder networks, and a recognition encoder network, such that a number of speaker-differentiating encoder networks is equal to, or larger than, a number of target speakers, wherein the mixture encoder network outputs a mixture encoding for the received acoustic signal, each speaker-differentiating encoder network outputs a speaker-differentiated encoding from the mixture encoding, and the recognition encoder network outputs a recognition encoding from each speaker-differentiated encoding.

4. The speech recognition system of claim 3, wherein the stored speech recognition network is pre-trained with an initial speaker-differentiating encoder network using datasets including acoustic signals with speech by a single speaker and corresponding text labels.

5. The speech recognition system of claim 4, wherein some of the speaker-differentiating encoder networks in the set of speaker-differentiating encoder networks are initialized based on the initial speaker-differentiating encoder network.

6. The speech recognition system of claim 5, wherein the initialization includes random perturbations.

7. The speech recognition system of claim 3, wherein the mixture encoder network, the set of speaker-differentiating encoder networks, the recognition encoder network, and the decoder network are jointly trained using datasets including acoustic signals with speech by multiple overlapping speakers and corresponding text labels.

8. The speech recognition system of claim 1, wherein the encoder network includes a speaker separation network and an acoustic encoder network, such that the speaker separation network outputs a set of separation encodings, wherein a number of separation encodings is equal to, or larger than, a number of target speakers, and the acoustic encoder network uses the set of separation encodings to output a set of recognition encodings.

9. The speech recognition system of claim 8, wherein each recognition encoding of the set of recognition encodings corresponds to each separation encoding in the set of separation encodings, such that the acoustic encoder network outputs a recognition encoding for each separation encoding.

10. The speech recognition system of claim 8, wherein the set of separation encodings includes a single separation encoding for each target speaker, and the set of recognition encodings includes a single recognition encoding for each target speaker, such that the acoustic encoder network uses the single separation encoding for each target speaker to output the single recognition encoding for that target speaker.

11. The speech recognition system of claim 8, wherein the set of separation encodings and the received acoustic signal are used to output separated signals for each target speaker.

12. The speech recognition system of claim 8, wherein the speaker separation network is trained to output separation encodings using datasets including acoustic signals from multiple speakers and their corresponding mixture.

13. The speech recognition system of claim 8, wherein the acoustic encoder network and the decoder network are trained to output text using datasets including acoustic signals with speech by at least one speaker and corresponding text labels.

14. The speech recognition system of claim 8, wherein the speaker separation network, the acoustic encoder network, and the decoder network are jointly trained using datasets including acoustic signals with speech by multiple overlapping speakers and corresponding text labels.

15. The speech recognition system of claim 8, wherein the stored speech recognition network is trained using datasets including acoustic signals with speech by multiple overlapping speakers and corresponding text labels, such that the training involves minimizing an objective function using a weighted combination of decoding costs and separation costs.

16. The speech recognition system of claim 1, wherein speech from the target speakers includes speech from one or more language.

17. The speech recognition system of claim 16, wherein the text for at least one target speaker includes information about the language of the speech of that at least one target speaker.

18. The speech recognition system of claim 1, wherein the encoder network and the decoder network are jointly trained using datasets including acoustic signals with speech by multiple overlapping speakers and corresponding text labels.

19. The speech recognition system of claim 1, wherein the encoder network and the decoder network are jointly trained using datasets including acoustic signals with speech by multiple overlapping speakers and corresponding text labels.

20. A speech recognition system for recognizing speech including overlapping speech by multiple speakers, comprising:
   a hardware processor;
   computer storage memory to store data along with having computer-executable instructions stored thereon that, when executed by the processor, is to implement a stored speech recognition network;
   an input interface to receive an acoustic signal, the received acoustic signal includes a mixture of speech signals by multiple speakers, wherein the multiple speakers include target speakers;
   an encoder network and a decoder network of the stored speech recognition network are trained to transform the received acoustic signal into a text for each target speaker, such that the encoder network outputs a set of recognition encodings, and the decoder network uses the set of recognition encodings to output the text for each target speaker, such that the training is performed by minimizing a loss function computed on the output of the decoder and defined based on unaligned text for each target speaker, and wherein the encoder network also includes a mixture encoder network, a set of speaker-differentiating encoder networks, and a recognition encoder network; and
   an output interface to transmit the text for each target speaker.

21. The speech recognition system of claim 20, wherein a number of speaker-differentiating encoder networks is equal to, or larger than, a number of target speakers, such that the mixture encoder network outputs a mixture encoding for the received acoustic signal, each speaker-differentiating encoder network outputs a speaker-differentiated encoding from the mixture encoding, and the recognition encoder network outputs a recognition encoding from each preliminary recognition encoding.

22. The speech recognition system of claim 21, wherein the stored speech recognition network is pretrained with an initial speaker-differentiating encoder network using datasets including acoustic signals with speech by a single speaker and corresponding text labels, wherein some of the speaker-differentiating encoder networks in the set of speaker-differentiating encoder networks are initialized based on the initial speaker-differentiating encoder network, such that the initialization includes random perturbations.

23. A method using a speech recognition system to recognize separate speaker signals within an audio signal having overlapping speech by multiple speakers, comprising:
   receiving an acoustic signal including a mixture of speech signals by multiple speakers via an input interface, wherein the multiple speakers include target speakers;
   inputting the received audio signal using a hardware processor into a pre-trained speech recognition network stored in a computer readable memory, such that the pre-trained speech recognition network is configured for
   transforming the received acoustic signal into a text for each target speaker using an encoder network and a decoder network of the pre-trained speech recognition network by, using the encoder network to output a set of recognition encodings, and the decoder network uses the set of recognition encodings to output the text for each target speaker, such that the training is performed by minimizing a loss function computed on the output of the decoder and defined based on unaligned text for each target speaker; and
   transmitting the text for each target speaker using an output interface.

* * * * *